(12) United States Patent
Gahimer et al.

(10) Patent No.: US 12,149,885 B2
(45) Date of Patent: Nov. 19, 2024

(54) SPEAKER DEVICE

(71) Applicant: SimpliSafe, Inc., Boston, MA (US)

(72) Inventors: Curtis Gahimer, Indianapolis, IN (US); John D'Aversa, Jr., Cambridge, MA (US); Patrick Lloyd Murphy, Somerville, MA (US); Devin Walker, Somerville, MA (US); Rodrigo Alexei Vasquez, Medford, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/474,539

(22) Filed: Sep. 26, 2023

(65) Prior Publication Data

US 2024/0114287 A1   Apr. 4, 2024

Related U.S. Application Data

(63) Continuation-in-part of application No. 17/935,972, filed on Sep. 28, 2022.

(51) Int. Cl.
*H04R 1/02* (2006.01)
*H04N 23/57* (2023.01)
*H04R 1/28* (2006.01)

(52) U.S. Cl.
CPC .......... *H04R 1/2803* (2013.01); *H04N 23/57* (2023.01); *H04R 1/025* (2013.01); *H04R 1/2811* (2013.01);
(Continued)

(58) Field of Classification Search
CPC .... H04R 1/025; H04R 1/2811; H04R 1/2819; H04R 1/2842; H04R 1/2849; H04R 2499/11
See application file for complete search history.

(56) References Cited

U.S. PATENT DOCUMENTS 3,778,551 A   12/1973   Grodinsky
3,819,879 A    6/1974   Baechtold
(Continued)

FOREIGN PATENT DOCUMENTS

DE        2261122 A1      6/1973
EM   002055954-0003 S    6/2012
(Continued)

OTHER PUBLICATIONS

Exner, Karin; International Search Report and Written Opinion dated Nov. 10, 2023; International Application No. PCT/US2023/028445; European Patent Office; Rijswijk, Netherlands.
(Continued)

*Primary Examiner* — Huyen D Le
(74) *Attorney, Agent, or Firm* — Stevens & Showalter LLP

(57) ABSTRACT

A device including a speaker and a housing, in which the speaker is configured to generate sound and includes a diaphragm and the housing encloses the speaker and includes a plurality of openings within one portion of the housing. The speaker is positioned within the housing to define a front chamber between the diaphragm and the one portion, and the plurality of openings are sized to collectively generate, with the front chamber, an increased output of the device within a frequency range of an output of the speaker corresponding to an alarm tone. Also provided are methods for assembling a device including a speaker and a housing.

12 Claims, 36 Drawing Sheets

(52) U.S. Cl.
CPC ......... *H04R 1/2819* (2013.01); *H04R 1/2842* (2013.01); *H04R 1/2849* (2013.01); *H04R 2499/11* (2013.01)

(56) References Cited

U.S. PATENT DOCUMENTS

| | | | |
|---|---|---|---|
| 4,239,945 A * | 12/1980 | Atoji | H04R 1/2819 |
| | | | 381/349 |
| 4,698,619 A | 10/1987 | Loeb | |
| 5,729,605 A * | 3/1998 | Bobisuthi | H04R 1/1041 |
| | | | 379/433.02 |
| 5,844,998 A * | 12/1998 | Nageno | H04R 1/2842 |
| | | | 381/372 |
| 6,473,625 B1 * | 10/2002 | Williams | H04R 1/225 |
| | | | 381/353 |
| D640,721 S | 6/2011 | Satine | |
| 8,130,994 B2 | 3/2012 | Button et al. | |
| 9,027,701 B2 | 5/2015 | Center et al. | |
| 9,143,847 B2 | 9/2015 | Dodd | |
| 9,154,869 B2 | 10/2015 | Cohen | |
| 9,347,798 B1 | 5/2016 | Johnson et al. | |
| 9,485,477 B2 | 11/2016 | DiPoala | |
| 9,485,565 B2 | 11/2016 | Lee et al. | |
| 9,628,900 B2 | 4/2017 | Yang et al. | |
| 9,666,046 B2 | 5/2017 | Lim | |
| D807,944 S | 1/2018 | Worthington et al. | |
| 9,967,657 B1 | 5/2018 | Wang | |
| 10,003,870 B2 | 6/2018 | Miao | |
| D831,089 S | 10/2018 | Laffon de Mazieres et al. | |
| 10,104,469 B2 | 10/2018 | Jakowski | |
| 10,178,467 B2 | 1/2019 | Hou et al. | |
| D842,358 S | 3/2019 | Puric et al. | |
| D845,373 S | 4/2019 | Mittleman et al. | |
| D849,080 S | 5/2019 | Rosenberg et al. | |
| D849,088 S | 5/2019 | Lai | |
| 10,299,030 B2 | 5/2019 | Zhong | |
| 10,299,032 B2 | 5/2019 | Grazian et al. | |
| 10,310,567 B2 | 6/2019 | Kita et al. | |
| 10,348,351 B2 | 7/2019 | Rivera | |
| 10,362,389 B2 | 7/2019 | Proni et al. | |
| 10,462,553 B2 | 10/2019 | Matsumura | |
| 10,469,953 B2 | 11/2019 | Qin et al. | |
| 10,484,766 B2 | 11/2019 | Huo et al. | |
| 10,490,041 B1 | 11/2019 | Churak | |
| D871,483 S | 12/2019 | Chang et al. | |
| 10,529,206 B2 | 1/2020 | Sacre et al. | |
| D886,177 S | 6/2020 | Ramones et al. | |
| 10,718,996 B2 | 7/2020 | Ramones et al. | |
| 10,728,638 B2 | 7/2020 | Leonhardt et al. | |
| D892,663 S | 8/2020 | Han et al. | |
| D902,978 S | 11/2020 | England et al. | |
| 10,863,268 B1 | 12/2020 | Torigoe et al. | |
| 10,893,174 B2 | 1/2021 | Li et al. | |
| D912,122 S | 3/2021 | McManigal et al. | |
| D917,597 S | 4/2021 | Park | |
| 11,064,621 B1 | 7/2021 | Churak | |
| 11,076,229 B2 | 7/2021 | Park et al. | |
| D926,857 S | 8/2021 | Zhang | |
| 11,228,832 B2 | 1/2022 | Sim et al. | |
| 11,265,632 B1 | 3/2022 | Au et al. | |
| 11,317,183 B2 | 4/2022 | Shen et al. | |
| 11,317,195 B2 | 4/2022 | Ma et al. | |
| 11,330,364 B1 | 5/2022 | Delay et al. | |
| D954,124 S | 6/2022 | Long | |
| D961,650 S | 8/2022 | Kim et al. | |
| D962,322 S | 8/2022 | Kim et al. | |
| D970,582 S | 11/2022 | Thorne et al. | |
| D970,590 S | 11/2022 | Thorne et al. | |
| D971,289 S | 11/2022 | Thorne et al. | |
| 11,490,190 B1 | 11/2022 | Leonhardt et al. | |
| D972,618 S | 12/2022 | Li | |
| D973,123 S | 12/2022 | Thorne et al. | |
| D973,748 S | 12/2022 | Cai et al. | |
| D974,442 S | 1/2023 | Li | |
| D974,446 S | 1/2023 | Yang | |
| D976,984 S | 1/2023 | McManigal et al. | |
| 11,589,143 B2 | 2/2023 | Yang et al. | |
| D984,510 S | 4/2023 | Li | |
| D986,310 S | 5/2023 | Ma | |
| D986,936 S | 5/2023 | Zhang | |
| D996,489 S | 8/2023 | McManigal et al. | |
| 11,893,878 B1 | 2/2024 | Burau et al. | |
| 2004/0084244 A1 * | 5/2004 | Zurek | H04M 1/035 |
| | | | 181/155 |
| 2007/0280497 A1 | 12/2007 | Isberg et al. | |
| 2010/0061584 A1 | 3/2010 | Lin et al. | |
| 2013/0170688 A1 | 7/2013 | Cohen et al. | |
| 2014/0016813 A1 | 1/2014 | Morris | |
| 2015/0181322 A1 * | 6/2015 | Huang | H04R 1/1016 |
| | | | 381/380 |
| 2015/0382090 A1 | 12/2015 | Bisset et al. | |
| 2017/0070813 A1 | 3/2017 | Wah et al. | |
| 2021/0356104 A1 | 11/2021 | Thorne et al. | |
| 2022/0232304 A1 | 7/2022 | Au et al. | |
| 2022/0264220 A1 | 8/2022 | Kato et al. | |
| 2022/0301532 A1 | 9/2022 | Ott | |
| 2023/0116758 A1 | 4/2023 | Wu et al. | |

FOREIGN PATENT DOCUMENTS

| | | |
|---|---|---|
| EM | 003119940-0002 S | 5/2016 |
| EM | 008715957-0002 S | 10/2021 |
| EM | 009203649-0001 S | 10/2022 |
| EM | 015012735-0001 S | 2/2023 |
| EP | 2613563 B1 | 6/2016 |
| EP | 2999240 B1 | 12/2018 |
| EP | 3138299 B1 | 10/2019 |
| EP | 3411861 B1 | 4/2020 |
| EP | 3669695 A2 | 6/2020 |
| EP | 3491627 B1 | 11/2020 |
| EP | 3383060 B1 | 12/2020 |
| EP | 4027655 A1 | 7/2022 |
| EP | 4033778 A1 | 7/2022 |
| GB | 9002055954-0003 S | 6/2012 |
| GB | 8086503000-1000 S | 5/2015 |
| GB | 9003119940-0002 S | 5/2016 |
| GB | 2577569 B | 6/2022 |
| KR | 20090096006 A | 9/2009 |
| KR | 20210067066 A | 6/2021 |
| WO | 2009060420 A1 | 5/2009 |
| WO | 2020031006 A1 | 2/2020 |
| WO | 2021050250 A1 | 3/2021 |
| WO | 2021131705 A1 | 7/2021 |

OTHER PUBLICATIONS

Exner, Karin; Invitation to Pay Additional Fees, and Where Appliclcable, Protest Fees dated Nov. 17, 2023; International Application No. PCT/US2023/033697; European Patent Office; Rijswijk, Netherlands.

John C. Baumhauer Ph.D.; "1-Day MWM Acoustical Design Course"; MWM Acoustics; Feb. 10, 2006; pp. 61-62.

Leo L. Beranek and Tim J. Mellow; "Acoustics: Sound Fields and Transducers"; 2012; pp. 130, 135, 392-395; Elsevier, Inc.; Waltham, Massachusetts, USA.

"Figure 14"; Bell Telephone Laboratories, Inc.; likely 1975.

"Figure 15"; Bell Telephone Laboratories, Inc.; 1975.

"Figure 16"; Bell Telephone Laboratories, Inc.; likely 1975.

"Figure 17"; Bell Telephone Laboratories, Inc.; likely 1975.

"Governing Equations of Wholly Acoustic System"; JCB; Bell Telephone Laboratories, Inc.; likely 1975.

F.F. Romanow; "Preface to Issue 1"; Bell Telephone Laboratories, Inc.; Aug. 1949.

F.F. Romanow; "Preface to the Second Edition"; Bell Telephone Laboratories, Inc.; Dec. 1962.

Indy Acoustic Research; "Frequency Response Comparison Graph"; 2019.

Gahimer, Curtis; "Speaker Device"; U.S. Appl. No. 17/935,972, filed Sep. 28, 2022.

Thayer, Jordan; "Resonator Devices and Assemblies Thereof"; U.S. Appl. No. 18/056,390, filed Nov. 17, 2022.

(56) References Cited

OTHER PUBLICATIONS

Thorne, Scott; "Resonator Device"; U.S. Appl. No. 29/868,042, filed Nov. 17, 2022.

Thorne, Scott; Design U.S. Appl. No. 29/912,445 entitled "Resonator Device"; filed Sep. 19, 2023; United States Patent and Trademark Office; Alexandria, Virginia.

Thorne, Scott; Design U.S. Appl. No. 29/912,972 entitled "Camera With Integrated Resonator"; filed on Sep. 26, 2023; United States Patent and Trademark Office; Alexandria, Virginia.

Philips Hue Secure Wired Camera; https://www.philips-hue.com/en-us/products/all-products/product-page/secure-cameras#overview; 2023.

Gahimer, Curtis; PCT Application No. PCT/US2023/028445 for Speaker Device; filed Jul. 24, 2023; United States Patent and Trademark Office; Alexandria, Virginia.

Thayer, Jordan; PCT Application No. PCT/US2023/033201 for Resonator Devices and Assemblies Thereof; filed Sep. 20, 2023; United States Patent and Trademark Office; Alexandria, Virgina.

Gahimer, Curtis; PCT Application No. PCT/US2023/033697 for Speaker Device; filed Sep. 26, 2023; United States Patent and Trademark Office; Alexandria, Virginia.

Kuhnen, Leila; Invitation to Pay Additional Fees, and Where Appliclcable, Protest Fees dated Jan. 19, 2024; International Application No. PCT/US2023/033201; European Patent Office; Rijswijk, Netherlands.

Ipinazar, Paula; International Search Report and Written Opinion of the International Searching Authority dated Feb. 14, 2024; International Application No. PCT/US2023/033697; European Patent Office; Rijswijk, Netherlands.

Kuhnen, Leila; International Search Report and Written Opinion of the International Searching Authority dated Mar. 12, 2024; International Application No. PCT/US2023/033201; European Patent Office; Rijswijk, Netherlands.

Gahimer, Curtis; Related U.S. Appl. No. 18/755,878 entitled "Speaker Device" filed Jun. 27, 2024; United States Patent and Trademark Office; Alexandria, Virginia.

Yu, Norman; Non-Final Rejection dated May 30, 2024; U.S. Appl. No. 17/935,972; United States Patent and Trademark Office; Alexandria, Virginia.

Gahimer, Curtis; Related U.S. Appl. No. 18/782,355 entitled "Speaker Device" filed Jul. 24, 2024; United States Patent and Trademark Office; Alexandria, Virginia.

* cited by examiner

SPEAKER DEVICE

CROSS-REFERENCE TO RELATED APPLICATION

This application is a continuation-in-part of U.S. patent application Ser. No. 17/935,972, filed on Sep. 28, 2022, the entire disclosure of which is incorporated by reference herein.

FIELD

The present disclosure is directed to speaker devices for increasing an output of the speaker device at a particular frequency or frequency range.

BACKGROUND

Devices with electrodynamic speakers often include an internal front chamber positioned in front of a speaker. Openings in housings of such devices allow acoustic waves to exit the housing.

SUMMARY OF THE DISCLOSURE

In one aspect of the present disclosure, a device is provided that includes a speaker and a housing. The speaker is configured to generate sound and includes a diaphragm. The housing encloses the speaker and includes a plurality of openings within one portion of the housing. The speaker is positioned within the housing to define a front chamber between the diaphragm and the one portion, and the plurality of openings are sized to collectively generate, with the front chamber, an increased output of the device within a frequency range of an output of the speaker corresponding to an alarm tone.

The front chamber and the plurality of openings may be configured to create a resonator having a resonance frequency within the frequency range of the alarm tone to selectively increase a sound pressure level of the output of the device corresponding to the alarm tone.

The speaker may be an electrodynamic speaker capable of generating an output within a frequency range of from 400 Hz to 4.0 kHz. The increased output of the device may include a peak output of the device within the frequency range of the output of the speaker corresponding to the alarm tone.

The one portion of the housing may be a first end of the housing, and the front chamber may include the plurality of openings within the one end of the housing but may otherwise be acoustically sealed.

The frequency range of the output of the speaker corresponding to the alarm tone may fall within a range from 2.0 kHz to 4.0 kHz. The speaker may be a security alarm speaker and the output of the speaker may further include speech. A sound pressure level of the output of the speaker may be increased by at least 6 dB.

In another aspect of the present disclosure, a method for assembling a device includes: providing a speaker and a housing, the speaker being configured to generate sound and including a diaphragm, and the housing including a plurality of openings within one portion; and assembling the housing and the speaker to form the device such that the housing encloses the speaker and the speaker is positioned within the housing to define a front chamber between the diaphragm and the one portion. The plurality of openings are sized to collectively generate, with the front chamber, an increased output of the device within a frequency range of an output of the speaker corresponding to an alarm tone.

The method may further include dimensioning the housing such that the front chamber and the plurality of openings create a resonator having a resonance frequency within the frequency range of the alarm tone to selectively increase a sound pressure level of the output of the device corresponding to the alarm tone.

The speaker may be an electrodynamic speaker capable of generating an output within a frequency range of from 400 Hz to 4.0 kHz. The increased output of the device may include a peak output of the device within the frequency range of the output of the speaker corresponding to the alarm tone.

The method may further include acoustically sealing the front chamber such that acoustic waves generated by the speaker are directed only through the plurality of openings.

The method may further include configuring the housing and the speaker such that a sound pressure level of the output of the speaker is increased by at least 6 dB.

In a further aspect of the present disclosure, a method includes providing a speaker including a diaphragm; providing a housing for enclosing the speaker and including a plurality of openings within one portion of the housing; positioning the speaker within the housing to define a sealed front chamber between the diaphragm and the one portion, in which the speaker and the housing define a device; and defining one or more parameters of the device to collectively create a resonator having a resonance frequency matching at least a portion of a frequency range of an output of the speaker corresponding to an alarm tone.

The speaker may be an electrodynamic speaker, the frequency range of the output of the speaker is from 400 Hz to 4.0 kHz, and the output of the speaker corresponding to the alarm tone may fall within a range from 2.0 kHz to 4.0 kHz.

The one or more parameters may include a volume of the front chamber, and the method may further include: increasing the volume of the front chamber when the resonance frequency is to be decreased; and decreasing the volume of the front chamber when the resonance frequency is to be increased.

The one or more parameters may include a cross-sectional area of each of the openings, and the method may further include: decreasing the cross-sectional area of the openings when the resonance frequency is to be decreased; and increasing the cross-sectional area of the openings when the resonance frequency is to be increased.

In a further aspect of the present disclosure, a device is provided that includes a speaker configured to generate sound and including a diaphragm; and a housing enclosing the speaker and including a single opening within one portion of the housing. The speaker is positioned within the housing to define a front chamber between the diaphragm and the one portion, and the single opening is sized to generate, with the front chamber, an increased output of the device within a frequency range of an output of the speaker corresponding to an alarm tone.

The front chamber and the single opening may be configured to create a resonator having a resonance frequency within the frequency range of the alarm tone to selectively increase a sound pressure level of the output of the device corresponding to the alarm tone.

The increased output of the device comprises a peak output of the device within the frequency range of the output of the speaker may correspond to the alarm tone. The speaker may comprise an electrodynamic speaker capable of generating an output within a frequency range of from 400 Hz to 4.0 kHz. The frequency range of the output of the speaker corresponding to the alarm tone may fall within a range from 2.0 kHz to 4.0 kHz. The speaker may comprise a security alarm speaker and the output of the speaker may further comprise speech. A sound pressure level of the output of the speaker may be increased by at least 10 dB. The device may further comprise a camera enclosed in the housing.

In a further aspect of the present disclosure, a device is provided that includes a speaker and a housing enclosing the speaker, in which the speaker is attached to define a front chamber between the housing and a diaphragm of the speaker, and in which the housing includes a single opening that is sized to generate, with the front chamber, an increased output of the device within a frequency range of an output of the speaker corresponding to an alarm tone.

The front chamber may be acoustically sealed, such that acoustic waves generated by the speaker are directed only through the single opening. The speaker may be enclosed in a lower housing compartment of the housing, in which the housing further includes a main housing compartment that encloses a camera, in which the main housing compartment includes one or more extensions each having an opening formed therethrough and one or more fasteners extend through a corresponding one of one or more of the openings formed in the lower housing compartment and through the opening formed in a corresponding one of the extensions to couple the lower housing compartment to the main housing compartment. The camera may include a camera lens that captures light along an optical axis, in which the optical axis may substantially parallel to a direction in which acoustic waves produced by the speaker exit the single opening. The lower housing compartment may be acoustically sealed with respect to the main housing compartment.

In a further aspect of the present disclosure, a method is provided, the method including: providing device including an optical apparatus, in which the device further includes a speaker and a housing enclosing the speaker, the speaker being configured to generate acoustic waves defining an alarm tone, in which the housing includes a single opening that is located within the housing such that (i) a front chamber is defined between the speaker and the single opening, and (ii) acoustic waves generated by the speaker exit through the single opening; and assembling the device such that the front chamber and the single opening create a resonator having a resonance frequency within a frequency range of the alarm tone to selectively increase a sound pressure level of an output of the device corresponding to the alarm tone.

The method may further include acoustically sealing the front chamber such that the acoustic waves generated by the speaker are directed only through the single opening.

The speaker may include an electrodynamic speaker, the frequency range of the output of the speaker may be from 400 Hz to 4.0 kHz, and the output of the speaker corresponding to the alarm tone may fall within a range from 2.0 kHz to 4.0 kHz.

The method may further include defining one or more parameters of the housing such that the resonance frequency is within a frequency range of the alarm tone to selectively increase the sound pressure level of the output of the device corresponding to the alarm tone. The one or more parameters may include a volume of the front chamber, and the method may further include increasing the volume of the front chamber when the resonance frequency is to be decreased; and decreasing the volume of the front chamber when the resonance frequency is to be increased. The one or more parameters may include a cross-sectional area of the single opening, and the method may further include decreasing the cross-sectional area of the single opening when the resonance frequency is to be decreased; and increasing the cross-sectional area of the single opening when the resonance frequency is to be increased. The one or more parameters may include a length of the single opening, and the method may further include decreasing the length of the single opening when the resonance frequency is to be increased; and increasing the length of the single opening when the resonance frequency is to be decreased.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale. Aspects of the present disclosure are described with reference to the following drawings in which numerals reference like elements, and in which.

DETAILED DESCRIPTION

Figure 1:
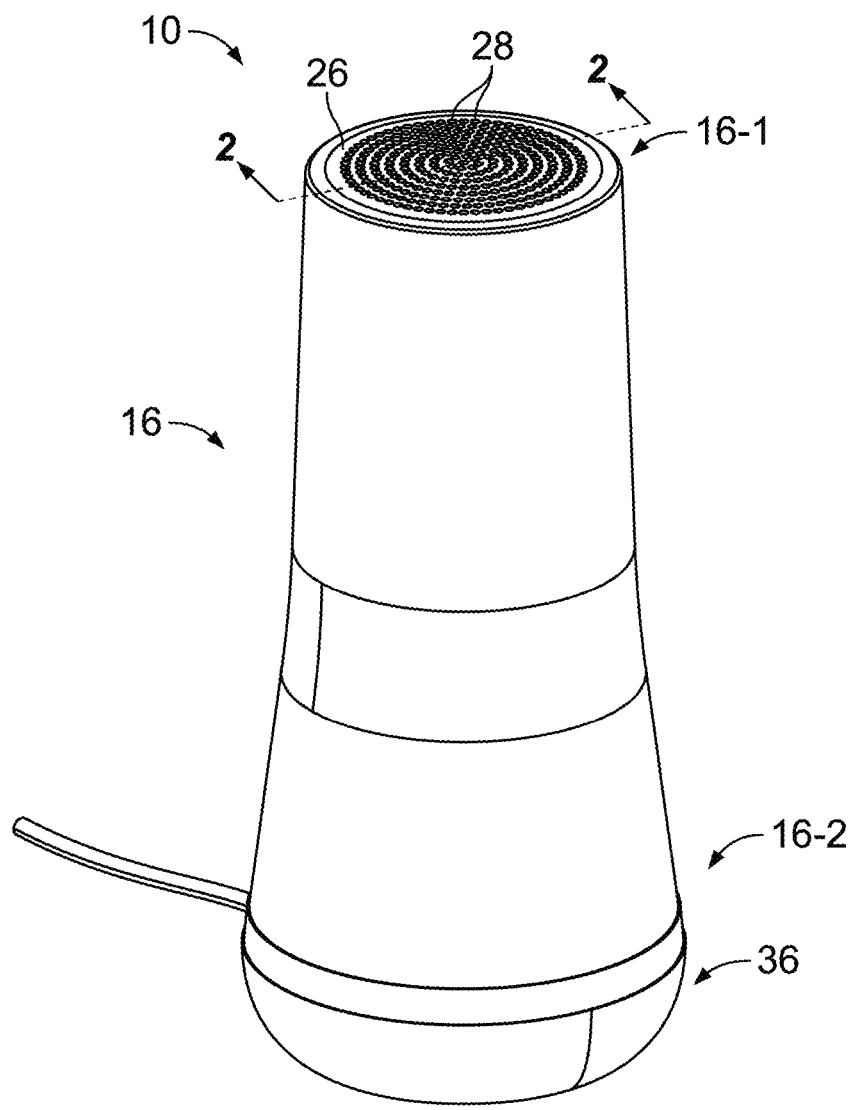
FIG. 1 is a perspective view of a device in accordance with the present disclosure.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

Many speaker devices that are used to generate an alarm, such as piezoelectric speakers, are unable to generate output of a sufficient sound pressure level across a broad frequency range of, for example, 400 Hz to 4.0 kHz. As a result, these speaker devices may generate an alarm tone with a high sound pressure level but often cannot generate speech because the bandwidth of piezoelectric speakers generally is not wide enough. In accordance with the present disclosure, the speaker device may include a Helmholtz resonator that is configured to increase the sound pressure level of a peak output of the device across a wide enough range to generate an alarm tone and speech that are audible to the average person and also intelligible in the case of speech, with the peak output of the device corresponding to the alarm tone.

The present disclosure provides a solution for improving an output of a speaker device comprising a housing and a speaker in a manner that minimizes substantial changes to the device, yet provides improved output. The improved output occurs at a desired frequency or frequency range, yet does not substantially reduce the output of the device at frequencies below the desired frequency or frequency range. In one example, the desired frequency or frequency range corresponds to an alarm tone, such that the output of the speaker device is increased at the desired frequency or frequency range corresponding to the alarm tone. This increase in output is achieved by modifying the device such that it defines a Helmholtz resonator having a resonance frequency at or near a frequency or frequency range of the alarm tone.

Figure 2:
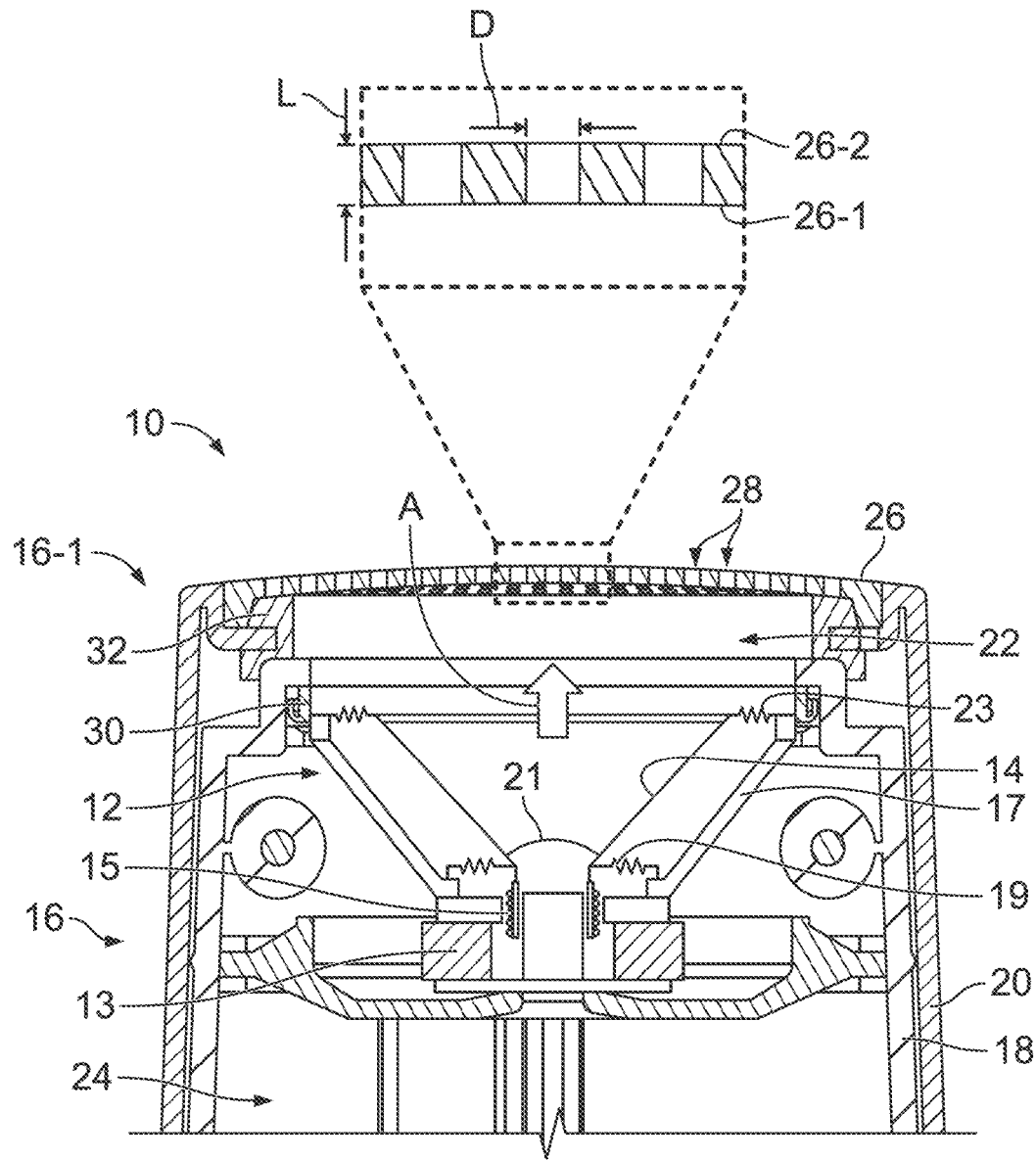
FIG. 2 is a cross-sectional view of the device of FIG. 1 taken along line 2-2.

FIGS. 1 and 2 show an exemplary device 10 in accordance with the present disclosure. The device 10 may comprise a speaker 12 (e.g., a loudspeaker) and may be configured to generate sound. The speaker 12, which is shown schematically in FIG. 2, may be an electrodynamic speaker and may include a cone or diaphragm 14 and other known components, such as a magnet 13, a voice coil 15, a chassis 17, a spider 19, a dust cap 21, and a surround 23, all of which may be collectively referred to as a driver. Furthermore, the device 10 may include additional electronic components such as, for example, a wireless antenna, microcontroller, audio amplifier, power circuit, batteries, LED lights (also not shown). A housing 16 receives and encloses the speaker 12. In the example shown in FIG. 2, the housing 16 comprises an assembly including a speaker enclosure 18, a cover 20, and a grill 26. The speaker enclosure 18 receives the speaker 12, and the cover 20 receives and at least partially surrounds the speaker enclosure 18. In other examples (not shown), the housing 16 may comprise either the speaker enclosure 18 or the cover 20, along with the grill 26. In further examples, as described below, the grill 26 may be integral, such that the housing 16 comprises a single component. The device 10 may comprise a base station, as described with respect to FIGS. 13 and 14.

With continued reference to FIGS. 1 and 2, the housing 16 may comprise any shape, and the speaker 12 may be positioned within the housing 16 to define a front chamber 22 between the diaphragm 14 and one portion of the housing 16. A rear chamber 24 may be defined between the speaker 12 and another portion of the housing 16. In the example shown in FIGS. 1 and 2, the housing 16 comprises a first end 16-1 and a second end 16-2, with the front chamber 22 being defined between the diaphragm 14 and the first end 16-1 of the housing 16 and the rear chamber 24 being defined between the speaker 12 and the second end 16-2 of the housing 16. Hence, in the example shown in FIGS. 1 and 2, the one portion of the housing 16 is defined by the first end 16-1 of the housing 16 and the other portion of the housing 16 is defined by the second end 16-2 of the housing 16.

The housing 16 may comprise a plurality of openings 28 formed within a portion thereof, specifically the first end 16-1 of the housing 16 in the embodiment of FIGS. 1 and 2. In the example shown in FIGS. 1 and 2, the grill 26 includes the plurality of openings 28 such that the grill 26 defines the portion or first end 16-1 of the housing 16. In the example illustrated in FIGS. 1 and 2, the grill 26 is a separate component coupled to the cover 20. In other examples (not shown), the grill 26 may be integral with the cover 20, e.g., the plurality of openings 28 may be formed directly in the cover 20.

The openings 28 may comprise a generally circular shape, as shown in FIGS. 1 and 2, or may define other shapes (not shown) such as elongated slots, a hexagonal or honeycomb shape, etc. In the examples shown, the openings 28 are arranged in a series of concentric circles. In other examples (not shown), the openings may be arranged in a grid comprising one or more rows. A spacing between the openings 28 within a concentric circle or within a row and/or between the concentric circles or between the rows may be substantially uniform. With reference to the detailed view in the inset of FIG. 2, the grill 26 may comprise an inner surface 26-1 and an outer surface 26-2, and the openings 28 may extend between the inner and outer surfaces 26-1, 26-2. The openings 28 comprise a diameter D and a length L, in which the length L is defined by a distance between the inner and outer surfaces 26-1, 26-2 of the grill 26, i.e., by a thickness of the grill 26. The openings 28 also comprise a cross-sectional area, and for circular openings, the cross-sectional area is defined by a radius (not labeled) of the opening 28. In some examples, the cross-sectional area of each opening 28 may be uniform along an entirety of the length L, as shown in FIG. 2. In other examples, the cross-sectional area may vary along at least a portion of the length L of the opening 28.

Figure 3:
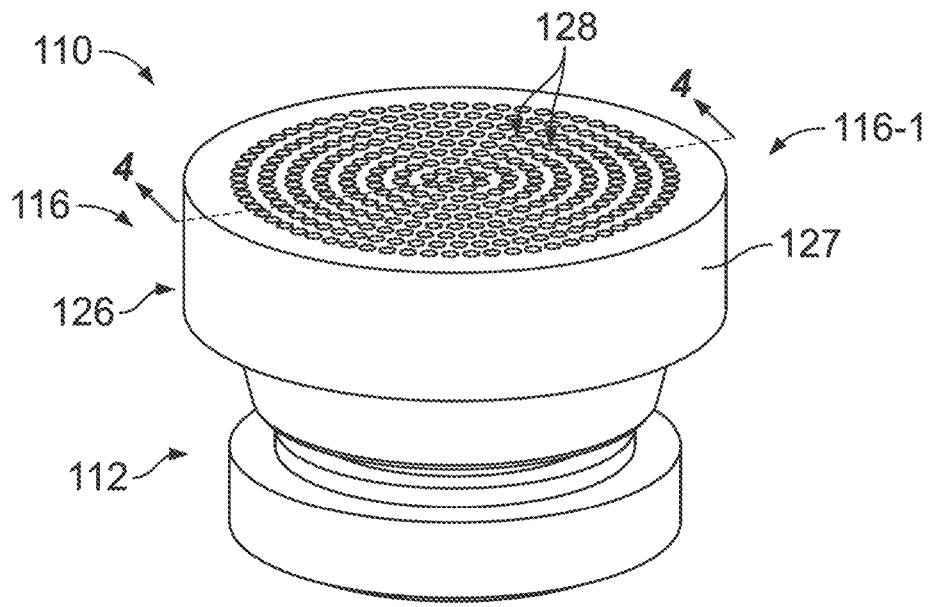
FIG. 3 is a perspective view of a portion of another device in accordance with the present disclosure.
Figure 4:
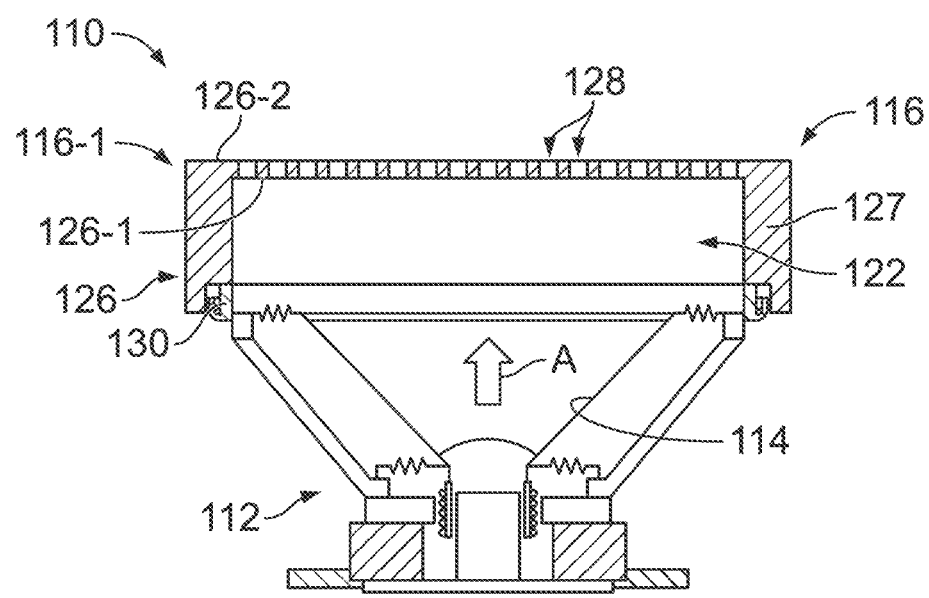
FIG. 4 is a cross-sectional view of the device of FIG. 3 taken along line 4-4.

FIGS. 3 and 4 depict another exemplary device 110, in which a speaker 112 and a portion of a housing 116 are shown. The speaker 112 may be substantially similar to the speaker 12 shown in FIG. 2 and may comprise a diaphragm 114 (the additional components of the speaker 112 are not labeled in FIG. 4). Instead of a separate grill, a first end 116-1 of the housing 116 may comprise a cap 126, which is an integral structure that comprises an inner surface 126-1, an outer surface 126-2, a plurality of openings 128 extending between the inner and outer surfaces 126-1, 126-2, and a sidewall 127 extending outward from the inner surface 126-1. The openings 128 may be substantially similar to the openings 28 shown in FIGS. 1 and 2 and may comprise a diameter and a length (not labeled), in which the length of individual openings 128 is defined by a distance between the inner and outer surfaces 126-1, 126-2 of the cap 126. The openings 128 may also comprise a cross-sectional area. A front chamber 122 is defined between the speaker 112 and the first end 116-1 of the housing 116. The housing 116 may further comprise a cover and/or speaker enclosure (not shown; may be similar to the cover 20 and/or speaker enclosure 18 shown in FIG. 2) that receives and encloses the speaker 112. In the example shown, the cap 126 may be a separate component that is received in or otherwise coupled to the cover and/or speaker enclosure. In other examples, the cap 126 may be part of the cover and/or speaker enclosure. A rear chamber (not shown; see FIG. 2) may be formed between the speaker 112 and a second end (not shown; see FIG. 1) of the housing 116.

In the devices 10, 110 shown in FIGS. 1-4, the front chamber 22, 122 may be in fluid communication with an outside environment via the plurality of openings 28, 128. An electronic audio signal, which could be a wireless audio signal, may be supplied to the device 10, specifically to the speaker 12, which converts the audio signal to sound in the form of acoustic waves. The electronic audio signal passes through the coil 15 causing an electro-magnetic field to be produced, which interacts with a field produced by the magnet 13, causing the coil 15 and the diaphragm 14, which is attached to the coil 15, to move together. Movement of the diaphragm 14 causes a disturbance in the air surrounding it and thus produces acoustic waves. The acoustic waves generated by the speaker 12, 112 generally travel in a direction indicated by arrow A in FIGS. 2 and 4 toward the first end 16-1, 116-1 of the housing 16, 116 and exit the housing 16, 116 through the openings 28, 128. Besides the openings 28, 128, the front chamber 20 22, 122 is otherwise acoustically sealed. Sealing of the front chamber 22, 122 ensures that the acoustic waves generated by the speaker 12, 112 exit only through the openings 28, 128 and prevents leakage of acoustic waves between the speaker 12, 112 and the housing 16, 116. The speaker 12, 112 may comprise a sealing element 30, 130 such as a gasket that provides a seal between the speaker 12, 112 and the housing 16, 116. As shown in FIG. 2, the device 10 may include a second sealing element 32 such as a gasket positioned between the grill 26 and the speaker enclosure 18 and/or cover 20 to prevent acoustic leaks between the grill 26, the speaker enclosure 18, and/or cover 20. The device 110 shown in FIG. 3 may eliminate the need for a second sealing element, as the sidewalls 127 of the cap 126 serve to acoustically seal the front chamber 122.

The speaker 12, 112 may be a security alarm speaker. Such a security alarm speaker 12, 112 may comprise a stand-alone speaker used in a security system for generating an alarm tone and, preferably, audible speech. One example of a security alarm speaker 12, 112 is an electrodynamic speaker. It is also contemplated that a security alarm speaker constructed in accordance with the present disclosure may be incorporated within any other security system device, such as smoke alarms, medical devices with alarms, cameras with alarms, and the like.

The electronic audio signal may comprise an alarm signal when it has a value or magnitude causing the speaker 12, 112 to generate an output comprising an alarm tone. In other examples, alternatively or in addition, the audio signal may comprise a speech signal when it has a value or magnitude causing the speaker 12, 112 to generate an output comprising, or otherwise in the form of, audible speech. The speech signal may correspond to human speech (live or recorded) or speech synthesized by a computer system. In one particular example, the audio signal may comprise an alarm signal and/or a speech signal such that the output generated by the speaker 12, 112 comprises an alarm tone and/or speech. Human speech typically has a frequency that falls within a range from 400 Hz to 4.0 kHz. Alarm tones typically have a frequency that fall within a range from 2.0 kHz to 4.0 kHz.

When the diaphragm 14, 114 vibrates, acoustic waves are generated in the front chamber 22, 122 and vent or otherwise escape through the plurality of openings 28, 128. An air volume in the front chamber 22, 122 acts as an acoustic spring, and air within the plurality of openings 28, 128 acts as an acoustic mass, which collectively create a resonator, specifically a Helmholtz resonator, as part of the device 10, 110.

Speaker devices often seek to avoid the effects produced by a Helmholtz resonator, which generally causes one or more peaks in the output, i.e., sound pressure output, of the device at certain frequencies and a reduction in output at frequencies higher than the Helmholtz resonance frequency. These peaks are typically undesirable, and speaker devices are typically designed to have a resonance frequency of the resonator as high as possible so that the resonance frequency of the device is outside of the frequency bandwidth of the speaker output.

In accordance with the present disclosure, the device 10, 110 is designed to comprise a Helmholtz resonator. The resonance frequency or frequency range of the Helmholtz resonator of the device 10, 110 is tuned to match the frequency or frequency range of the output of the speaker 12, 112 when the speaker 12, 112 is generating the alarm tone, thereby increasing a sound pressure level of the output of the device 10, 110 when the speaker 12, 112 is generating the alarm tone. By doing so, the sound pressure level of the output of the device 10, 110 when generating an alarm tone can be increased without further costs that derive from changing components of the device 10, 110, as discussed further below.

Designing the resonance frequency or frequency range of the Helmholtz resonator to match that of the alarm tone may be achieved by designing/configuring/adjusting one or more parameters of the device 10, 110. In some examples, these parameters may include the volume of the front chamber 22, 122 and one or more dimension(s) of the openings 28, 128, specifically the diameter D of the openings 28, 128. Additional parameters may include, but are not limited to, other dimensions of the openings 28, 128, such as the length L; a total number of the openings 28, 128; and a percent open area (calculated by multiplying the number of openings 28, 128 by the cross-sectional area of the openings 28, 128 and dividing by a cross-sectional area of the diaphragm 14, 114). Hence, the openings 28, 128 may be sized to generate, with the front chamber 22, 122, the peak output of the device 10, 110 when the speaker 12, 112 is generating the alarm tone. In particular, the housing 16, 116 (i.e., the front chamber 22, 122 and the openings 28, 128) may be dimensioned to create a Helmholtz resonator having a resonance frequency or a narrow resonance frequency range that falls within or matches at least a portion of the frequency range of the output of the speaker when generating an alarm tone, such that the resonator is able to selectively increase a sound pressure level of the acoustic waves output by the device 10, 110 within this portion of the frequency range of the output of the speaker 12, 112 corresponding to the alarm tone. This increase in sound level may be achieved without further costs or alteration of the design or capabilities of the device 10, 110, such as speaker size, battery life, etc.

A guide to provide a rough estimate of the resonance frequency of a Helmholtz resonator may be calculated using the following basic equation:

$$f_{Helm} = \frac{1}{2\pi}\sqrt{\frac{K_{Front}}{M_{Openings}}} \quad (1)$$

$K_{Front}$ is a front chamber spring stiffness and may be calculated using the following equation:

$$K_{Front} = \frac{\rho_0 c_0^2}{V} \quad (2)$$

$M_{Openings}$ is an acoustic mass of the plurality of openings 28 and may be calculated using the following equation:

$$M_{Openings} = \frac{\rho_0}{nS} L \quad (3)$$

in which:
$\rho_0$ is a density of a fluid medium, e.g., about 1.2 kg/m³ for air;
$c_0$ is a speed of sound in the fluid medium, e.g., about 345 m/s for air;
V is a volume of air in the front chamber [m³];
S is a cross-sectional area of a single opening [m²];
n is a number of openings; and
L is a length of each opening [m].

The formula for $M_{Openings}$ may be adapted to more accurately account for end effects and spacing of the openings as follows:

$$M_{Openings} = \frac{\rho_0}{\pi a^2}\left\{L + 1.7a\left(1 - \frac{a}{b}\right)\right\} \text{kg/m}^4 \quad (4)$$

in which:
L is a length of each opening [m]
a is a radius of the opening [m]; and
b is a center-to-center distance between adjacent openings [m].

Equation (4) is described in Beranek, Leo L. Beranek, and Tim J. Mellow. *Acoustics: Sound Fields and Transducers*, Academic Press, 2012, Page 130. When designing a Helmholtz resonator with a desired resonance frequency, equations (1)-(4) may be used to determine a rough estimate for one or more parameter values for the Helmholtz resonator. As discussed further below, from this starting point, one or more of the parameters from equations (1)-(4) may be adjusted/varied until final values of the one or more parameters result in a Helmholtz resonator that generates a peak output of the device 10, 110 equal to the frequency or within the frequency range of the output of the speaker 12, 112, particularly when the speaker 12, 112 generates an alarm tone. Parameters used in equations (1)-(4) are discussed below with regard to FIGS. 5-8, which simulate the effect of various parameters on a peak output sound pressure level of a device and a frequency at which the peak output sound pressure level is observed.

In some examples, the speaker 12, 112 may be an electrodynamic speaker that is capable of generating an output within a frequency range of 400 Hz to 4.0 kHz. The frequency range of the alarm tone may fall within a range from 2.0 kHz and 4.0 kHz, and in one particular example, the frequency range of the alarm tone may be from 2.5 kHz to 2.7 kHz. The Helmholtz resonator may be configured to increase the sound pressure level of the peak output of the device 10, 110 when generating an alarm tone by at least 6 decibels (dB), and preferably by 10 dB or more. Sound pressure output is typically measured in units of dBSPL (decibels relative to 20 µPa).

Figure 5:
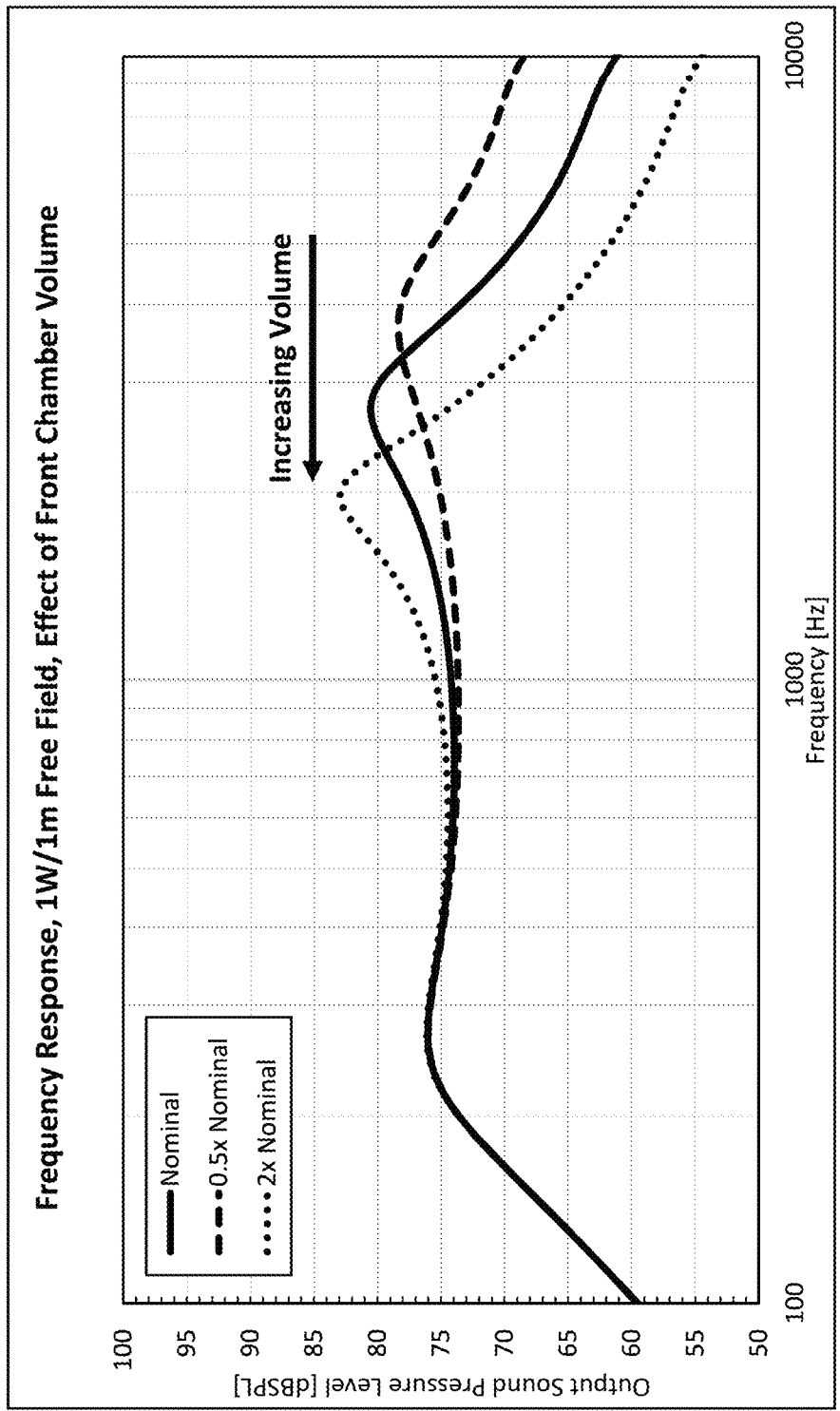
FIGS. 5-8 are graphs illustrating the effect of various parameters on output sound pressure level of a device in accordance with the present disclosure.

FIGS. 5-8 provide graphs simulating the effect of various parameters on a peak output sound pressure level of a device and a frequency at which the peak output sound pressure level is observed. FIG. 5 illustrates the effects of changing the front chamber volume while holding all other device parameters constant. As compared to a nominal or baseline level, increasing the front chamber volume (2×) decreases the frequency at which the peak output sound pressure level is observed, and decreasing the front chamber volume (0.5×) increases the frequency at which the peak output sound pressure level is observed. Increasing the front chamber volume also slightly increases the peak output sound pressure level, while decreasing the front chamber volume slightly decreases the peak output sound pressure level.

Figure 6:
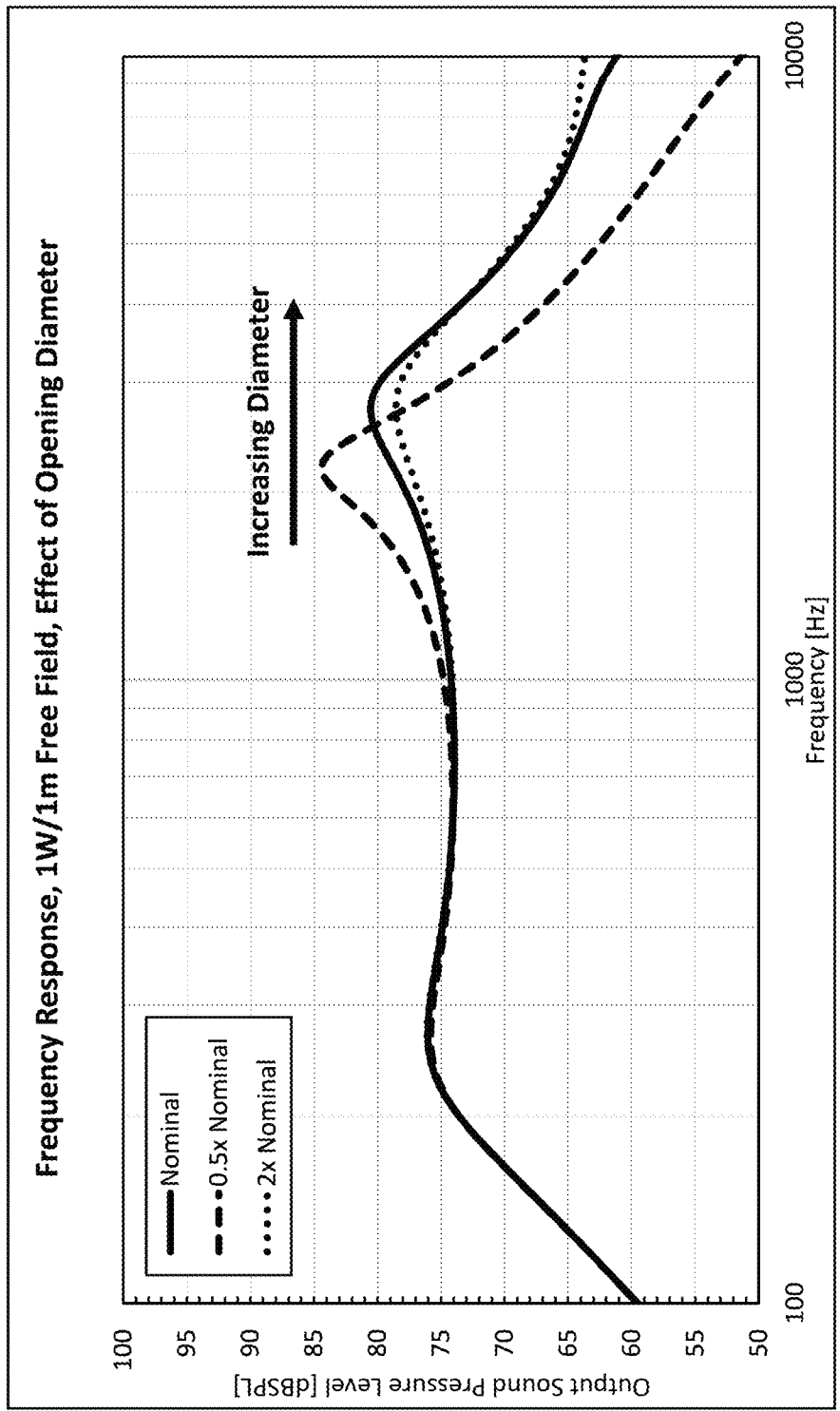

FIG. 6 illustrates the effects of changing the diameter or cross-sectional area of the openings while holding all other device parameters constant, including the number of openings provided. As compared to a nominal or baseline level, increasing the diameter of the openings slightly increases the frequency at which the peak output sound pressure level is observed, and decreasing the diameter decreases the frequency at which the peak output sound pressure level is observed. Increasing the diameter of openings also slightly decreases the peak output sound pressure level, while decreasing the diameter increases the peak output sound pressure level. It is also noted that increasing the total open area in the grill 26 or cap 126, wherein the total open area in the grill 26 or cap 126=(the total number of openings 28, 128 in the grill 26 or cap 126)×(the cross sectional area of each opening), while holding all other parameters constant, increases the frequency at which the peak output sound pressure level is observed, and decreasing the total open area in the grill 26 or cap 126 decreases the frequency at which the peak output sound pressure level is observed.

Figure 7:
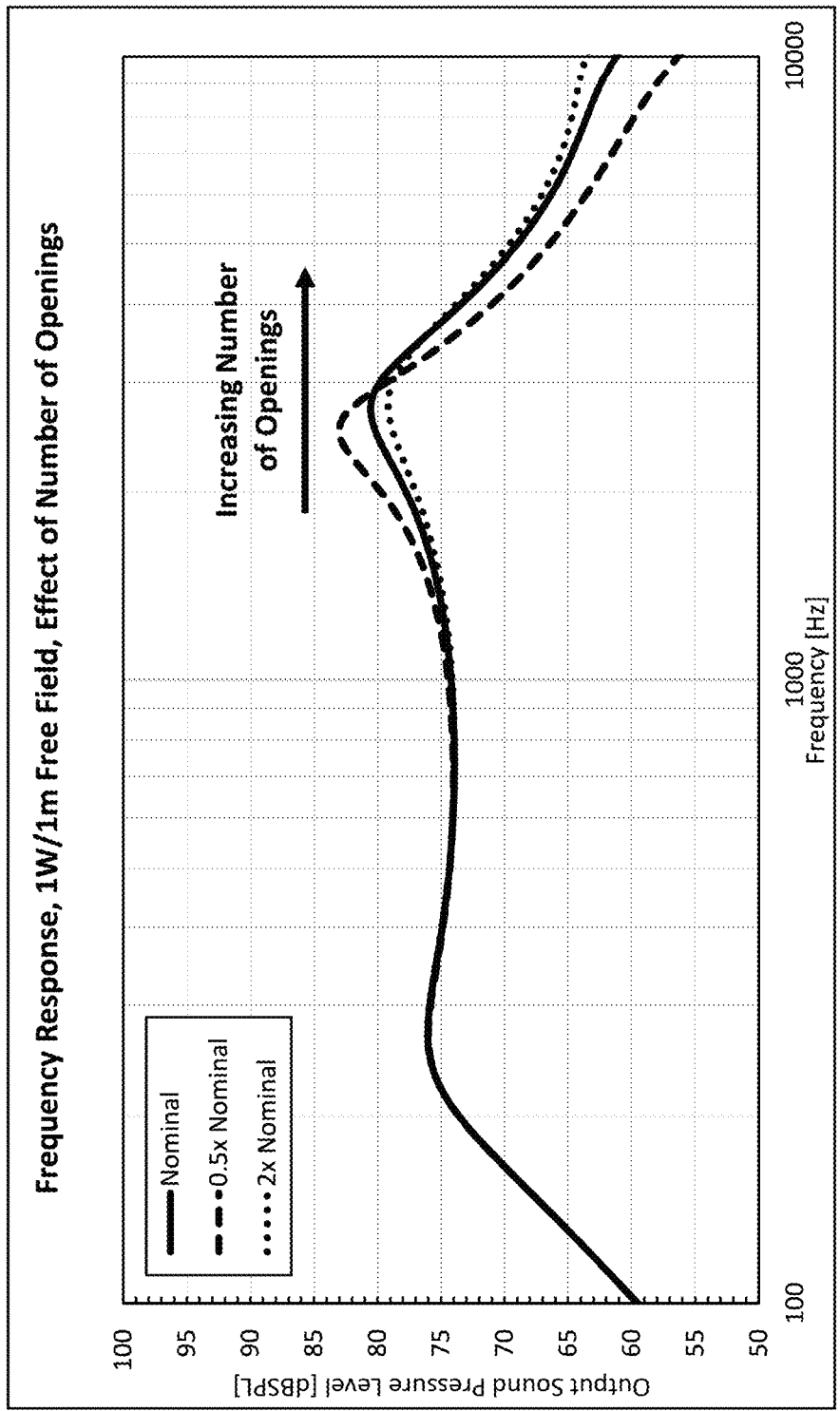

FIG. 7 illustrates the effects of changing the total number of openings while holding all other device parameters constant. As compared to a nominal or baseline level, increasing the total number of openings slightly increases the frequency at which the peak output sound pressure level is observed, and decreasing the total number of openings decreases the frequency at which the peak output sound pressure level is observed. Increasing the total number of openings also slightly decreases the peak output sound pressure level, while decreasing the total number of openings increases the peak output sound pressure level.

Figure 8:
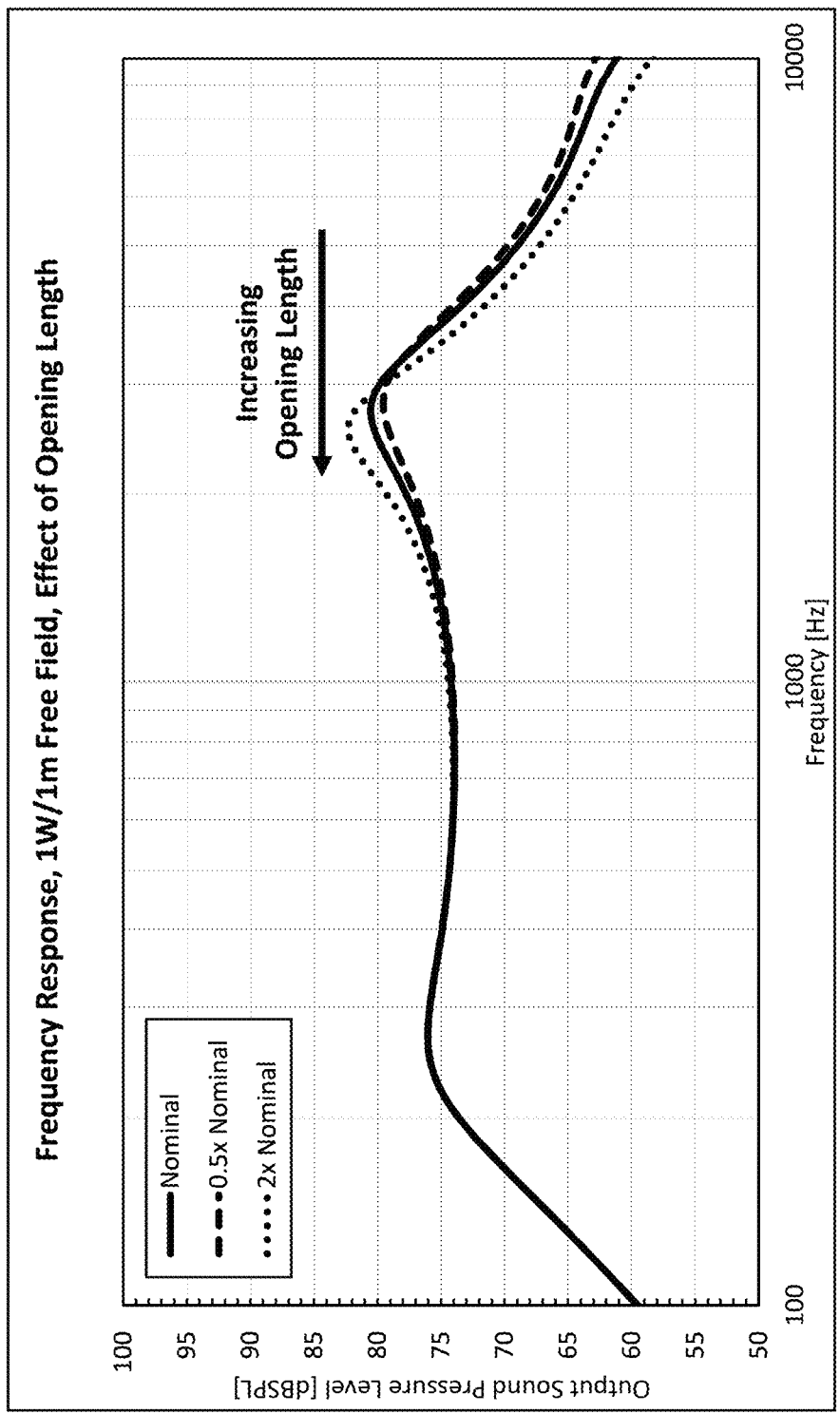

FIG. 8 illustrates the effects of the opening length while holding all other device parameters constant. As compared to a nominal or baseline level, increasing the opening length decreases the frequency at which the peak output sound pressure level is observed, and decreasing the opening length increases the frequency at which the peak output sound pressure level is observed. Increasing the opening length also increases the peak output sound pressure level, while decreasing the opening length decreases the peak output sound pressure level.

As noted above, a speaker device having a Helmholtz resonator with a desired resonance frequency may be designed using equations (1)-(4). Starting with a known, desired Helmholtz resonance frequency, such as one equal to the frequency of an alarm tone, initial values for one or more parameters of the speaker device may be determined using equations (1)-(4). Thereafter, a speaker device is built to determine if the output of the speaker device has a resonance frequency equal to or near the desired resonance frequency. If not, one or more of the parameters may be adjusted until those parameters result in a physical speaker device having the desired resonance frequency. FIGS. 5-8 provide guidance for adjusting one or more of the parameters set out in FIGS. (1)-(4). For example, as shown in FIGS. 5-8, when a resonance frequency of a speaker device is higher than the desired resonance frequency (i.e., the frequency at which the peak output sound pressure level is observed is higher than desired), the front chamber volume may be increased, the diameter and/or total number of the openings may be decreased, and/or the opening length may be increased. Also as shown in FIGS. 5-8, when the resonance frequency of the speaker device is lower than the desired resonance frequency (i.e., the frequency at which the peak output sound pressure level is observed is lower than desired), the front chamber volume may be decreased, the diameter and/or total number of the openings may be increased, and/or the opening length may be decreased. In this manner, the final values of the one or more parameters may be selected such that the Helmholtz resonator generates a peak output sound pressure level of the device that is equal to the desired frequency or within the desired frequency range, specifically a frequency or frequency range corresponding to an alarm tone.

EXAMPLES

In the following example, three devices are constructed and tested, in which the parameters of each device are as follows:

Device (1) No Gasket

Figure 9:
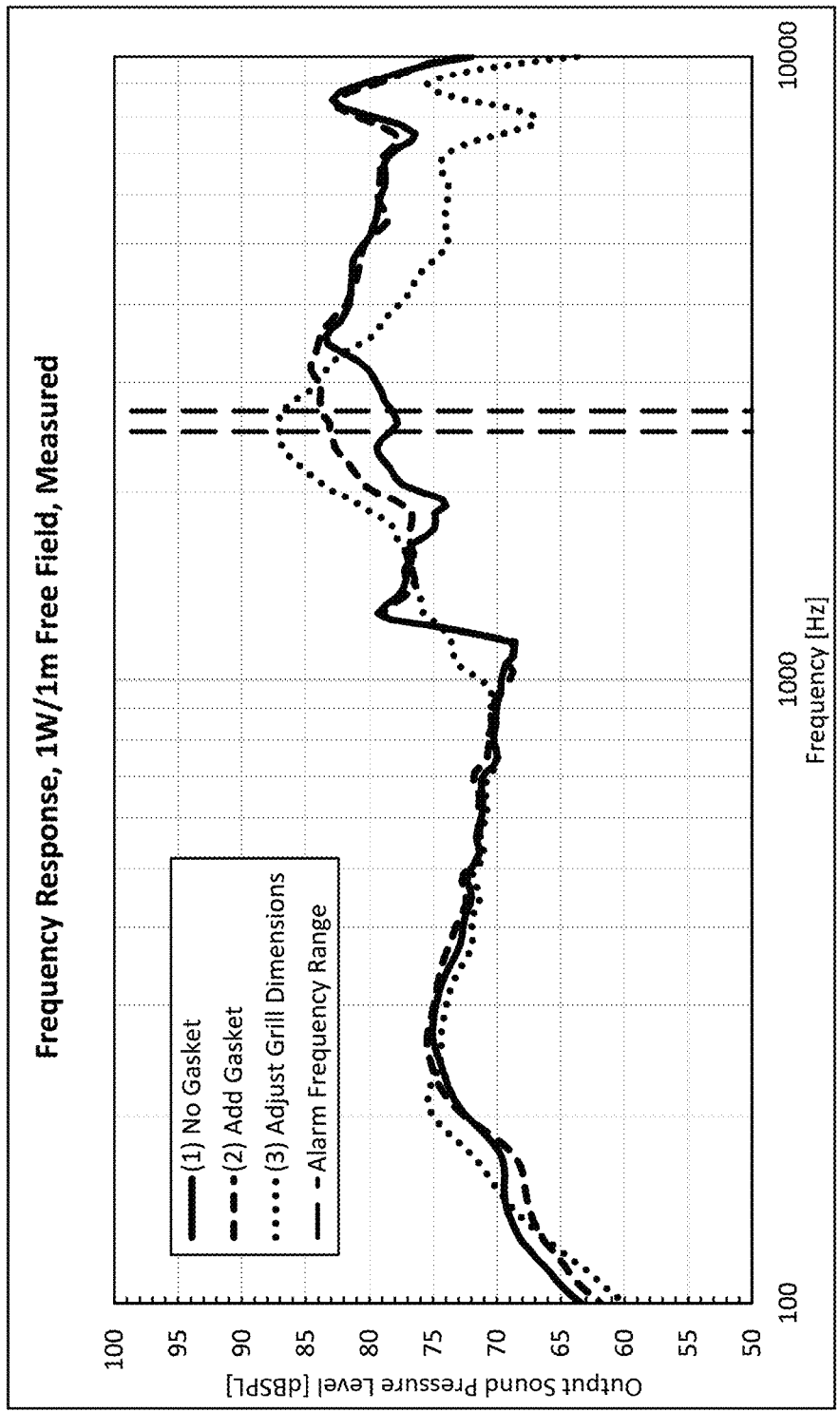
FIG. 9 is a graph illustrating an output sound pressure level of a device without a Helmholtz resonator and devices with Helmholtz resonators.

Volume of front chamber=20 cm$^3$
Number of circular openings=529
Spacing between the concentric circles of openings=2.5 mm
Spacing between openings within each concentric circle=2.0 mm
Diameter of openings=1.0 mm
Cross-sectional area of openings=0.75 mm$^2$
Length of the openings=1.6 mm
Helmholtz frequency=N/A (front chamber not sealed)
1W/1 m Sound pressure output average within alarm range: 78.1 dBSPL Device (2) Add Gasket Volume of front chamber=20 cm$^3$
Number of circular openings=529
Spacing between the concentric circles of openings=2.5 mm
Spacing between openings within each concentric circle=2.0 mm
Diameter of openings=1.0 mm
Cross-sectional area of openings=0.75 mm$^2$
Length of the openings=1.6 mm
Helmholtz frequency=3.15 kHz
1W/1 m Sound pressure output average within alarm range: 83.4 dBSPL Device (3) Adjust Grill Dimensions Volume of front chamber=20 cm$^3$
Number of circular openings=121
Spacing between the concentric circles of openings=4.2 mm
Spacing between openings within each concentric circle=3.1 mm
Diameter of openings=1.8 mm
Cross-sectional area of openings=2.54 mm$^2$
Length of the openings=3 mm
Helmholtz frequency=2.58 kHz
1 W/1 m Sound pressure output average within alarm range: 86.9 dBSPL FIG. 9 illustrates an output sound pressure level of Devices (1)-(3), which demonstrates the effects of acoustically sealing the front chamber and adjusting the number and dimensions of the openings on the sound pressure output level at a desired frequency or within a desired frequency range. The sound pressure output level is a sound pressure output average within the frequency range of an alarm when driven by a sine wave with 1 Watt RMS and measured at a distance of 1 meter from the device. The speaker used in Devices (1)-(3) is an electrodynamic speaker (Can Products Co., Ltd.; P/N: ED5040RR045WC-H27).

The solid line ("(1) No Gasket") in FIG. 9 corresponds to Device (1) above, which lacks a gasket between the speaker and the housing and does not create a Helmholtz resonator. The dashed line ("(2) Add Gasket") corresponds to Device (2) above, which is the same as Device (1) except that a gasket is added to seal the front chamber volume (see FIG. 2), such that a Helmholtz resonator is created with a resonance frequency of 3.15 kHz. The dotted line ("(3) Adjust Grill Dimensions") corresponds to Device (3) above, which is similar to Device (2) but with fewer openings. In addition, each opening in Device (3) has a greater diameter, cross-sectional area, and length, and a spacing between the concentric circles of openings and within the concentric circles is greater, as compared to the corresponding parameters of Device (2). It is believed that because the total open area in the grill of Device (3) was reduced as compared to Device (2), the resonance frequency was reduced. Device (3) includes a gasket and creates a Helmholtz resonator having a lower resonance frequency of 2.58 kHz. A desired frequency range of 2.5 kHz to 2.7 kHz, i.e., the frequency range of an alarm tone, is indicated with vertical dashed lines in FIG. 9.

It can be seen in FIG. 9 that Device (1) demonstrates the lowest average sound pressure output level (78.1 dBSPL) of the three devices within the desired frequency range of 2.5 kHz to 2.7 kHz. In addition, the average sound pressure output level of Device (1) within the range of 2.5 kHz to 2.7 kHz decreases slightly, as compared to adjacent frequencies, and the peak sound pressure output level of Device (1) occurs outside the desired frequency range. Adding the gasket in Device (2) to create a Helmholtz resonator results in an increase in the average sound pressure output level (83.4 dBSPL) within the desired frequency range of 2.5 kHz to 2.7 kHz, as compared to Device (1). However, the peak sound pressure output level of Device (2) still occurs outside the desired frequency range. Adding the gasket and adjusting the number and dimensions of the openings in Device (3)

results in a further increase in the average sound pressure output level (86.9 dBSPL) within the desired frequency range of 2.5 kHz to 2.7 kHz, as compared to Device (2). It can also be seen that the peak sound pressure output level of Device (3) occurs within the desired frequency range.

Another device in accordance with the present disclosure is constructed and tested, in which the parameters of the device are as follows:

Device (4)

Figure 10:
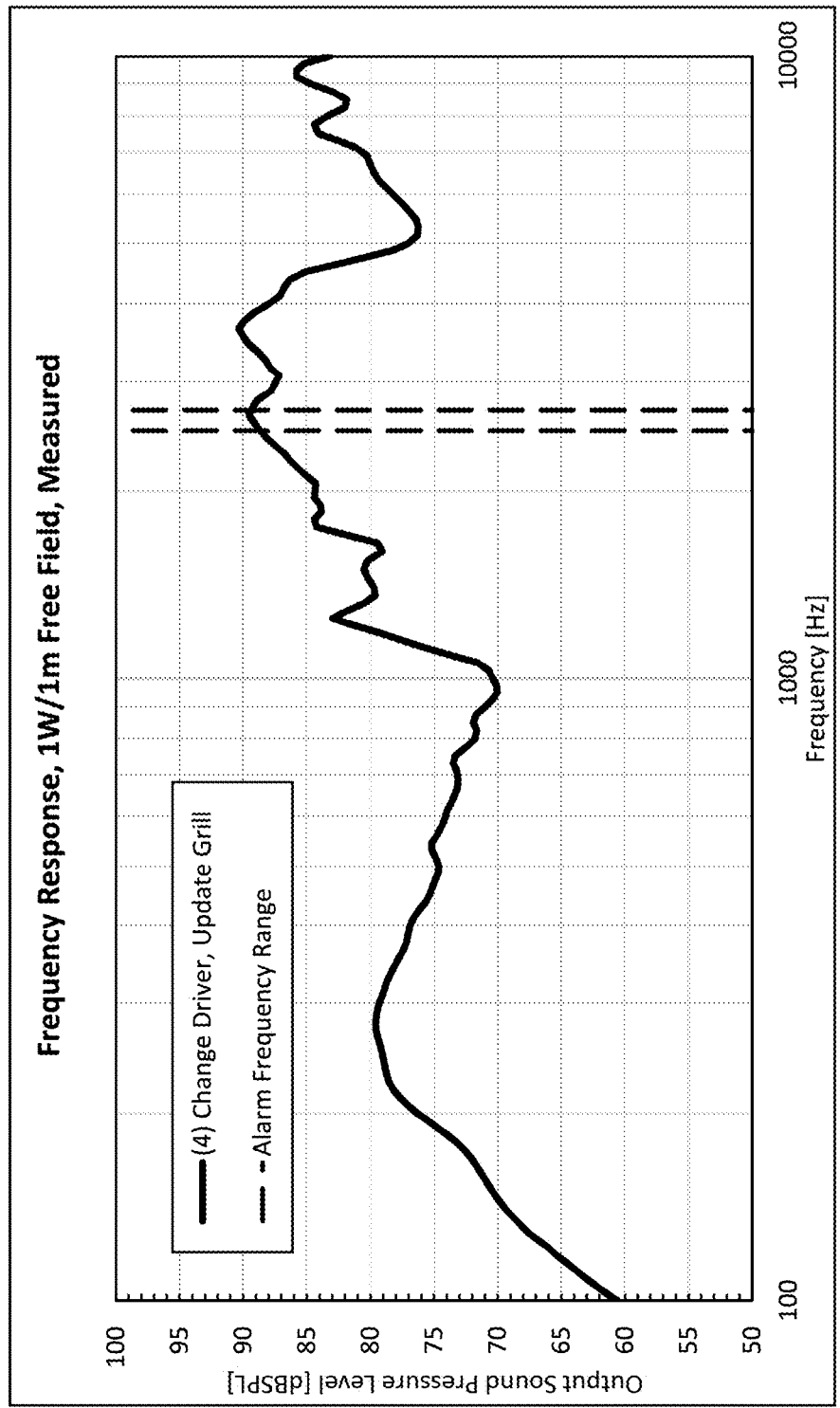
FIG. 10 is a graph illustrating performance of another device in accordance with the present disclosure.

Volume of front chamber=20 cm$^3$
Number of circular openings=225
Spacing between the concentric circles of openings=3.3 mm
Spacing between openings within each concentric circle =2.6 mm
Diameter of openings=1.6 mm
Cross-sectional area of openings=2.0 mm$^2$
Length of the openings=1.6 mm
Helmholtz frequency=2.65 kHz
1 W/1 m Sound pressure output average within alarm range: 89.2 dBSPL Device (4) is similar to Device (3) and includes a gasket to acoustically seal the front chamber. The speaker used in Device (4) is an electrodynamic speaker (Ole Wolff; P/N: OWS-5026TA-4A). FIG. 10 illustrates an output sound pressure level of Device (4). A desired frequency range of 2.5 kHz to 2.7 kHz, i.e., the frequency range of an alarm tone, is indicated with vertical dashed lines in FIG. 10. It can be seen that the parameters of Device (4) result in an increase in the average sound pressure output level (89.2 dBSPL) within the desired frequency range of 2.5 kHz to 2.7 kHz, as compared to adjacent frequencies.

Figure 11:
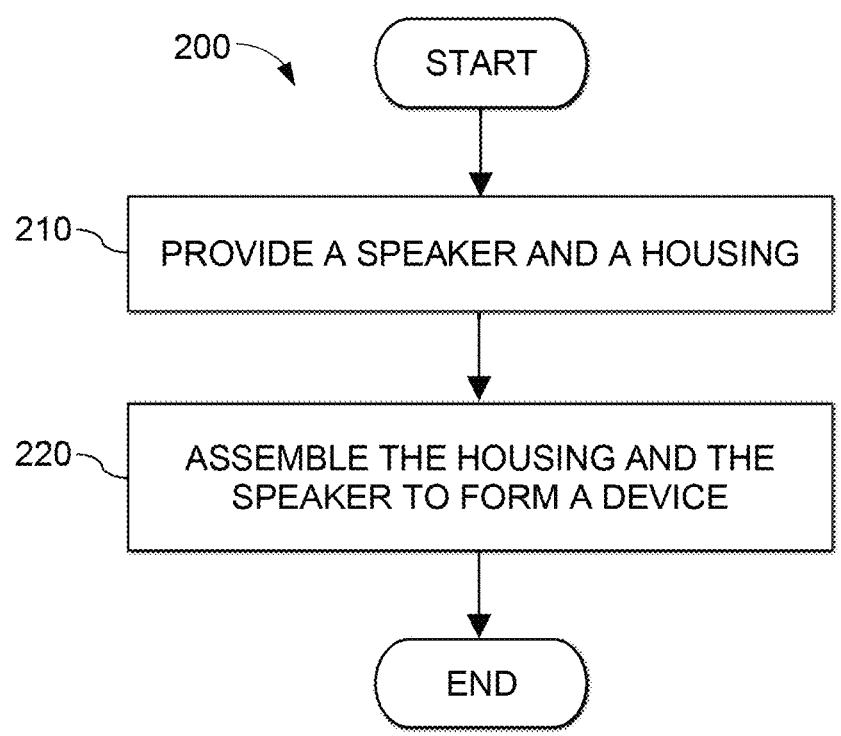
FIGS. 11 and 12 are flowcharts illustrating methods in accordance with the present disclosure.
Figure 12:
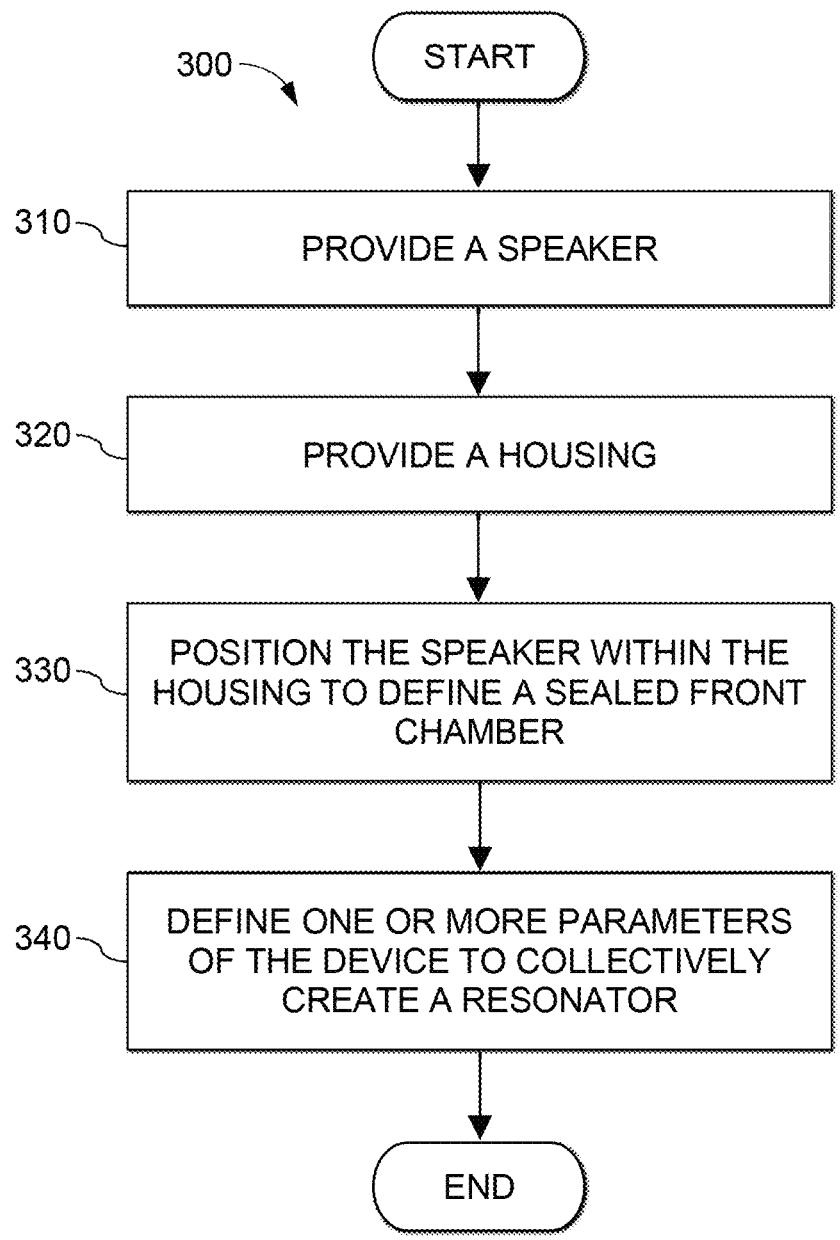

FIGS. 11 and 12 are flowcharts illustrating methods in accordance with the present disclosure. FIG. 11 illustrates a method 200 for assembling a device, the method 200 comprising providing a speaker and a housing at 210. The speaker may include a diaphragm and may be configured to generate sound. The housing may comprise a plurality of openings within one portion. At 220, the housing and the speaker are assembled to form the device such that the housing encloses the speaker and the speaker is positioned within the housing to define a front chamber between the diaphragm and the one portion. With reference to FIG. 1, in one example, the device 10 may be formed by disposing the speaker 12 in the housing 16, specifically the speaker enclosure 18, such that the housing 16 encloses the speaker 12; mounting the grill 26 to the cover 20; and placing the cover 20 and the grill 26 over the speaker enclosure 18. When the speaker is disposed in the housing 16, the speaker may be positioned relative to a portion, i.e., the first end 16-1, of the housing to define the front chamber 22. In the example shown, a base 36 receives the housing 16. As described herein, the plurality of openings may be sized to collectively generate, with the front chamber, an increased output of the device within a frequency range of an output of the speaker corresponding to an alarm tone. The method 200 may then conclude.

The method 200 may optionally further comprise dimensioning the housing such that the front chamber and the plurality of openings create a resonator having a resonance frequency within the frequency range of the alarm tone to selectively increase a sound pressure level of the output of the device corresponding to the alarm tone, as described herein with respect to, for example, FIGS. 5-8.

In some examples, the speaker may comprise an electrodynamic speaker capable of generating an output within a frequency range of from 400 Hz to 4.0 kHz. In other examples, the increased output of the device may comprise a peak output of the device within the frequency range of the output of the speaker corresponding to the alarm tone.

The method 200 may optionally further comprise acoustically sealing the front chamber as described herein such that acoustic waves generated by the speaker are directed only through the plurality of openings. In particular, configuring the housing may include adding a gasket to acoustically seal the front chamber.

The method 200 may optionally further comprise configuring the housing and the speaker such that a sound pressure level of the output of the speaker is increased by at least 6 dB, as described herein.

FIG. 12 illustrates a method 300 comprising providing a speaker at 310 and providing a housing at 320, in which the speaker includes a diaphragm and the housing is for enclosing the speaker and includes a plurality of openings within one portion of the housing. At 330, the speaker is positioned within the housing to define a sealed front chamber between the diaphragm and the one portion, as described herein, in which the speaker and the housing define a device. At 340, one or more parameters of the device are defined to collectively create a resonator having a resonance frequency matching at least a portion of a frequency range of an output of the speaker corresponding to an alarm tone, as described herein with respect to, for example, FIGS. 5-8. The method 300 may then conclude.

In some examples, the speaker may comprise an electrodynamic speaker, the frequency range of the output of the speaker may be from 400 Hz to 4.0 kHz, and the output of the speaker corresponding to the alarm tone may fall within a range from 2.0 kHz to 4.0 kHz.

The one or more parameters may comprise a volume of the front chamber, and the method 300 may optionally further comprise increasing the volume of the front chamber when the resonance frequency is to be decreased and decreasing the volume of the front chamber when the resonance frequency is to be increased, as described herein.

The one or more parameters may comprise a cross-sectional area of each of the openings, and the method 300 may optionally further comprise decreasing the cross-sectional area of the openings when the resonance frequency is to be decreased and increasing the cross-sectional area of the openings when the resonance frequency is to be increased, as described herein.

Figure 13:
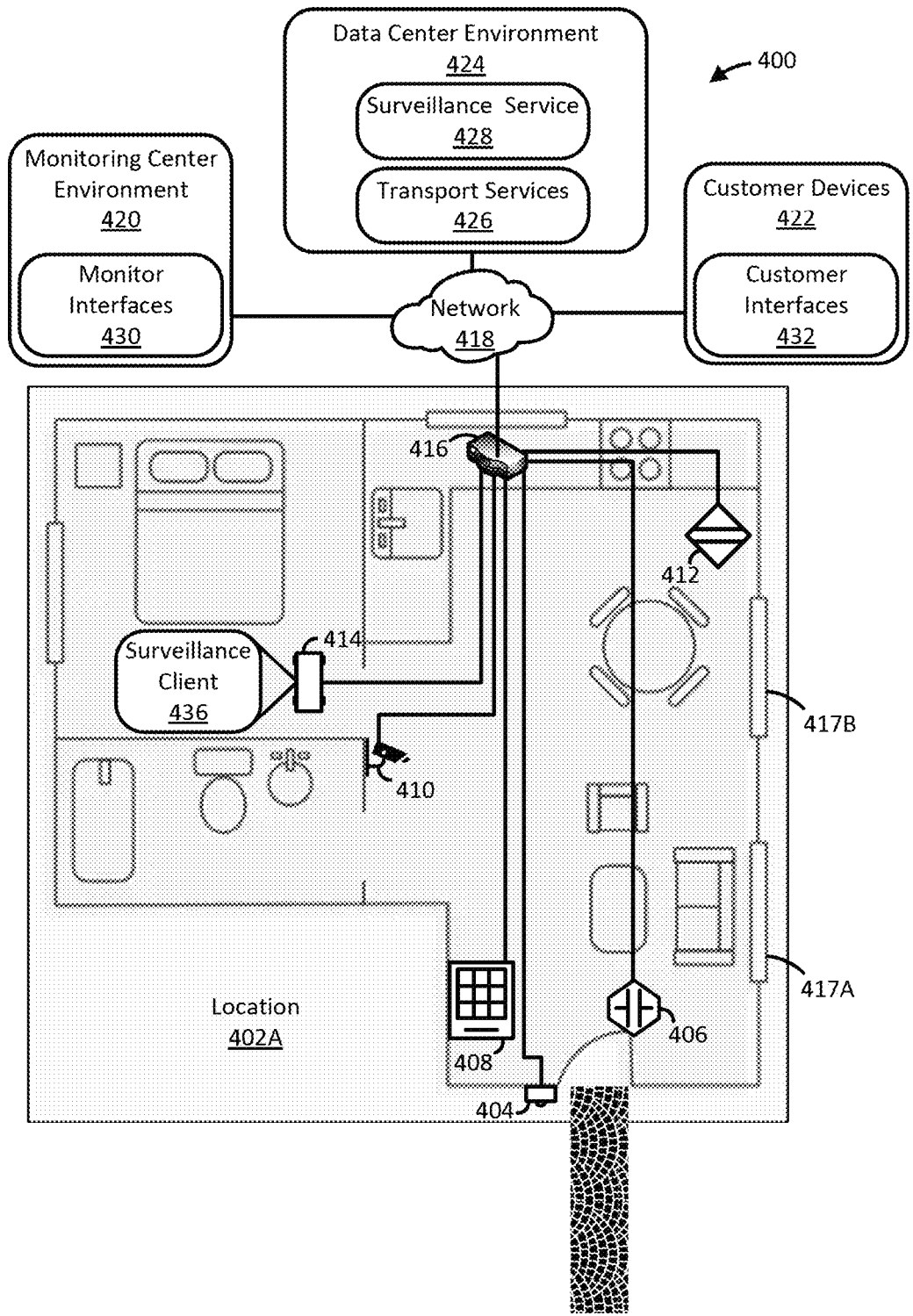
FIG. 13 is a schematic diagram of a security system, according to some examples described herein.

In some examples, a device in accordance with the present disclosure may be part of a security system. FIG. 13 is a schematic diagram of a security system 400 configured to establish and utilize zones in accordance with some examples. As shown in FIG. 13, the system 400 includes a monitored location 402A, a monitoring center environment 420, a data center environment 424, one or more customer devices 422, and a communication network 418. Each of the monitored location 402A, the monitoring center 420, the data center 424, the one or more customer devices 422, and the communication network 418 include one or more computing devices (e.g., as described below with reference to FIG. 17). The one or more customer devices 422 are configured to host one or more customer interface applications 432. The monitoring center environment 420 is configured to host one or more monitor interface applications 430. The data center environment 424 is configured to host a surveillance service 428 and one or more transport services 426. The location 402A includes image capture devices 404 and 410, a contact sensor assembly 406, a keypad 408, a motion sensor assembly 412, a base station 414, and a router 416. The base station 414 hosts a surveillance client 436.

In some examples, the router 416 is a wireless router that is configured to communicate with the devices disposed in the location 402A (e.g., devices 404, 406, 408, 410, 412, and 414) via communications that comport with a communications standard such as any of the various Institute of Electrical and Electronics Engineers (IEEE) 108.11 standards. As illustrated in FIG. 13, the router 416 is also configured to communicate with the network 418. It should be noted that the router 416 implements a local area network (LAN) within and proximate to the location 402A by way of example only. Other networking technology that involves other computing devices is suitable for use within the location 402A. For instance, in some examples, the base station 414 can receive and forward communication packets transmitted by the image capture device 410 via a point-to-point personal area network (PAN) protocol, such as BLUETOOTH. Other wired, wireless, and mesh network technology and topologies will be apparent with the benefit of this disclosure and are intended to fall within the scope of the examples disclosed herein.

Continuing with the example of FIG. 13, the network 418 can include one or more public and/or private networks that support, for example, internet protocol (IP). The network 418 may include, for example, one or more LANs, one or more PANs, and/or one or more wide area networks (WANs). The LANs can include wired or wireless networks that support various LAN standards, such as a version of IEEE 108.11 and the like. The PANs can include wired or wireless networks that support various PAN standards, such as BLUETOOTH, ZIGBEE, and the like. The WANs can include wired or wireless networks that support various WAN standards, such as Code Division Multiple Access (CDMA), Global System for Mobiles (GSM), and the like. The network 418 connects and enables data communication between the computing devices within the location 402A, the monitoring center environment 420, the data center environment 424, and the customer devices 422. In at least some examples, both the monitoring center environment 420 and the data center environment 424 include network equipment (e.g., similar to the router 416) that is configured to communicate with the network 418 and computing devices collocated with or near the network equipment.

Continuing with the example of FIG. 13, the data center environment 424 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 424 can be dedicated to the security system 400, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 13, the data center environment 424 is configured to host the surveillance service 428 and the transport services 426.

Continuing with the example of FIG. 13, the monitoring center environment 420 can include a plurality of computing devices (e.g., desktop computers) and network equipment (e.g., one or more routers) connected to the computing devices and the network 418. The customer devices 422 can include personal computing devices (e.g., a desktop computer, laptop, tablet, smartphone, or the like) and network equipment (e.g., a router, cellular modem, cellular radio, or the like). As illustrated in FIG. 13, the monitoring center environment 420 is configured to host the monitor interfaces 430 and the customer devices 422 are configured to host the customer interfaces 432.

Continuing with the example of FIG. 13, the devices 404, 406, 410, and 412 are configured to acquire analog signals via sensors incorporated into the devices, generate digital sensor data based on the acquired signals, and communicate (e.g. via a wireless link with the router 416) the sensor data to the base station 414. The type of sensor data generated and communicated by these devices varies along with the type of sensors included in the devices. For instance, the image capture devices 404 and 410 can acquire ambient light, generate frames of image data based on the acquired light, and communicate the frames to the base station 414, although the pixel resolution and frame rate may vary depending on the capabilities of the devices. In some examples, the image capture devices 404 and 410 can also receive and store filter zone configuration data and filter the frames using one or more filter zones prior to communicating the frames to the base station 414. As shown in FIG. 13, the image capture device 404 has an FOV that originates proximal to a front door of the location 402A and can acquire images of a walkway, highway, and a space between the location 402A and the highway. The image capture device 410 has an FOV that originates proximal to a bathroom of the location 402A and can acquire images of a living room and dining area of the location 402A. The image capture device 410 can further acquire images of outdoor areas beyond the location 402A through windows 417A and 417B on the right side of the location 402A.

Continuing with the example of FIG. 13, the contact sensor assembly 406 includes a sensor that can detect the presence or absence of a magnetic field generated by a magnet when the magnet is proximal to the sensor. When the magnetic field is present, the contact sensor assembly 406 generates Boolean sensor data specifying a closed state. When the magnetic field is absent, the contact sensor assembly 406 generates Boolean sensor data specifying an open state. In either case, the contact sensor assembly 406 can communicate sensor data indicating whether the front door of the location 402A is open or closed to the base station 414. The motion sensor assembly 412 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 412 generates Boolean sensor data specifying a still state. When the audio sensor does not detect a reflection because an object is in motion within the monitored space, the motion sensor assembly 412 generates Boolean sensor data specifying an alert state. In either case, the motion sensor assembly 412 can communicate the sensor data to the base station 414. It should be noted that the specific sensing modalities described above are not limiting to the present disclosure. For instance, as one of many potential examples, the motion sensor assembly 412 can base its operation on acquisition of changes in temperature rather than changes in reflected sound waves.

Continuing with the example of FIG. 13, the keypad 408 is configured to interact with a user and interoperate with the other devices disposed in the location 402A in response to interactions with the user. For instance, in some examples, the keypad 408 is configured to receive input from a user that specifies one or more commands and to communicate the specified commands to one or more addressed devices or processes. These addressed devices or processes can include one or more of the devices disposed in the location 402A and/or one or more of the monitor interfaces 430 or the surveillance service 428. The commands can include, for example, codes that authenticate the user as a resident of the location 402A and/or codes that request activation or deactivation of one or more of the devices disposed in the location 402A. Alternatively or additionally, in some examples, the keypad 408 includes a user interface (e.g., a tactile interface, such as a set of physical buttons or a set of virtual buttons on a touchscreen) configured to interact with a user (e.g., receive input from and/or render output to the user). Further still, in some examples, the keypad 408 can receive responses to the communicated commands and render the responses via the user interface as visual or audio output.

Continuing with the example of FIG. 13, the base station 414 is configured to interoperate with other security system devices disposed at the location 402A to provide local command and control and store-and-forward functionality via execution of the surveillance client 436. In some examples, to implement store-and-forward functionality, the base station 414, through execution of the surveillance client 436, receives sensor data, packages the data for transport, and stores the packaged sensor data in local memory for subsequent communication. This communication of the packaged sensor data can include, for instance, transmission of the packaged sensor data as a payload of a message to one or more of the transport services 426 when a communication link to the transport services 426 via the network 418 is operational. In some examples, packaging the sensor data can include filtering the sensor data using one or more filter zones and/or generating one or more summaries (maximum values, average values, changes in values since the previous communication of the same, etc.) of multiple sensor readings. To implement local command and control functionality, the base station 414 executes a variety of programmatic operations through execution of the surveillance client 436 in response to various events. Examples of these events can include reception of commands from the keypad 408, reception of commands from one of the monitor interfaces 430 or the customer interface application 432 via the network 418, or detection of the occurrence of a scheduled event. The programmatic operations executed by the base station 414 via execution of the surveillance client 436 in response to events can include activation or deactivation of one or more of the devices 404, 406, 408, 410, and 412; sounding of an alarm, e.g., in response to receiving an audio signal; reporting an event to the surveillance service 428; and communicating location data to one or more of the transport services 426 to name a few operations. The location data can include data specifying sensor readings (sensor data), configuration data of any of the devices disposed at the location 402A, commands input and received from a user (e.g., via the keypad 408 or a customer interface 432), or data derived from one or more of these data types (e.g., filtered sensor data, summarizations of sensor data, event data specifying an event detected at the location via the sensor data, etc.).

Continuing with the example of FIG. 13, the transport services 426 are configured to receive messages from monitored locations (e.g., the location 402A), parse the messages to extract payloads included therein, and store the payloads and/or data derived from the payloads within one or more data stores hosted in the data center environment 424. In some examples, the transport services 426 expose and implement one or more application programming interfaces (APIs) that are configured to receive, process, and respond to calls from base stations (e.g., the base station 414) via the network 418. Individual instances of a transport service within the transport services 426 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation and/or extensible markup language. These API calls are addressed to one or more uniform resource locators (URLs) that are API endpoints monitored by the transport services 426. In some examples, portions of the HTTP communications are encrypted to increase security. Alternatively or additionally, in some examples, the API is implemented as a .NET web API that responds to HTTP posts to particular URLs. Alternatively or additionally, in some examples, the API is implemented using simple file transfer protocol commands. Thus, the APIs as described herein are not limited to any particular implementation.

Continuing with the example of FIG. 13, the surveillance service 428 is configured to control overall logical setup and operation of the system 400. As such, the surveillance service 428 can interoperate with the transport services 426, the monitor interfaces 430, the customer interfaces 432, and any of the devices disposed at the location 402A via the network 418. In some examples, the surveillance service 428 is configured to monitor data from a variety of sources for reportable events (e.g., a break-in event) and, when a reportable event is detected, notify one or more of the monitor interfaces 430 and/or the customer interfaces 432 of the reportable event. In some examples, the surveillance service 428 is also configured to maintain state information regarding the location 402A. This state information can indicate, for instance, whether the location 402A is safe or under threat. In certain examples, the surveillance service 428 is configured to change the state information to indicate that the location 402A is safe only upon receipt of a communication indicating a clear event (e.g., rather than making such a change in response to discontinuation of reception of break-in events). This feature can prevent a "crash and smash" robbery from being successfully executed. In addition, in some examples, the surveillance service 428 is configured to setup and utilize zones. Such setup of the zones can include interacting with monitoring personnel via the monitor interfaces 430, interacting with a customer via a customer interface 432, and/or executing autonomous zone recommendation processes as described herein.

Continuing with the example of FIG. 13, individual monitor interfaces 430 are configured to control computing device interaction with monitoring personnel and to execute a variety of programmatic operations in response to the interactions. For instance, in some examples, the monitor interface 430 controls its host device to provide information regarding reportable events detected at monitored locations, such as the location 402A, to monitoring personnel. Such events can include, for example, movement within an intruder zone or outside a filter zone. Alternatively or additionally, in some examples, the monitor interface 430 controls its host device to interact with a user to configure features of the system 400, such as one or more monitor zones.

Continuing with the example of FIG. 13, individual customer interfaces 432 are configured to control computing device interaction with a customer and to execute a variety of programmatic operations in response to the interactions. For instance, in some examples, the customer interface 432 controls its host device to provide information regarding reportable events detected at monitored locations, such as the location 402A, to the customer. Such events can include, for example, movement within an intruder zone or outside a filter zone. Alternatively or additionally, in some examples, the customer interface 432 is configured to process input received from the customer to activate or deactivate one or more of the devices disposed within the location 402A. Further still, in some examples, the customer interface 432 configures features of the system 400, such as one or more customer zones, in response to input from a user.

Figure 14:
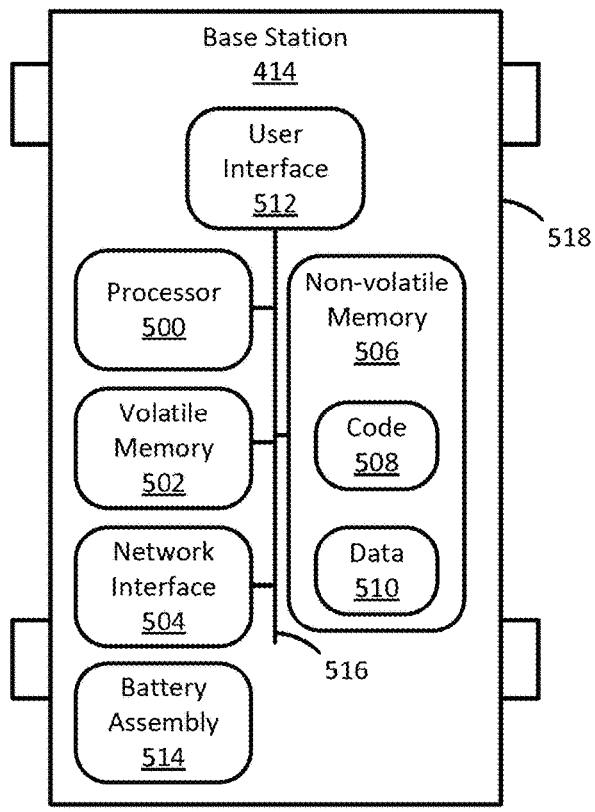
FIG. 14 is a schematic diagram of a base station, according to some examples described herein.

Turning now to FIG. 14, an example base station 414 is schematically illustrated. A device 10, 110 in accordance with the present disclosure may comprise or be included as part of the base station 414. As shown in FIG. 14, the base station 414 includes at least one processor 500, volatile memory 502, non-volatile memory 506, at least one network interface 504, a user interface 512, a battery 514, and an interconnection mechanism 516. The non-volatile memory 506 stores executable code 508 and includes a data store 510. In some examples illustrated by FIG. 14, the features of the base station 414 enumerated above are incorporated within, or are a part of, a housing 518.

In some examples, the non-volatile (non-transitory) memory 506 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 508 stored in the non-volatile memory can include an operating system and one or more applications or programs that are configured to execute under the operating system. Alternatively or additionally, the code 508 can include specialized firmware and embedded software that is executable without dependence upon a commercially available operating system. Regardless, execution of the code 508 can implement the surveillance client 436 of FIG. 13 and can result in manipulated data that is a part of the data store 510.

Continuing the example of FIG. 14, the processor 500 can include one or more programmable processors to execute one or more executable instructions, such as a computer program specified by the code 508, to control the operations of the base station 414. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 502) and executed by the circuitry. In some examples, the processor 500 is a digital processor, but the processor 500 can be analog, digital, or mixed. As such, the processor 500 can execute the function, operation, or sequence of operations using digital values and/or using analog signals. In some examples, the processor 500 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 500 that are multicore can provide functionality for parallel, simultaneous execution of instructions or for parallel, simultaneous execution of one instruction on more than one piece of data.

Continuing with the example of FIG. 14, prior to execution of the code 508 the processor 500 can copy the code 508 from the non-volatile memory 506 to the volatile memory 502. In some examples, the volatile memory 502 includes one or more static or dynamic random access memory (RAM) chips and/or cache memory (e.g. memory disposed on a silicon die of the processor 500). Volatile memory 502 can offer a faster response time than a main memory, such as the non-volatile memory 506.

Through execution of the code 508, the processor 500 can control operation of the network interface 504. For instance, in some examples, the network interface 504 includes one or more physical interfaces (e.g., a radio, an ethernet port, a universal serial bus (USB) port, etc.) and a software stack including drivers and/or other code 508 that is configured to communicate with the one or more physical interfaces to support one or more LAN, PAN, and/or WAN standard communication protocols. The communication protocols can include, for example, transmission control protocol (TCP) and user datagram protocol (UDP) among others. As such, the network interface 504 enables the base station 414 to access and communicate with other computing devices (e.g., the other devices disposed in the location 402A of FIG. 13) via a computer network (e.g., the LAN established by the router 416 of FIG. 13, the network 418 of FIG. 13, and/or a point-to-point connection). For instance, in at least one example, the network interface 504 utilizes sub-GHz wireless networking to transmit wake messages to the other computing devices to request streams of sensor data.

Through execution of the code 508, the processor 500 can control operation of hardware and a software stack including drivers and/or other code 508 that is configured to communicate with other system devices. As such, the base station 414 interacts with other system components in response to received inputs. The input can specify values to be stored in the data store 510. The output can indicate values stored in the data store 510. It should be noted that, in some examples, the base station 414 may include one or more light-emitting diodes (LEDs) to visually communicate information, such as system status or alarm events. Alternatively or additionally, in some examples, the base station 414 includes a 95 db siren that the processor 500 sounds to indicate that a break-in event has been detected.

Continuing with the example of FIG. 14, the various features of the base station 414 described above can communicate with one another via the interconnection mechanism 516. In some examples, the interconnection mechanism 516 includes a communications bus. In addition, in some examples, the battery assembly 514 is configured to supply operational power to the various features of the base station 414 described above. In some examples, the battery assembly 514 includes at least one rechargeable battery (e.g., one or more NiMH or lithium batteries). In some examples, the rechargeable battery has a runtime capacity sufficient to operate the base station 414 for 24 hours or longer while the base station 414 is disconnected from or otherwise not receiving line power. Alternatively or additionally, in some examples, the battery assembly 514 includes power supply circuitry to receive, condition, and distribute line power to both operate the base station 414 and recharge the rechargeable battery. The power supply circuitry can include, for example, a transformer and a rectifier, among other circuitry, to convert AC line power to DC device and recharging power.

Figure 15:
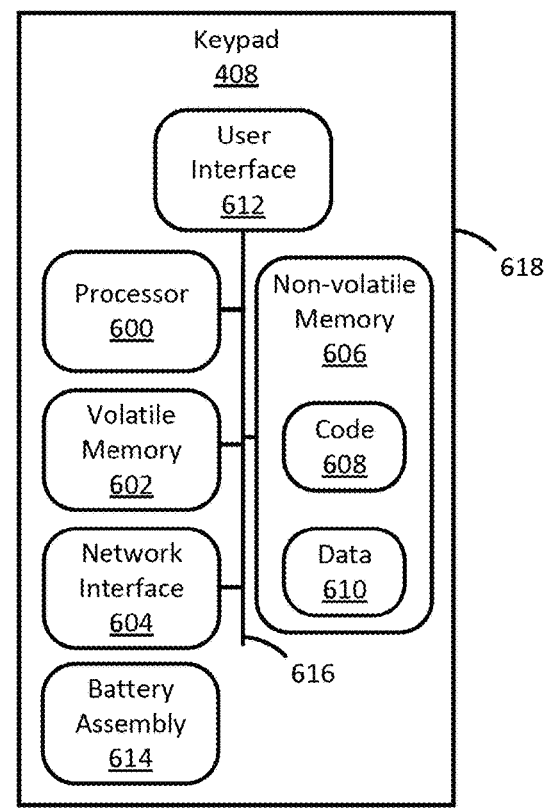
FIG. 15 is a schematic diagram of a keypad, according to some examples described herein.

Turning now to FIG. 15, an example keypad 408 is schematically illustrated. As shown in FIG. 15, the keypad 408 includes at least one processor 600, volatile memory 602, non-volatile memory 606, at least one network interface 604, a user interface 612, a battery assembly 614, and an interconnection mechanism 616. The non-volatile memory 606 stores executable code 608 and data store 610. In some examples illustrated by FIG. 15, the features of the keypad 408 enumerated above are incorporated within, or are a part of, a housing 618.

In some examples, the respective descriptions of the processor 500, the volatile memory 502, the non-volatile memory 506, the interconnection mechanism 516, and the battery assembly 514 with reference to the base station 414 are applicable to the processor 600, the volatile memory 602, the non-volatile memory 606, the interconnection mechanism 616, and the battery assembly 614 with reference to the keypad 408. As such, those descriptions will not be repeated here.

Continuing with the example of FIG. 15, through execution of the code 608, the processor 10 600 can control operation of the network interface 604. In some examples, the network interface 604 includes one or more physical interfaces (e.g., a radio, an ethernet port, a USB port, etc.) and a software stack including drivers and/or other code 608 that is configured to communicate with the one or more physical interfaces to support one or more LAN, PAN, and/or WAN standard communication protocols. These communication protocols can include, for example, TCP and UDP, among others. As such, the network interface 604 enables the keypad 408 to access and communicate with other computing devices (e.g., the other devices disposed in the location 402A of FIG. 13) via a computer network (e.g., the LAN established by the router 416).

Continuing with the example of FIG. 15, through execution of the code 608, the processor 600 can control operation of the user interface 612. In some examples, the user interface 612 20 includes user input and/or output devices (e.g., physical keys arranged as a keypad, a touchscreen, a display, a speaker, a camera, a biometric scanner, an environmental sensor, etc.) and a software stack including drivers and/or other code 608 that is configured to communicate with the user input and/or output devices. As such, the user interface 612 enables the keypad 408 to interact with users to receive input and/or render output. This rendered output can include, for instance, one or more GUIs including one or more controls configured to display output and/or receive input. The input can specify values to be stored in the data store 610. The output can indicate values stored in the data store 610. It should be noted that, in some examples, parts of the user interface 612 (e.g., one or more LEDs) are accessible and/or visible as part of, or through, the housing 618.

Figure 16:
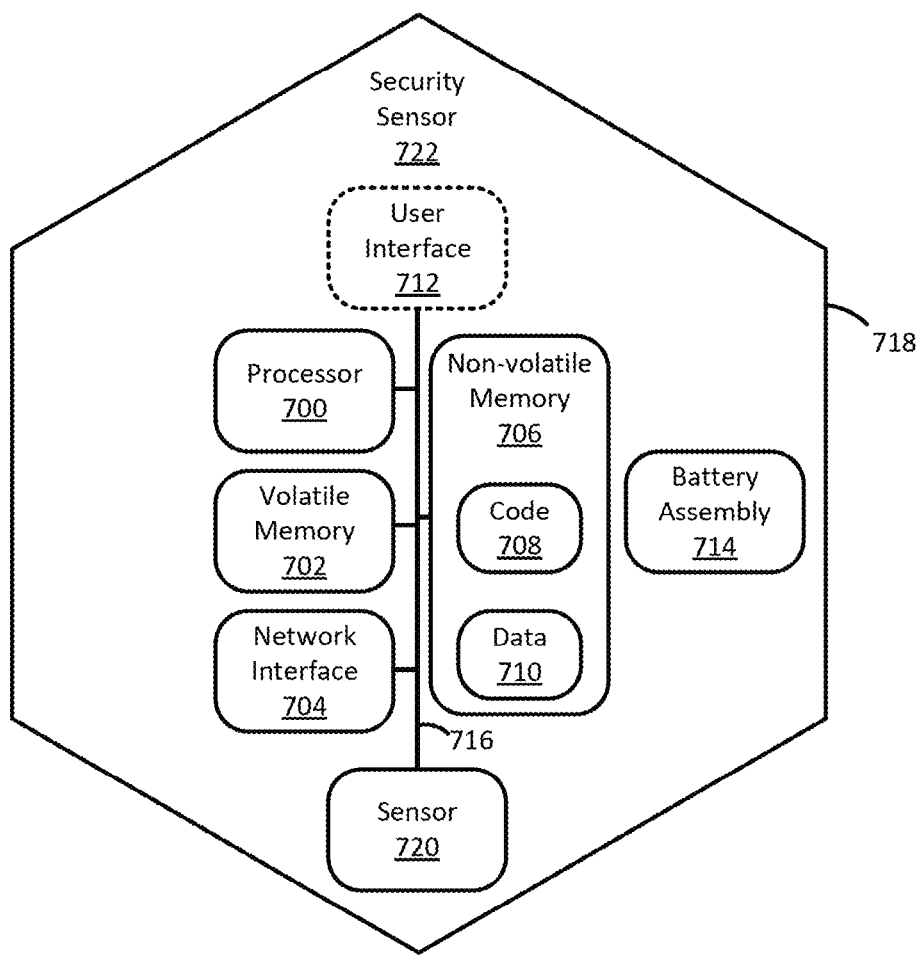
FIG. 16 is a schematic diagram of a security sensor, according to some examples described herein.

Turning now to FIG. 16, an example security sensor assembly 722 is schematically illustrated. Particular configurations of the security sensor assembly 722 (e.g., the image capture devices 404 and 410, the motion sensor assembly 412, and the contact sensor assemblies 406) are illustrated in FIG. 13 and described above. As shown in FIG. 16, the sensor assembly 722 includes at least one processor 700, volatile memory 702, non-volatile memory 706, at least one network interface 704, a battery assembly 714, an interconnection mechanism 716, and at least one sensor 720. The non-volatile memory 706 stores executable code 708 and data store 710. Some examples include a user interface 712. In certain examples illustrated by FIG. 16, the features of the sensor assembly 722 enumerated above are incorporated within, or are a part of, a housing 718.

In some examples, the respective descriptions of the processor 500, the volatile memory 502, the non-volatile memory 506, the interconnection mechanism 516, and the battery assembly 514 with reference to the base station 414 are applicable to the processor 700, the volatile memory 702, the non-volatile memory 706, the interconnection mechanism 716, and the battery assembly 714 with reference to the sensor assembly 722. As such, those descriptions will not be repeated here.

Continuing with the example of FIG. 16, through execution of the code 708, the processor 700 can control operation of the network interface 704 and the user interface 712. In some examples, the network interface 704 includes one or more physical interfaces (e.g., a radio, an ethernet port, a USB port, etc.) and a software stack including drivers and/or other code 708 that is configured to communicate with the one or more physical interfaces to support one or more LAN, PAN, and/or WAN standard communication protocols. The communication protocols can include, for example, TCP and UDP, among others. As such, the network interface 704 enables the sensor assembly 722 to access and communicate with other computing devices (e.g., the other devices disposed in the location 402A of FIG. 13) via a computer network (e.g., the LAN established by the router 416). For instance, in at least one example, when executing the code 708, the processor 700 controls the network interface to stream (e.g., via UDP) sensor data acquired from the sensor assembly 720 to the base station 414. Alternatively or additionally, in at least one example, through execution of the code 708, the processor 700 can control the network interface 704 to enter a power conservation mode by powering down a 2.4 GHz radio and powering up a sub-GHz radio that are both included in the network interface 704. In this example, through execution of the code 708, the processor 700 can control the network interface 704 to enter a streaming mode by powering up a 2.4 GHz radio and powering down a sub-GHz radio, for example, in response to receiving a wake signal from the base station via the sub-GHz radio.

Continuing with the example of FIG. 16, through execution of the code 708, the processor 700 can control operation of the sensor assembly 722. In some examples, the sensor assembly 722 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 708 that is configured to communicate with the user input and/or output devices. As such, the sensor assembly 722 enables the sensor assembly 722 to interact with users to receive input and/or render output. This rendered output can include, for instance, one or more GUIs including one or more controls configured to display output and/or receive input. The input can specify values to be stored in the data store 710. The output can indicate values stored in the data store 710. It should be noted that, in some examples, parts of sensor assembly 722 are accessible and/or visible as part of, or through, the housing 718.

Continuing with the example of FIG. 16, the sensor assembly 720 can include one or more types of sensors, such as the sensors described above with reference to the image capture devices 404 and 410, the motion sensor assembly 412, and the contact sensor assembly 406 of FIG. 13, or other types of sensors. For instance, in at least one example, the sensor assembly 720 includes an image capture device and a temperature sensor. Regardless of the type of sensor or sensors housed, the processor 700 can (e.g., via execution of the code 708) acquire sensor data from the housed sensor and stream the acquired sensor data to the processor 700 for communication to the base station.

It should be noted that, in some examples of the devices 600 and 700, the operations executed by the processors 600 and 700 while under control of respective control of the code 608 and 708 may be hardcoded and/or implemented in hardware, rather than as a combination of hardware and software.

Figure 17:
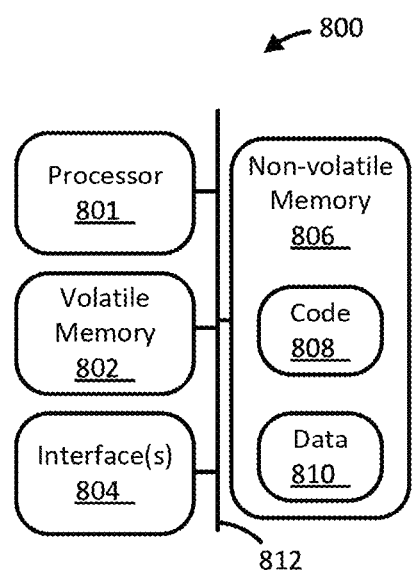
FIG. 17 is a schematic diagram of a computing device, according to some examples described herein.

Turning now to FIG. 17, a computing device 800 is illustrated schematically. As shown in FIG. 17, the computing device includes at least one processor 801, volatile memory 802, one or more interfaces 804, non-volatile memory 806, and an interconnection mechanism 812. The non-volatile memory 806 includes code 808 and at least one data store 810.

In some examples, the non-volatile (non-transitory) memory 806 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 808 stored in the non-volatile memory can include an operating system and one or more applications or programs that are configured to execute under the operating system. Alternatively or additionally, the code 808 can include specialized firmware and embedded software that is executable without dependence upon a commercially available operating system. Regardless, execution of the code 808 can result in manipulated data that may be stored in the data store 810 as one or more data structures. The data structures may have fields that are associated through location in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 17, the processor 801 can be one or more programmable processors to execute one or more executable instructions, such as a computer program specified by the code 808, to control the operations of the computing device 800. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 802) and executed by the circuitry. In some examples, the processor 801 is a digital processor, but the processor 801 can be analog, digital, or mixed. As such, the processor 801 can execute the function, operation, or sequence of operations using digital values and/or using analog signals. In some examples, the processor 801 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 801 that are multicore can provide functionality for parallel, simultaneous execution of instructions or for parallel, simultaneous execution of one instruction on more than one piece of data.

Continuing with the example of FIG. 17, prior to execution of the code 808 the processor 801 can copy the code 808 from the non-volatile memory 806 to the volatile memory 802. In some examples, the volatile memory 802 includes one or more static or dynamic random access memory (RAM) chips and/or cache memory (e.g. memory disposed on a silicon die of the processor 801). Volatile memory 802 can offer a faster response time than a main memory, such as the non-volatile memory 806.

Through execution of the code 808, the processor 801 can control operation of the interfaces 804. The interfaces 804 can include network interfaces. These network interfaces can include one or more physical interfaces (e.g., a radio, an ethernet port, a USB port, etc.) and a software stack including drivers and/or other code 808 that is configured to communicate with the one or more physical interfaces to support one or more LAN, PAN, and/or WAN standard communication protocols. The communication protocols can include, for example, TCP and UDP among others. As such, the network interfaces enable the computing device 801 to access and communicate with other computing devices via a computer network.

The interfaces 804 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 808 that is configured to communicate with the user input and/or output devices. As such, the user interfaces enable the computing device 801 to interact with users to receive input and/or render output. This rendered output can include, for instance, one or more GUIs including one or more controls configured to display output and/or receive input. The input can specify values to be stored in the data store 810. The output can indicate values stored in the data store 810.

Continuing with the example of FIG. 17, the various features of the computing device 800 described above can communicate with one another via the interconnection mechanism 812. In some examples, the interconnection mechanism 812 includes a communications bus.

In a further example in accordance with the present disclosure, a device comprising a speaker or speaker assembly is provided that is configured to selectively increase a sound pressure level of the output of the device corresponding to an alarm tone, while also being capable of generating sound corresponding to speech at a sufficient sound pressure level such that the sound corresponding to speech is audible to the average person. Many apparatuses and assemblies contain speakers and are used to generate an alarm tone. However, these apparatuses and assemblies often are unable to generate output of a sufficient sound pressure level, particularly across a broader frequency range of, for example, 400 Hz to 4.0 kHz, due at least in part to inherent limitations in the structure of the speaker and/or the apparatus/device and/or natural resonance frequencies of the components of the apparatus/device that do not match the desired frequency range. In addition, the speaker in apparatuses/assemblies is often integrated into the housing with other components, which may limit speaker size and output.

The improved output of the disclosed device occurs at a desired frequency or frequency range, yet does not substantially reduce the output of the device at frequencies below the desired frequency or frequency range. In one example, the desired frequency or frequency range may correspond to an alarm tone, such that the output of the device is increased at the desired frequency or frequency range corresponding to the alarm tone. This increase in output is achieved by configuring the device to generate or define a Helmholtz resonator having a resonance frequency at or near a frequency or frequency range of the alarm tone. The improved output may be augmented by housing the speaker or speaker assembly in a structure that is separate from other components of the device, such as a camera. Thus, the size of the speaker or speaker assembly is not limited by the size of the housing containing the other components of the device.

FIGS. 18-22 show an exemplary device 902 (e.g., an indoor or outdoor camera) in accordance with the present disclosure. The device 902 may comprise a speaker 904 (e.g., a loudspeaker) that is configured to generate sound and includes a diaphragm 906. In the example shown, the device 902 comprises a housing 908 including a lower housing compartment 910 that encloses the speaker 904. The housing 908 further comprises a main housing compartment 912 that encloses an optical apparatus 922 and the components thereof, which may be referred to as an image capture device as described herein. As discussed further below, the lower housing compartment 910 is coupled to the main housing compartment 912, by way of either being integrally formed with the main housing compartment 912, or, if formed separate from the main housing compartment 912, the lower housing compartment 910 is coupled or fastened to the main housing compartment 912.

Figure 22:
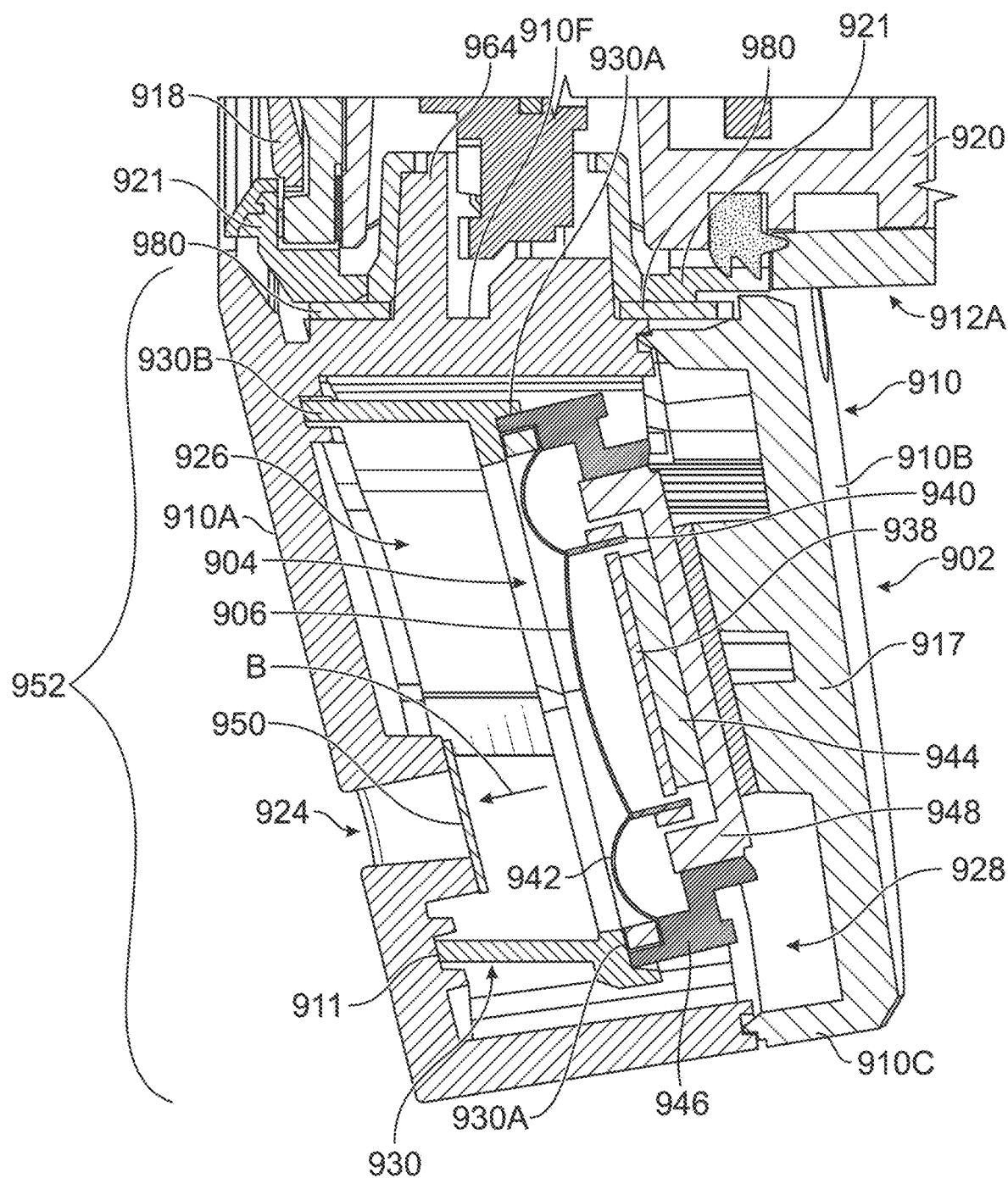
FIG. 22 is a cross-sectional view of a portion of the device taken along line 22-22 in FIG. 21B.

As shown in FIG. 22, the speaker 904 may be a microspeaker that includes the diaphragm 906, a top plate 938, a voice coil 940, a surround 942, one or more magnets 944, a frame 946, and a yoke or back plate 948. The speaker 904 is configured to generate sound, specifically acoustic waves defining an alarm tone. An electronic audio signal may be supplied to the speaker 904, which converts the audio signal to sound in the form of acoustic waves. The electronic audio signal passes through the voice coil 940, causing an electromagnetic field to be produced, which interacts with a field produced by the magnets 944. This interaction causes the voice coil 940 and the diaphragm 906, which is attached to the voice coil 940, to move together. Movement of the diaphragm 906 causes a disturbance in the air surrounding it and thus produces acoustic waves. The acoustic waves generated by the speaker 904 generally travel in a direction indicated by arrow B in FIG. 22 and exit through a single opening or slot 924 formed in the housing 908, specifically in the lower housing compartment 910 as discussed below.

Figure 21A:
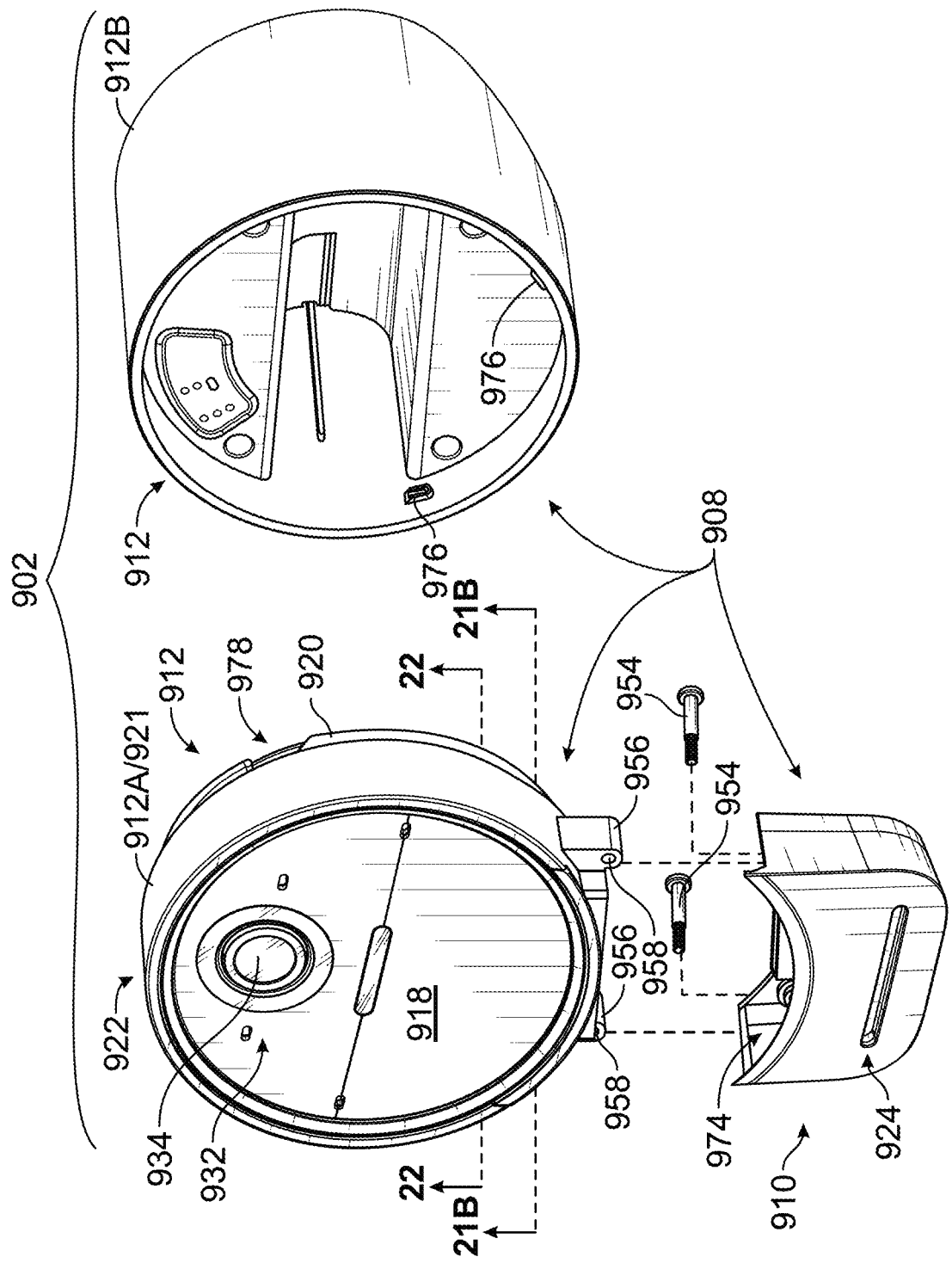
FIG. 21A is a partially exploded view of the device of FIG. 18.
Figure 21B:
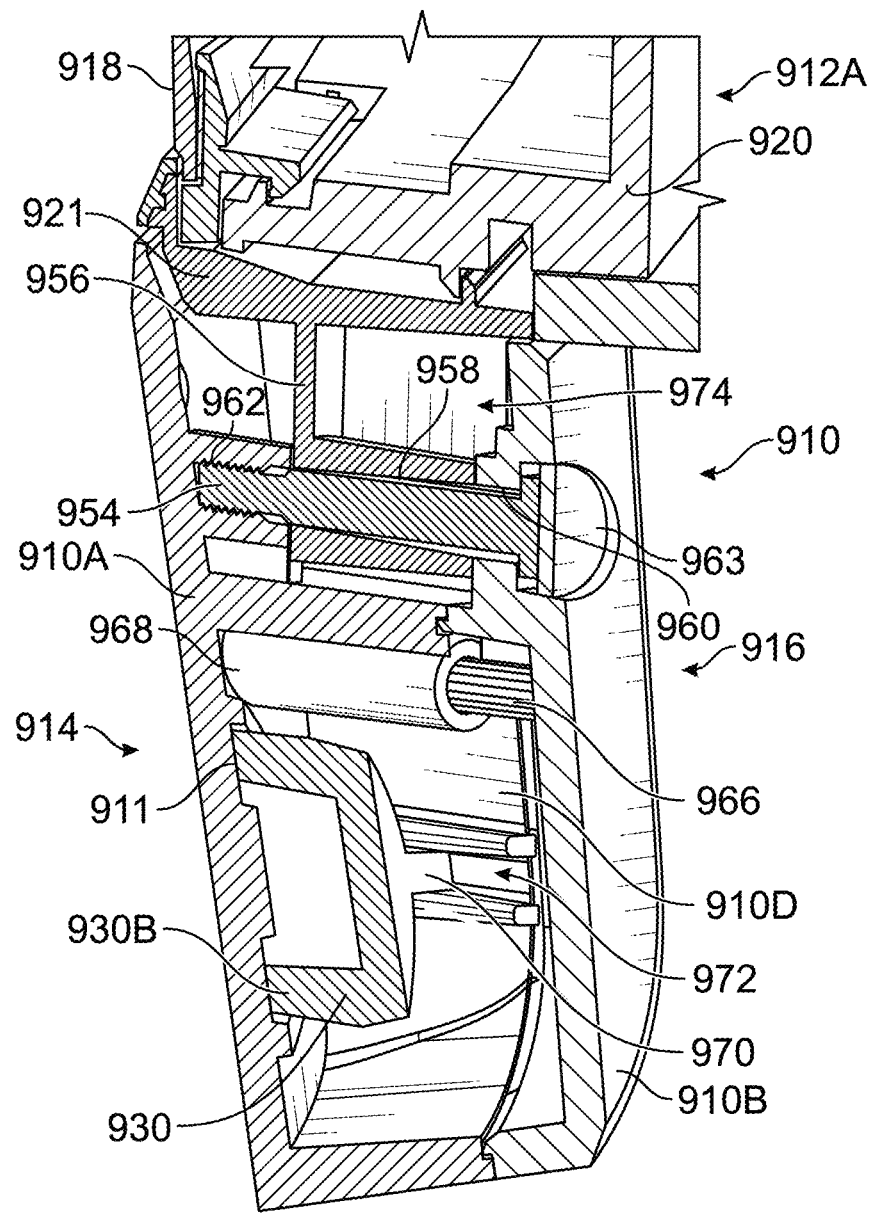
FIG. 21B is a perspective, cross-sectional view of a portion of the device of FIG. 18 taken along line 21B-21B.
Figure 23:
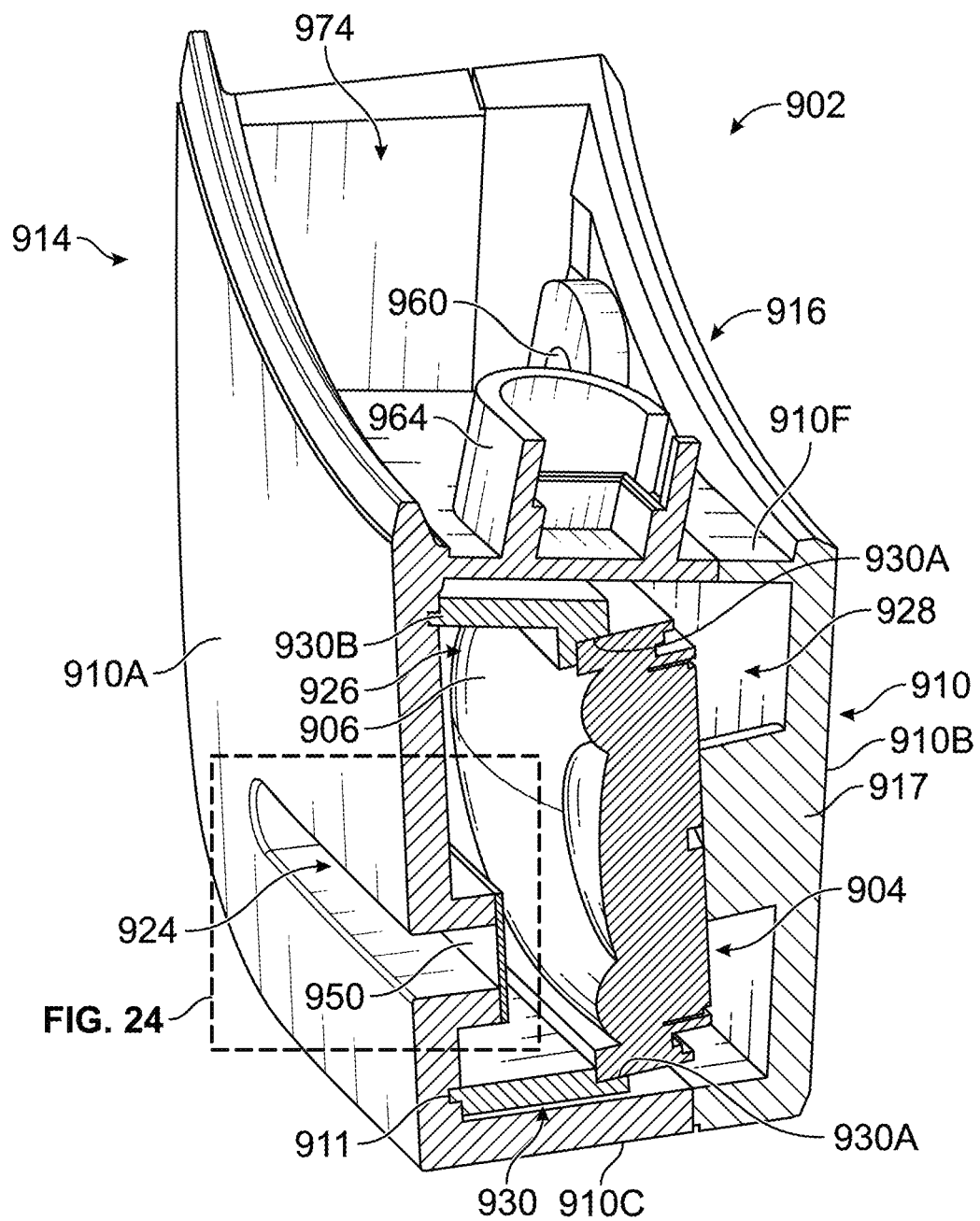
FIG. 23 is a perspective, cross-sectional view of a portion of the device of FIG. 22.
Figure 24:
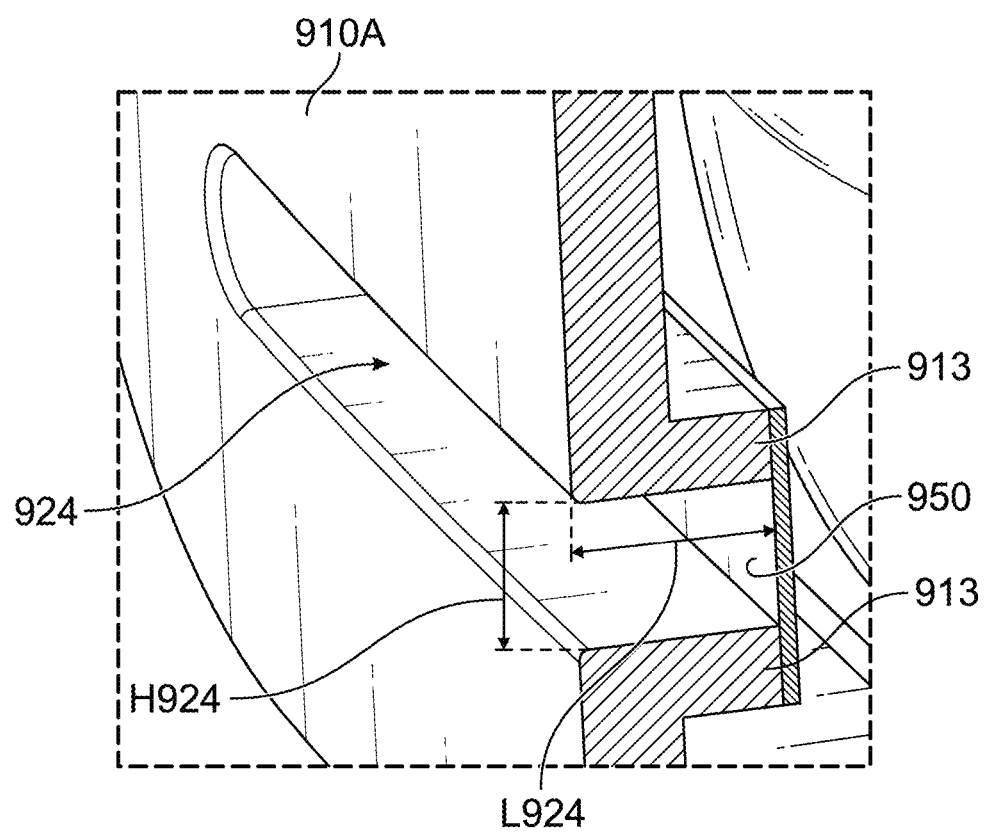
FIG. 24 is a detailed view of a portion of FIG. 23.
Figure 25:
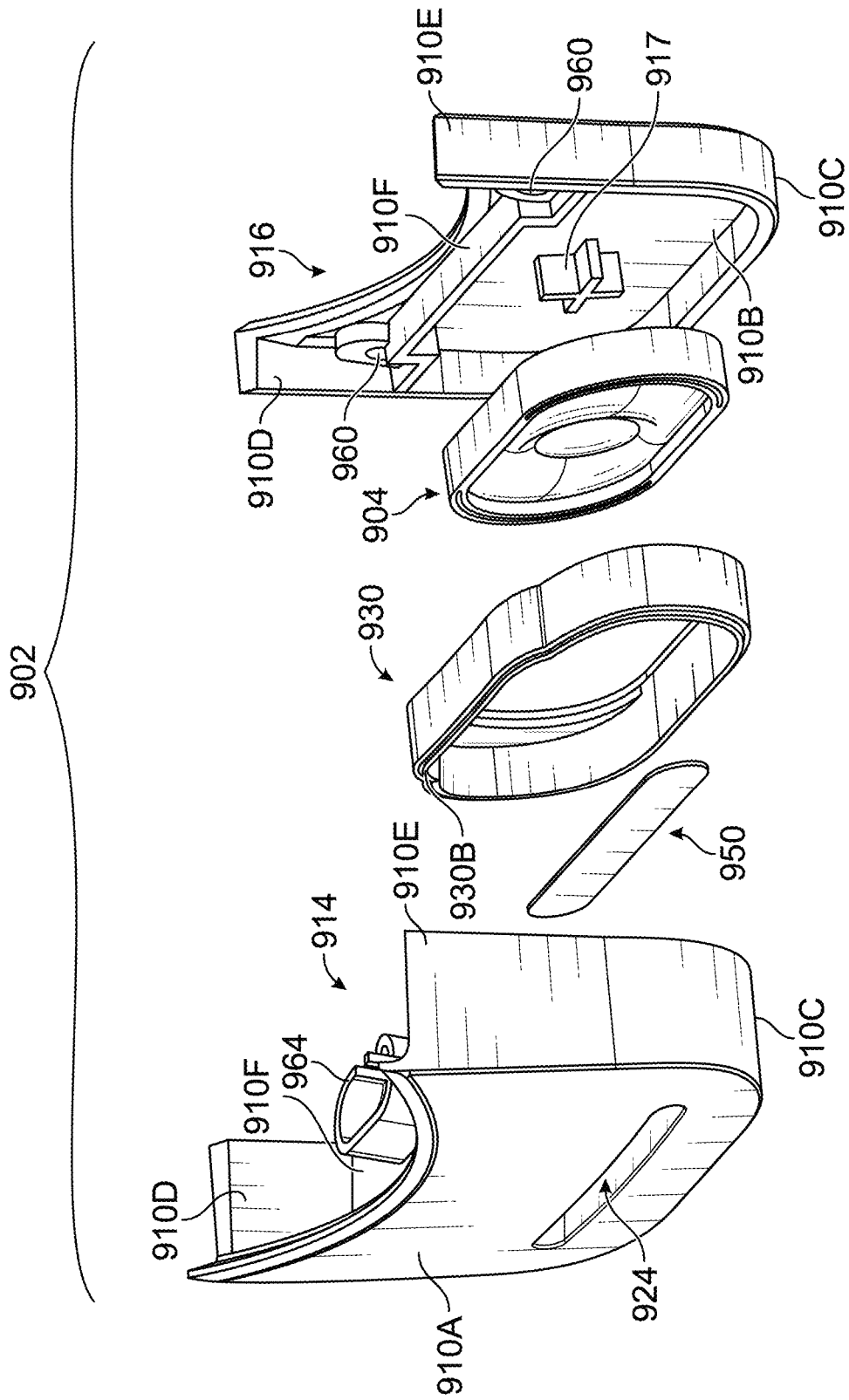
FIG. 25 is an exploded view of the device of FIG. 18.

With reference to FIGS. 22-25, the lower housing compartment 910 comprises a front section 910A, a back section 910B, a lower section 910C, side sections 910D, 910E, and an upper section 910F. The front section 910A and portions of the lower, side, and upper sections 910C, 910D, 910E, 910F define a front shell 914, and the back section 910B and portions of the lower, side, and upper sections 910C, 910D, 910E, 910F define a back shell 916. The back shell 916 is coupled to the front shell 914 to enclose the speaker 904, with the front shell 914 defining a front enclosure for the speaker 904 and the back shell 916 defining a back enclosure for the speaker 904. The single opening or slot 924 is formed within one portion of the housing 908, e.g., the front section 910A of the lower housing compartment 910. As best seen in FIG. 25, the single opening or slot 924 may be fully enclosed within the front section 910A and may be spaced apart from the lower, side, and upper sections 910C, 910D, 910E, 910F. The back shell 916 may be coupled to the front shell 914 via a snap fit, adhesive, ultrasonic or fusion welding or the like. For example, as shown in FIG. 21B, an inner surface (not labeled) of the back section 910B may comprise a post 966 that is received in a hollow boss 968 formed on an inner surface (not labeled) of the front section 910A to secure the front shell 914 to the back shell 916, and the post 966 and boss 968 may be glued or ultrasonically welded together As shown in FIGS. 22 and 23, the speaker 904 (shown in outline in FIG. 23) is positioned within the housing 908, i.e., within the lower housing compartment 910, so as to define (i) a front chamber 926 between the diaphragm 906 and the portion of the housing 908 in which the single opening or slot 924 is formed, i.e., the front section 910A or the front enclosure, and (ii) a back chamber 928 between the speaker 904 and the back section 910B or the back enclosure. The speaker 904 may be attached or mounted to a speaker mount 930 (the speaker 904, the speaker mount 930, and the portion of the housing 908 enclosing the speaker 904, i.e., the lower housing compartment 910, may be referred to herein collectively as a speaker assembly). The speaker mount 930 includes an engagement surface 930A formed on an inner surface thereof configured to receive a gasket (not shown) and/or an epoxy, which gasket/epoxy may engage with a portion of the speaker 904, e.g., the frame 946 (see FIG. 22). In the example shown in FIGS. 21B and 22, the speaker mount 930 is a separate element from the front and back shells 914, 916 and comprises an outer edge or foot 930B on an outer perimeter thereof that is configured to be received in and coupled to a recess 911 formed in the front section 910A of the lower housing compartment 910. As shown in FIG. 21B, the speaker mount 930 may comprise an extension 970 that extends laterally outward and is received in a groove 972 formed on an inner surface (not labeled) of the side section 910D to help secure and position the speaker mount 930 within the lower housing compartment 910. In other examples (not shown in FIGS. 22 and 23; see FIG. 32), the speaker mount 930 may be formed as part of, i.e., integral with, the front shell 914.

As shown in FIGS. 22-24, upon assembly, the speaker 904 is sandwiched, fitted, or gripped between the back shell 916 and the front shell 914. In the example shown, the back shell 916 comprises an extension 917 that may bias, push, or force the speaker 904 into engagement with the speaker mount 930, e.g., into engagement with a gasket (not shown) and/or epoxy on the speaker mount 930. Once the speaker 904 is fitted between the back shell 916 and the front shell 914, the speaker mount 930, the speaker 904, and a portion of the front section 910A of the lower housing compartment 910 (which portion of front section 910A is located within the speaker mount 930) may define the front chamber 926, which may comprise an acoustically sealed front chamber 926. The acoustically sealed front chamber 926 may be acoustically sealed from the back chamber 928. Besides the single opening or slot 924, the front chamber 926 may otherwise be acoustically sealed, i.e., no further openings are provided which communicate with the front chamber 926. Sealing of the front chamber 926 ensures that the acoustic waves generated by the speaker 904 are directed to, and exit only through, the single opening or slot 924 and prevents unwanted leakage of acoustic waves, e.g., into the back chamber 928. As described herein, the single opening or slot 924 is sized to generate, with the front chamber 926, an increased output of the device 902 within a frequency range of an output of the speaker 904 corresponding to an alarm tone.

Figure 37:
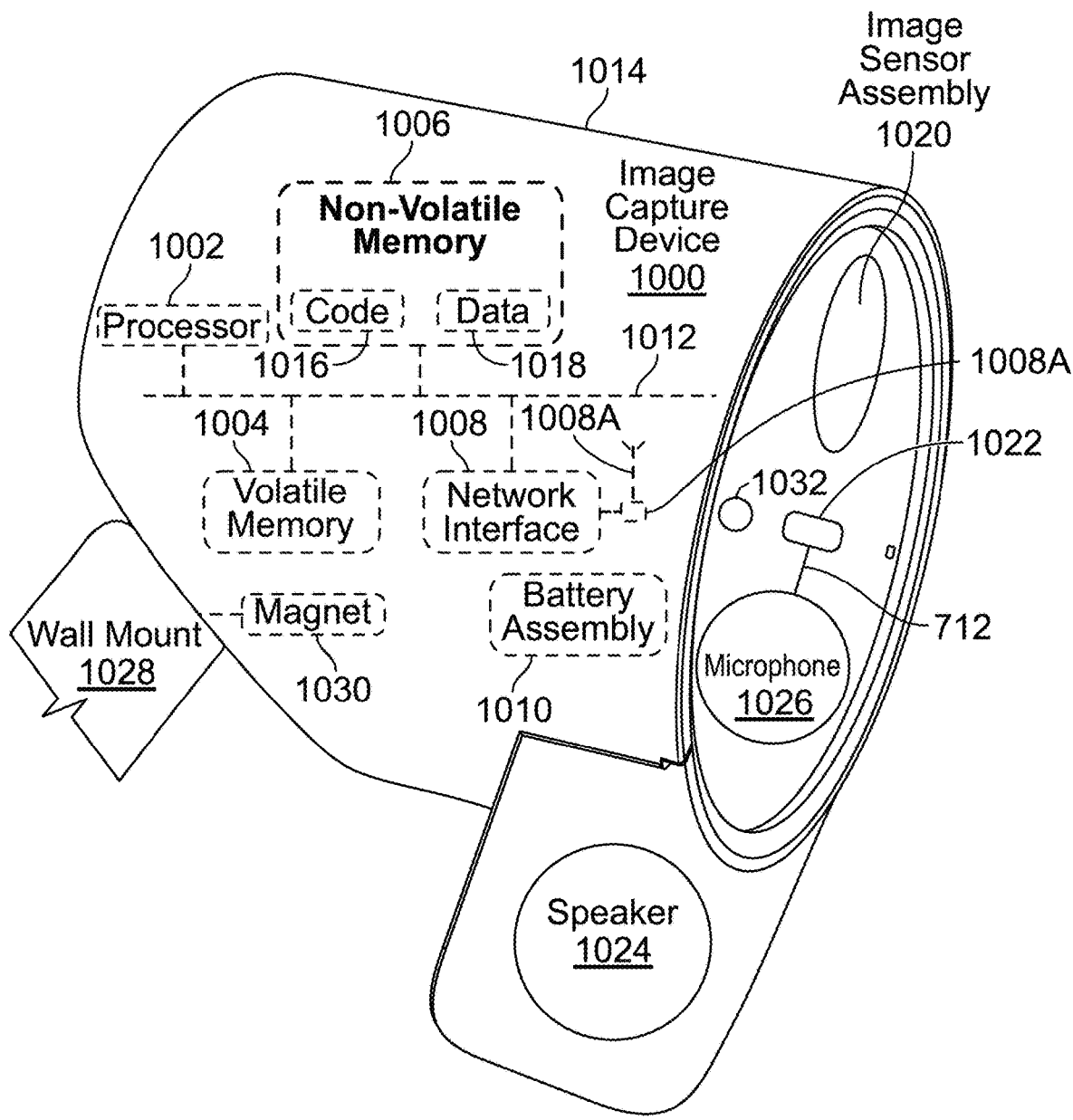
FIG. 37 is a schematic diagram of an image capture device, according to some examples described herein.

With reference to FIGS. 18, 21A, 21B, and 22, the main housing compartment 912 may include a first housing portion 912A that is removably engageable with a second housing portion 912B. The first housing portion 912A may be arranged as a cap and may comprise a front face 918, an inner component 920, and an outer component 921 that receives and engages the inner component 920. The first housing portion 912A is releasably coupled to a corresponding component on the second housing portion 912B. In the example shown in FIG. 21A, the second housing portion 912B comprises projections 976, and the first housing portion 912A comprises corresponding channels 978 (only one channel 978 is visible). The first housing portion 912A may be coupled to the second housing portion 912B by inserting the projections 976 and twisting the first housing portion 912A so that the projections 976 are locked in place, e.g., via a bayonet fitting or mount. The optical apparatus 922 may include an optical component 932. The optical component 932 may be positioned within and enclosed by the first housing portion 912A of the main housing compartment 912. The optical component 932 can include one or more elements for performing a desired optical function. In the example shown, the optical component 932 comprises a transparent region (e.g., an optical lens 934, opening, filter, light pipe or waveguide, etc.) through or via which light can be conducted or enter. The optical lens 934 may allow the optical apparatus 922 to receive or capture light or otherwise receive/capture image data along an optical axis 936. In some examples, the optical apparatus 922 comprises a camera and the optical lens 934 is a camera lens. The optical apparatus 922 may further include additional elements (not shown), such as an image capture device or an imaging device (e.g., a CCD, CMOS, photosensor, or other light sensitive element for detecting light transmitted via the transparent portion), an LED or other light emitter, an audio component (e.g., a microphone to record audio to be combined with video data, a speaker, etc.), and so on. The second housing portion 912B may be arranged as a canister housing and can be arranged to support other components of the optical apparatus 922, i.e., a battery. The second housing portion 912B may comprise a mounting structure (not shown) that can be used to arrange the optical apparatus 922 on a wall, post, or other structural support. FIGS. 37 and 38 illustrate examples of the optical apparatus 922 in more detail.

The lower housing compartment 910 is coupled to the main housing compartment 912, e.g., via a snap or friction fit and/or via one or more fasteners 954. With reference to FIGS. 21A and 21B, the main housing compartment 912, specifically the outer component 921 of the first housing portion 912A, may comprise one or more extensions 956 with one or more openings 958 formed therethrough. The upper section 910F of the lower housing compartment 910 may be recessed so that a cavity 974 is formed when the front and back shells 914, 916 are assembled (see also FIG. 23). As shown with respect to one of the extensions 956 in FIG. 21B, the back section 910B of the lower housing compartment 910 comprises an opening 960 formed therethrough (see also FIGS. 23 and 25), and the front section 910A comprises a threaded bore 962. The extension 956 is received in the cavity 974 such that the extension 956 is positioned between the front and back sections 910A, 910B of the lower housing compartment 910, and the opening 958 is aligned with the opening 960 and bore 962. The fastener 954 extends through the openings 958, 960 and is received in the threaded bore 962 to couple the lower housing compartment 910 to the main housing compartment 912. A cap 963 may optionally be placed over or in the opening 960 formed in the back section 910B of the lower housing compartment 910 after the fastener 954 is installed. As best seen in FIGS. 22, 23, and 25, the upper section 20 910F of the lower housing compartment 910 may comprise a connector 964, and the main housing compartment 912 may comprise a receiver (not separately labeled) that receives the connector 964, e.g., via a snap or friction fit. The connector 964 and the receiver may include electrical components (not shown) that provide an electrical connection between components of the lower and main housing compartments 910, 912, e.g., to provide an audio signal to the speaker 904. One or more seals (not shown) may be located between the lower housing compartment 910 and the main housing compartment 912. For example, a gasket (not shown) may be positioned around the connector 964 to seal an interface between the connector 964 and the receiver. One or more seals 980 (see FIG. 22) may be present between the main housing compartment 912 and the upper section 910F of the lower housing compartment 910. In other examples (not shown), one or more portions of the lower housing compartment 910 may be integral with one or more portions of the main housing compartment 912, e.g., with the first housing portion 912A.

The main housing compartment 912 is sealed to prevent ingress of water and debris, and the lower housing compartment 910 is acoustically sealed with respect to the main housing compartment 912 to prevent acoustic coupling between the speaker 904 and one or more microphones (not shown; see FIGS. 37 and 38), which may be located in the main housing compartment 912. A mesh 950 may be coupled to an inner surface of the front section 910A that defines the single opening or slot 924, e.g., via adhesive, ultrasonic welding, and the like. The mesh 950 may be positioned over the single opening or slot 924 to prevent ingress of debris into the device 902. Although the mesh 950 is generally depicted in the Figures as being a solid sheet, the mesh 950 may comprise a plurality of small apertures. As described herein, the mesh 950 may generally be selected so as to minimize any impact on the acoustic output level of the device 902.

Figure 18:
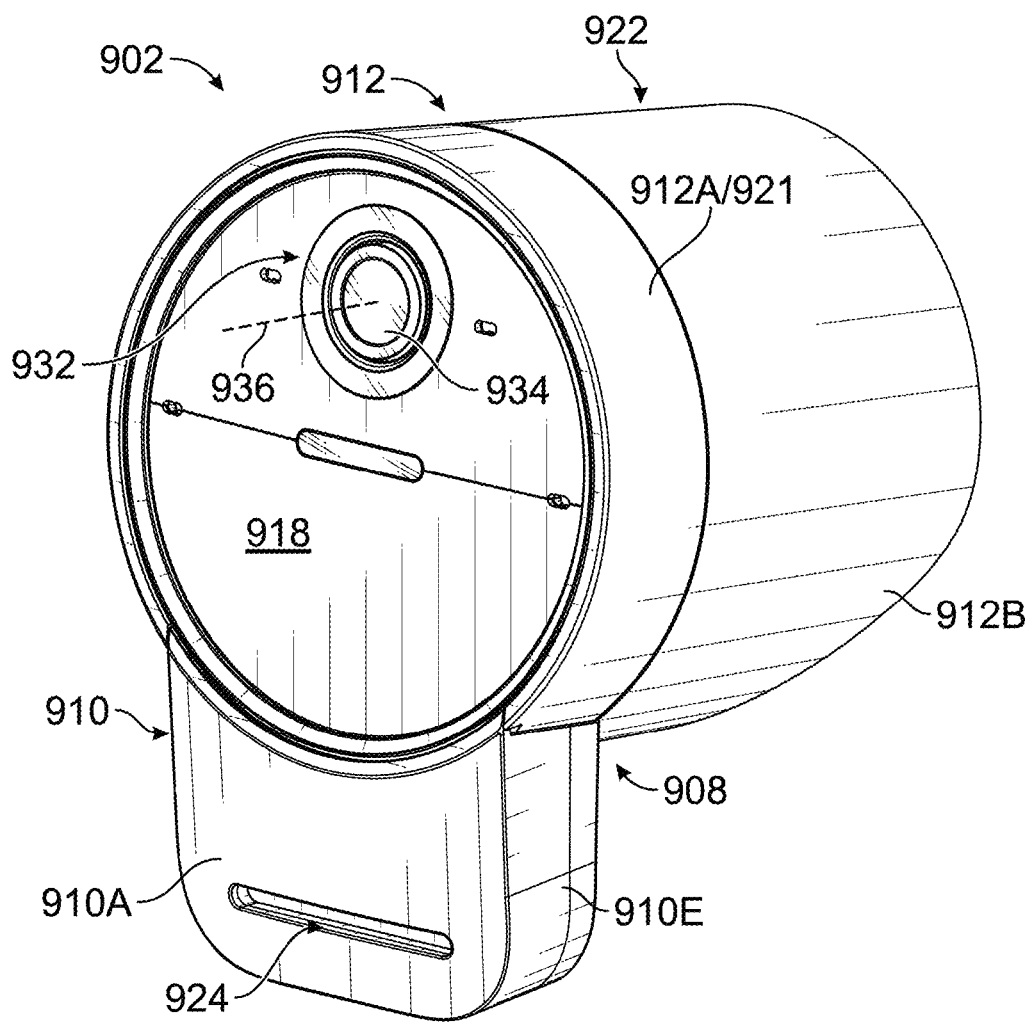
FIG. 18 is a perspective view of a device in accordance with the present disclosure.
Figure 19:
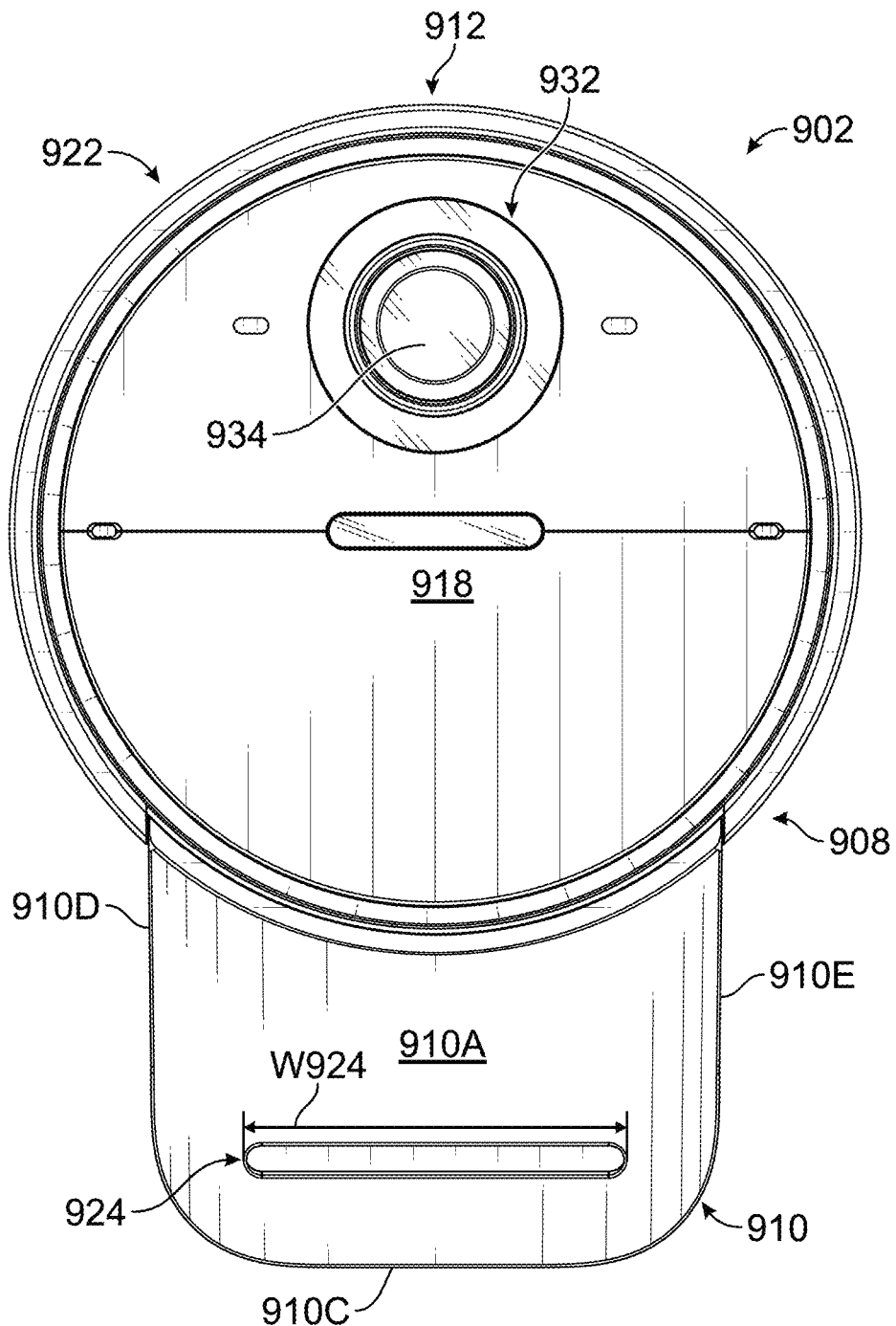
FIG. 19 is a front view of the device of FIG. 18.

With reference to FIGS. 19 and 24, the single opening or slot 924 may comprise a height $H_{924}$, a length $L_{924}$, and a width $W_{924}$, in which the length $L_{924}$ is determined by a thickness of a slot-defining portion 913 of the front section 910A of the lower housing compartment 910 through which the single opening or slot 924 is formed. In the example shown in FIG. 24, the slot-defining portion 913 of the front section 910A may comprise a greater thickness than adjacent portions of the front section 910A. The thickness of the slot-defining portion 913 may be varied to obtain the desired length $L_{924}$ of the single opening or slot 924. In some examples, as shown in FIG. 19, the height $H_{924}$ may be substantially uniform along the entire width $W_{924}$ and/or length $L_{924}$ of the single opening or slot 924, and/or the length $L_{924}$ may be substantially uniform along the entire width $W_{924}$ of the single opening or slot 924. As used with respect to dimensions of the single opening or slot 924, the term "substantially" may include minor variations in the height $H_{924}$, width $W_{924}$, and/or length $L_{924}$ due to curvature of the front section 910A. In other examples (not shown), the height $H_{924}$ may vary along at least a portion of the width $W_{924}$ and/or length $L_{924}$ of the single opening or slot 924, and/or the length $L_{924}$ may vary along at least a portion of the width $W_{924}$ of the single opening or slot 924. A cross-sectional area of the single opening or slot 924 may be calculated by multiplying the height $H_{924}$ times the width $W_{924}$. A volume of the single opening or slot 924 may be calculated by further multiplying by the length $L_{924}$. In some examples, an aspect ratio of the single opening or slot 924 may be 2:1 to 15:1 (i.e., a ratio of the width $W_{924}$ to the height $H_{924}$). In some particular examples, the aspect ratio may be 12:1. While the single opening or slot 924 is depicted in FIGS. 18, 19, and 23 as generally comprising an elongated rectangular or oval shape, the single opening or slot 924 may comprise any desired shape.

Figure 20:
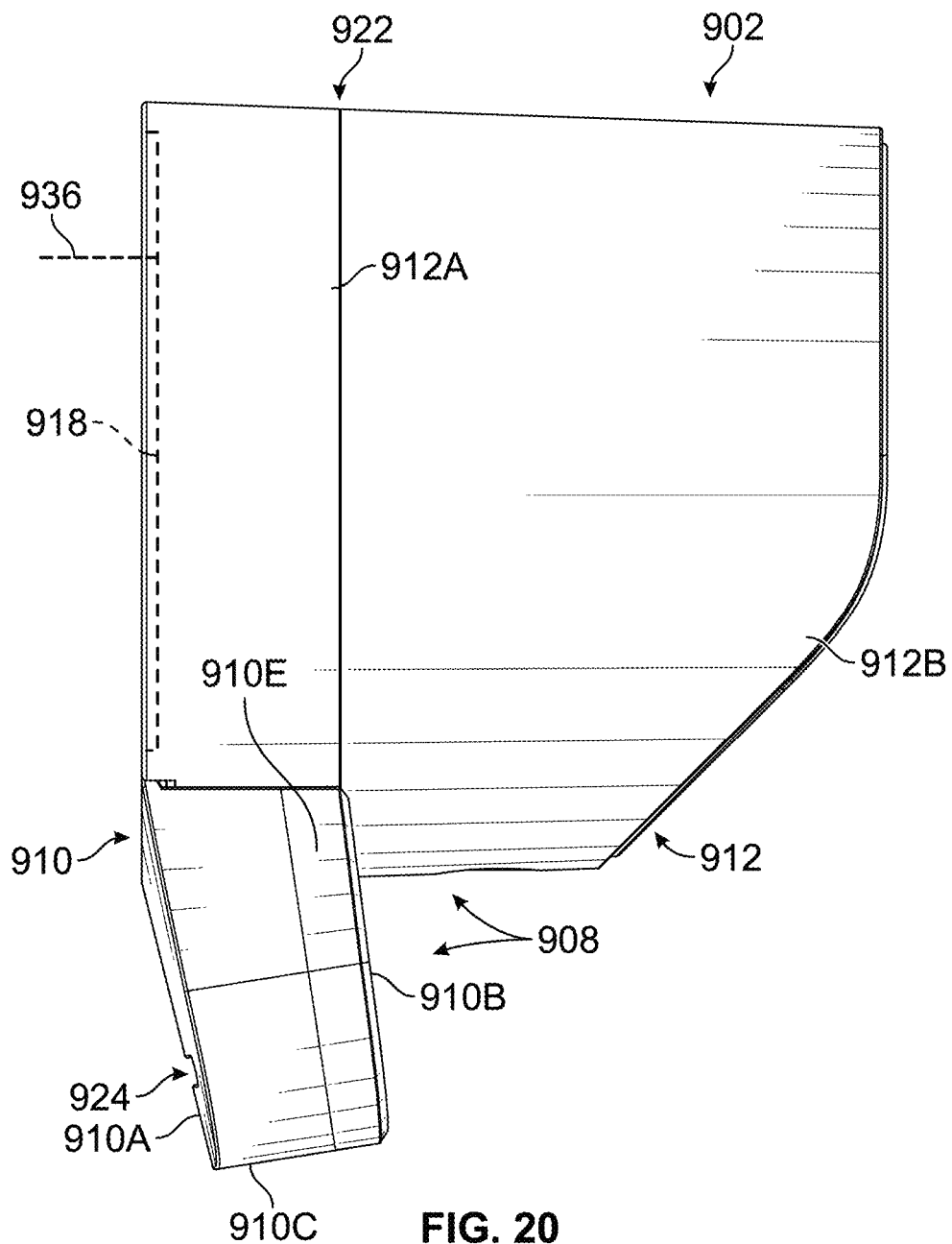
FIG. 20 is a side view of the device of FIG. 18.

With reference to FIGS. 18 and 20, the optical component 932 may have a field of view oriented generally along the optical axis 936, which may be substantially perpendicular to the front face 918 of the first housing portion 912A. The device 902 may be positioned so that a certain area is within this field of view, e.g., the device 902 may be positioned so that a person walking toward or standing or sitting in front of the device 902 is within the field of view of the optical component 932.

The speaker 904 may be a security alarm speaker, and the electronic audio signal may comprise an alarm signal when the electronic audio signal has a value or magnitude causing the speaker 904 to generate an output (i.e., acoustic waves) comprising an alarm tone. In other examples, alternatively or in addition, the electronic audio signal may comprise an electronic speech signal when it has a value or magnitude causing the speaker 904 to generate an output (i.e., acoustic waves) comprising, or otherwise in the form of, audible speech. The electronic speech signal may correspond to human speech (live or recorded) or speech synthesized by a computer system. In one particular example, the electronic audio signal may comprise an electronic alarm signal and/or an electronic speech signal such that the output generated by the speaker 904 comprises an alarm tone and/or speech. Human speech typically has a frequency that falls within a range from 400 Hz to 4.0 kHz. Alarm tones typically have a frequency that fall within a range from 2.0 kHz to 4.0 kHz.

The device 902 in accordance with the present disclosure provides an increased output within a frequency range of the alarm tone via creation of a Helmholtz resonator. Speaker devices often seek to avoid the effects produced by a Helmholtz resonator, which can cause one or more peaks in the output of the device, i.e., acoustic waves generated by the speaker, at certain frequencies and a reduction in output at frequencies higher than the Helmholtz resonance frequency. These peaks are typically undesirable, and speaker devices are typically designed to make a resonance frequency of the device as high as possible so that the resonance frequency is outside of the frequency bandwidth of the speaker output.

In accordance with one aspect of the present disclosure, the device 902 may comprise a resonator device comprising a Helmholtz resonator with a resonance frequency or frequency range that is tuned to match the frequency or frequency range of the output of the speaker 904 when the speaker 904 is generating the alarm tone, thereby increasing an output (e.g., a sound pressure output level) of the device 902 when the speaker 904 is generating the alarm tone, as compared to a device including an optical apparatus without a resonator device. By doing so, a sound pressure output level of the device 902 can be increased within a certain resonance frequency or frequency range without further costs that derive from changing components of the device 902, such as speaker size, speaker orientation, battery life, etc.

With reference to FIGS. 22 and 23, when the diaphragm 906 of the speaker 904 vibrates, acoustic waves are generated in the front chamber 926 and vent or otherwise escape through the single opening or slot 924. The front chamber 926 and the single opening or slot 924 are configured, i.e., sized, to collectively generate an increased output of the device 902 within a frequency range of the alarm tone. In particular, the front chamber 926 and the single opening or slot 924 create a resonator 952 having a resonance frequency that is within the frequency range of the alarm tone to selectively increase a sound pressure level of the output of the device 902 corresponding to the alarm tone. The increased output of the device 902 comprises a peak output of the device 902 within the frequency range of the output of the speaker 904 corresponding to the alarm tone. In some examples, the sound pressure level of the peak output of the device 902 when generating an alarm tone may be increased by at least 10 dB. In some particular examples, the sound pressure level of the peak output of the device 902 when generating the alarm tone may be increased by about 10 dB to 18 dB. Sound pressure output is typically measured in units of dBSPL (decibels relative to 20 µPa). In some examples, the speaker 904 may be a microspeaker, e.g., an electrodynamic speaker, that is capable of generating an output within a frequency range of 400 Hz to 4.0 kHz. The frequency range of the alarm tone may fall within a range from 2.0 kHz and 4.0 kHz, and in one particular example, the frequency range of the alarm tone may be from 2.5 kHz to 2.7 kHz.

In general, designing the resonance frequency or frequency range of a Helmholtz resonator to match a specific frequency or frequency range, e.g., the frequency or frequency range of the alarm tone, may be achieved by designing, configuring, or adjusting one or more parameters of the resonator. With reference to FIGS. 22-24, in some examples, these parameters may include the volume of the front chamber 926 and one or more parameters of the single opening or slot 924, such as the height, width, length, cross-sectional area, and/or volume. Hence, the single opening or slot 924 and/or the front chamber 926 of the device 902 may be dimensioned to collectively create a Helmholtz resonator having a resonance frequency or a resonance frequency range that falls within or matches at least a portion of the frequency range of the output of the speaker 904 when generating an alarm tone, such that the resonator 952 is able to selectively increase a sound pressure level of the acoustic waves output by the device 902 within this frequency or frequency range of the output of the speaker 904 corresponding to the alarm tone and generate the peak output of the device 902 when the speaker 904 is generating the alarm tone.

When designing a Helmholtz resonator with a desired resonance frequency, a device may be built and a frequency response may be measured to determine if the resonance frequency of the device is equal to or near the desired resonance frequency. If not, one or more parameters of the device may be adjusted/varied until those parameters result in a device having the desired resonance frequency, particularly when the speaker generates an alarm tone.

A guide to provide a rough estimate of the resonance frequency of a Helmholtz resonator may be calculated using the following basic equation, which is similar to equation (1) above:

$$f_{Helm} = \frac{1}{2\pi}\sqrt{\frac{K_{Front}}{M_{slot}}} \quad (5)$$

$K_{Front}$ is a spring stiffness of the front chamber 926 and may be calculated using the following equation, which is the same as equation (2) above:

$$K_{Front} = \frac{\rho_0 c_0^2}{V} \quad (6)$$

$M_{Slot}$ is an acoustic mass of the single opening or slot 924 and may be calculated using the following equation, which is similar to equation (3) above:

$$M_{slot} = \frac{\rho_0}{S} L \qquad (7)$$

in which:

$\rho_0$ is a density of a fluid medium, e.g., about 1.2 kg/m³ for air;

$c_0$ is a speed of sound in the fluid medium, e.g., about 340 m/s for air;

V is a total volume of air in the front chamber 926 [m³];

S is a cross-sectional area (height $H_{924}$ times width $W_{924}$) of the single opening or slot 924 [m²]; and L is a length $L_{924}$ of the single opening or slot [m].

Equations (5)-(7) may be used to determine a rough estimate for one or more parameter values for the Helmholtz resonator. As discussed further below, from this starting point, one or more of the parameters from equations (5)-(7) may be adjusted/varied until final values of the one or more parameters result in a Helmholtz resonator that generates a peak output of the device 902 equal to the frequency or within the frequency range of the output of the speaker 904, particularly when the speaker 904 generates an alarm tone.

Figure 26:
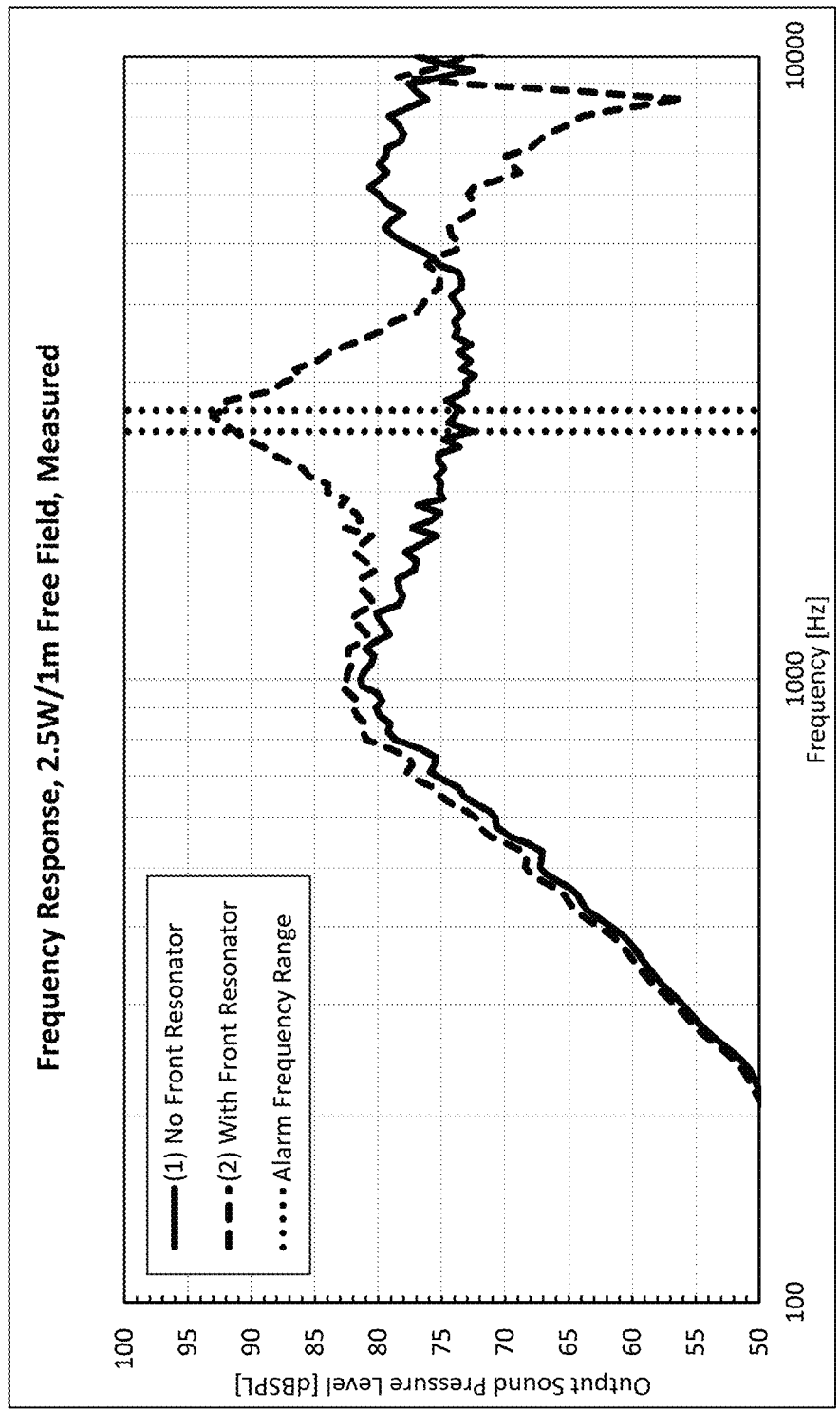
FIG. 26 is a graph illustrating a sound pressure output level of a device comprising an optical apparatus and a resonator device in accordance with the present disclosure, as compared to the optical apparatus without the resonator device.

FIG. 26 illustrates the effect of the addition of the front chamber 926 on a sound pressure output level. Two devices, Device (1) and Device (2), are constructed that both include a speaker (Ole Wolff; OWS-203657TA-8) that is 36 mm long, 20 mm wide, and 5.7 mm high. Device (2) is similar to the device 902 shown in FIGS. 18-25 and includes a front chamber 926 with a volume (V) of 3.97 cc (3.97×10⁻⁶ m³). Device (1) is substantially similar to Device (2) except that Device (1) lacks the front chamber 926, e.g., Device (1) lacks the front section 910A of the lower housing compartment 910. The volume of the back chamber 928 in Devices (1) and (2) is 10 cc. Additional relevant parameters of Device (2) are as follows:

Cross-Sectional Area of the Single Opening/Slot 924 (height $H_{924}$ times width $W_{924}$)=88.1 mm² (8.8 1×10⁻⁵ m²)

Length $L_{924}$ of Single Opening/Slot 924=3.8 mm (3.8× 10⁻³ m)

The solid line ("(1) No Front Resonator") in FIG. 26 represents Device (1), and the dashed line ("(2) With Front Resonator") represents Device (2). A desired frequency range of 2.5 kHz to 2.7 kHz, i.e., the frequency range of an alarm tone, is indicated with vertical dotted lines. It can be seen in FIG. 26 that Device (1) produces a peak sound pressure output level of 15 73.7 dBSPL within the desired frequency range of 2.5 kHz to 2.7 kHz, while Device (2) demonstrates a significantly higher peak sound pressure output level of 92.2 dBSPL (i.e., an increase of about 18.5 dBSPL as compared to Device (1)) within the desired frequency range of 2.5 kHz to 2.7 kHz. It is also noted that the overall peak sound pressure output level of Device (2) occurs within the desired frequency range, while the overall peak sound pressure output level of Device (1) occurs outside the desired frequency range. Using more sophisticated models such as acoustic lumped element equivalent circuit analysis or finite element analysis may result in a more accurate prediction of the Helmholtz resonance frequency.

FIGS. 27-30 provide graphs simulating the effect of various parameters on a peak output sound pressure level of a device and a frequency at which the peak output sound pressure level is observed. A device in accordance with the present disclosure, which may include any of the devices shown in FIGS. 23-25 and 32-34, is used as a baseline (indicated as "Nominal") for FIGS. 27-30. The device is simulated to be driven by a sine wave with 1 Watt RMS and output sound pressure measured at a distance of 1 meter from the device. Output sound pressure is typically measured in units of dBSPL (decibels relative to 20 µPa).

Figure 27:
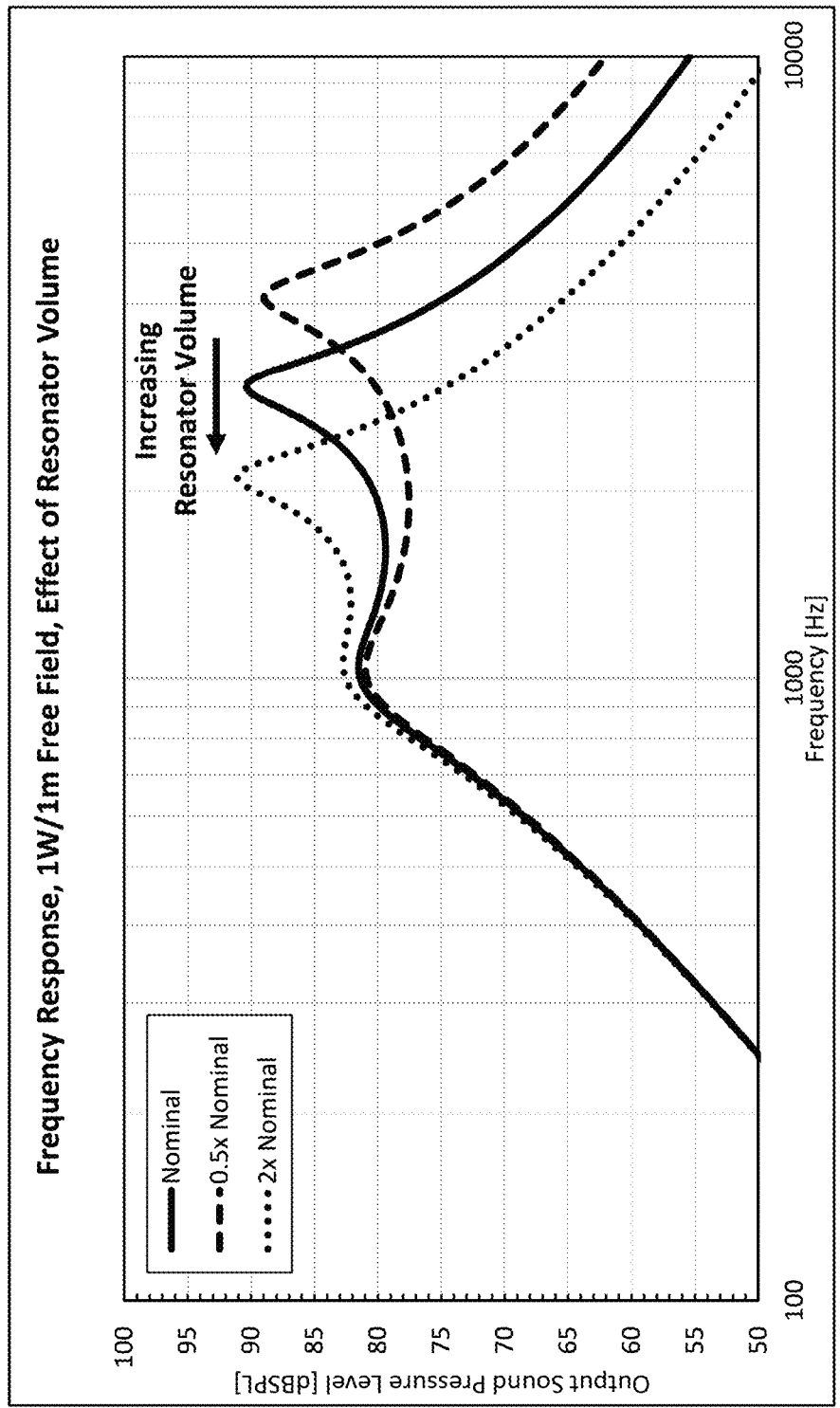
FIGS. 27-30 are graphs illustrating the effect of various parameters on a sound pressure output level of a device in accordance with the present disclosure.

FIG. 27 illustrates the effects of changing a volume of the front chamber 926, while holding all other device parameters constant. As compared to a nominal or baseline level ("Nominal"), increasing the chamber volume ("2× Nominal") decreases the frequency at which the peak output sound pressure level is observed, and decreasing the chamber volume ("0.5× Nominal") increases the frequency at which the peak output sound pressure level is observed. Increasing the chamber volume also slightly increases the peak output sound pressure level, while decreasing the chamber volume slightly decreases the peak output sound pressure level.

Figure 28:
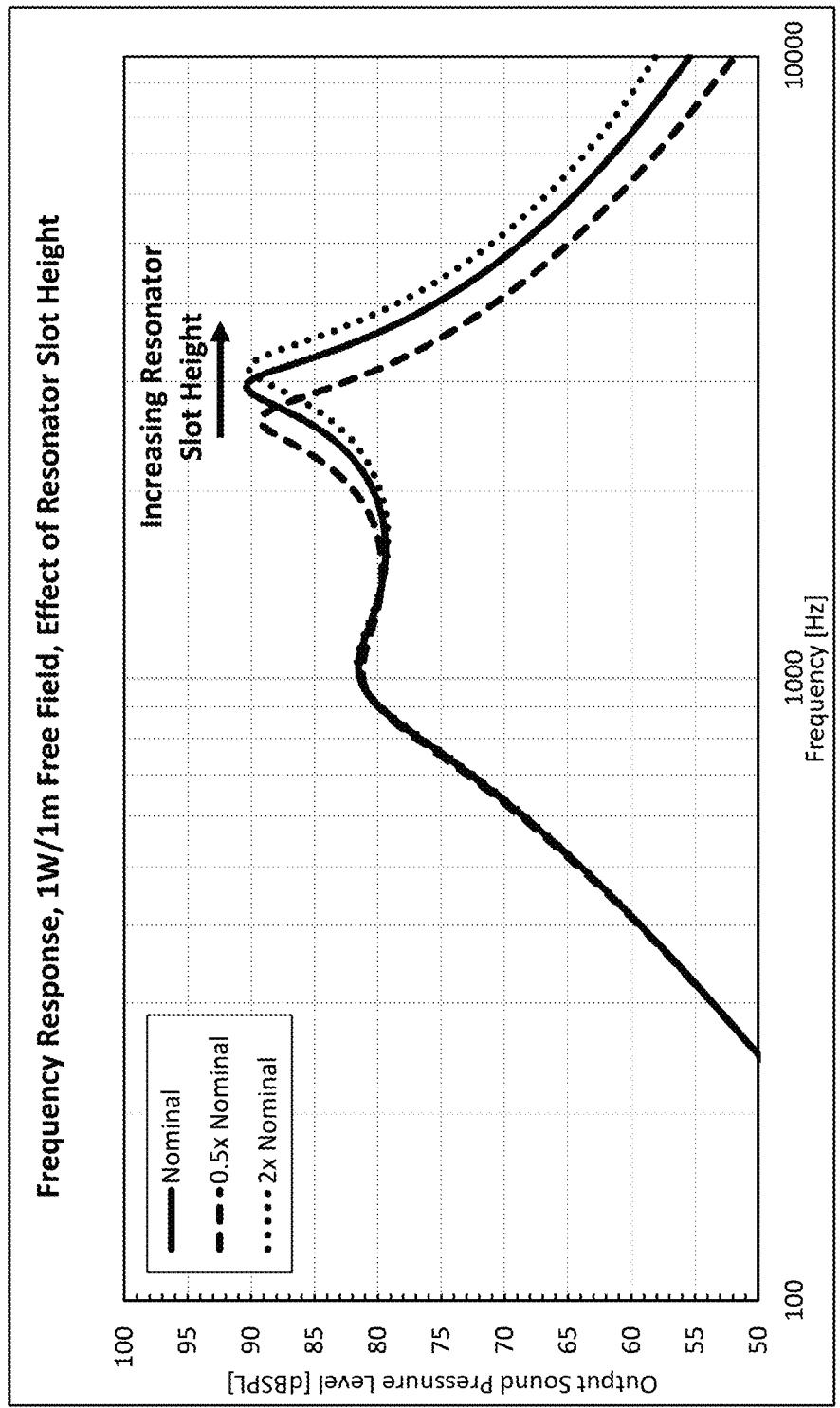
Figure 29:
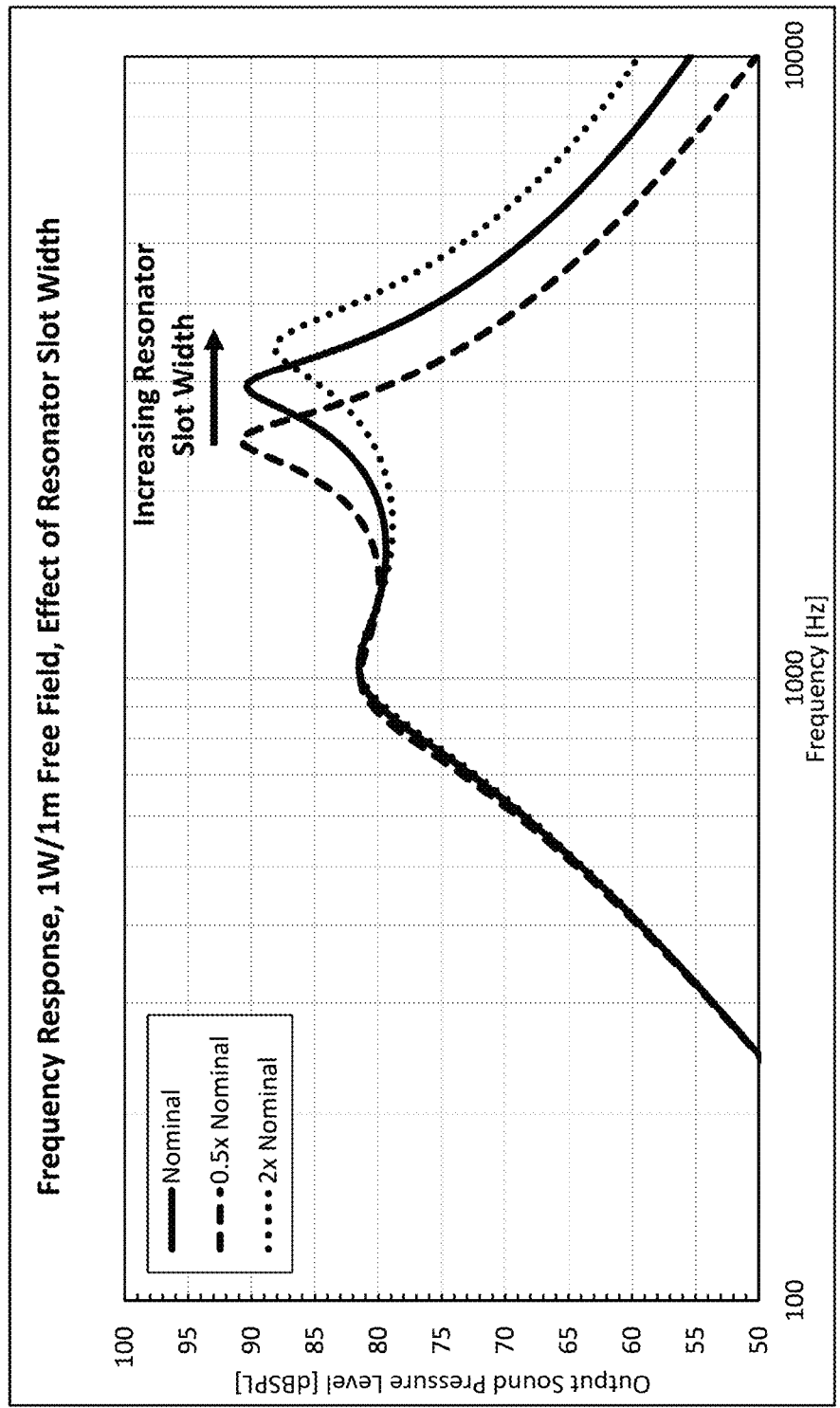

FIGS. 28 and 29 illustrate the effects of changing a cross-sectional area, e.g., a height $H_{924}$ or width $W_{924}$ (see FIGS. 19 and 24), of the single opening or slot 924, while holding all other device parameters constant. As compared to a nominal or baseline level, increasing the height $H_{924}$ or width $W_{924}$ of the single opening or slot 924 (2×) increases the frequency at which the peak output sound pressure level is observed, and decreasing the height $H_{924}$ or width $W_{924}$ of the single opening or slot 924 (0.5×) decreases the frequency at which the peak output sound pressure level is observed. Increasing the height $H_{924}$ has little effect on the peak output sound pressure level, while decreasing the height $H_{924}$ decreases the peak output sound pressure level. Increasing the width $W_{924}$ decreases the peak output sound pressure level, while decreasing the width $W_{924}$ increases the peak output sound pressure level.

Figure 30:
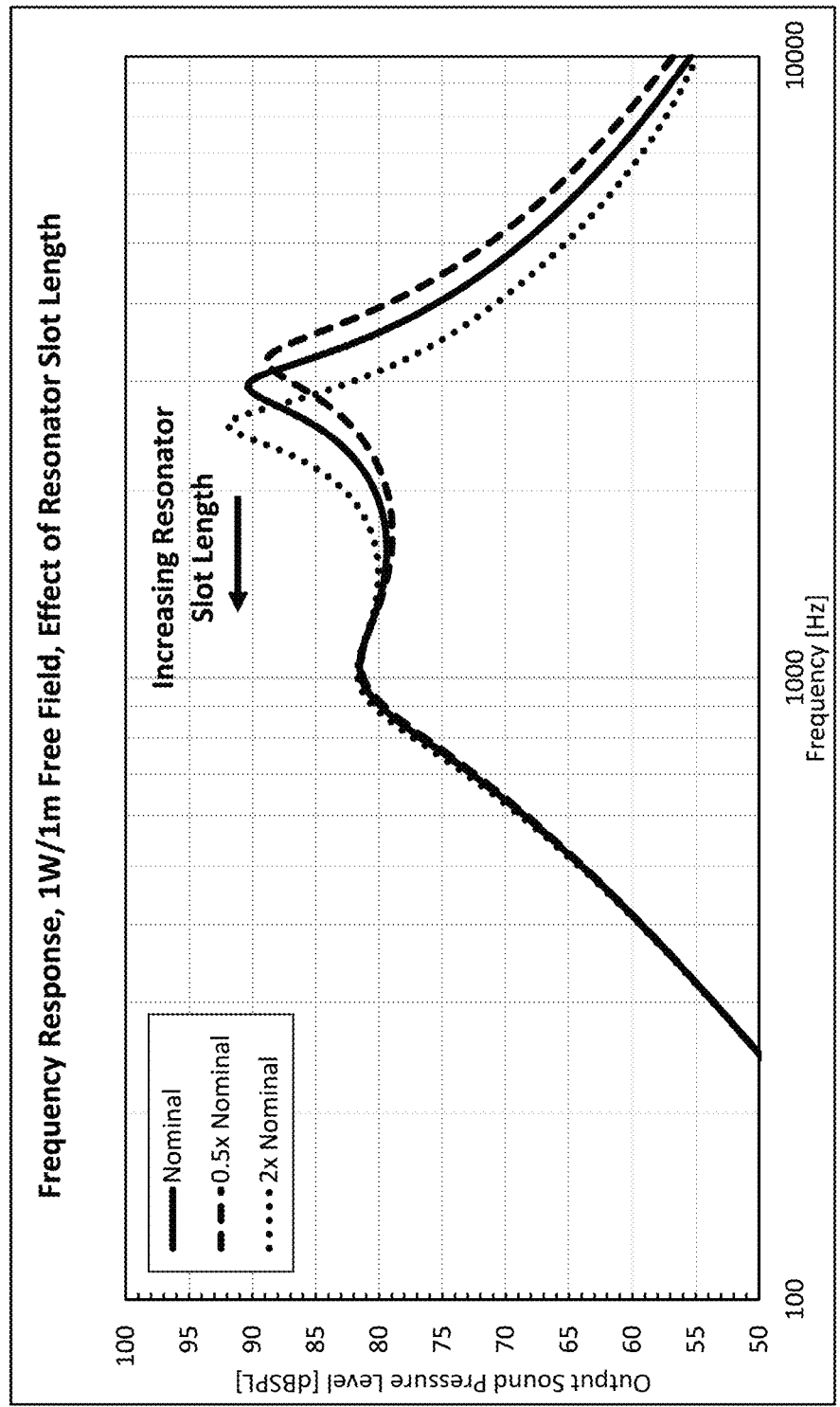

FIG. 30 illustrates the effects of changing a length $L_{924}$ (see FIG. 24) of the single opening or slot 924, while holding all other device parameters constant. As compared to a nominal or baseline level, increasing the length $L_{924}$ (2×) decreases the frequency at which the peak output sound pressure level is observed, and decreasing the length $L_{924}$ (0.5×) increases the frequency at which the peak output sound pressure level is observed. Increasing the length $L_{924}$ also increases the peak output sound pressure level, while decreasing the length $L_{924}$ decreases the peak output sound pressure level.

One or more parameters of the device 902 may be adjusted until those parameters result in a device 902 having the desired resonance frequency. For example, as shown in FIGS. 26-29, when a resonance frequency of the device 902 is higher than the desired resonance frequency (i.e., the frequency at which the peak output sound pressure level is observed is higher than desired), the volume of the front chamber 926 can be increased or the cross-sectional area of the single opening or slot 924 (e.g., the height $H_{924}$ or width $W_{924}$) can be decreased, and/or the length $L_{924}$ of the single opening or slot 924 can be increased. When the resonance frequency of the device 902 is lower than the desired resonance frequency (i.e., the frequency at which the peak output sound pressure level is observed is lower than desired), the volume of the front chamber 926 can be decreased, the cross-sectional area of the single opening or slot 924 can be increased, and/or the length $L_{924}$ of the single opening or slot 924 can be decreased. In this manner, the final values of the one or more parameters may be selected such that a peak output sound pressure level of the device 902 is equal to the desired frequency or within the desired frequency range, specifically a frequency or frequency range corresponding to an alarm tone.

Figure 31:
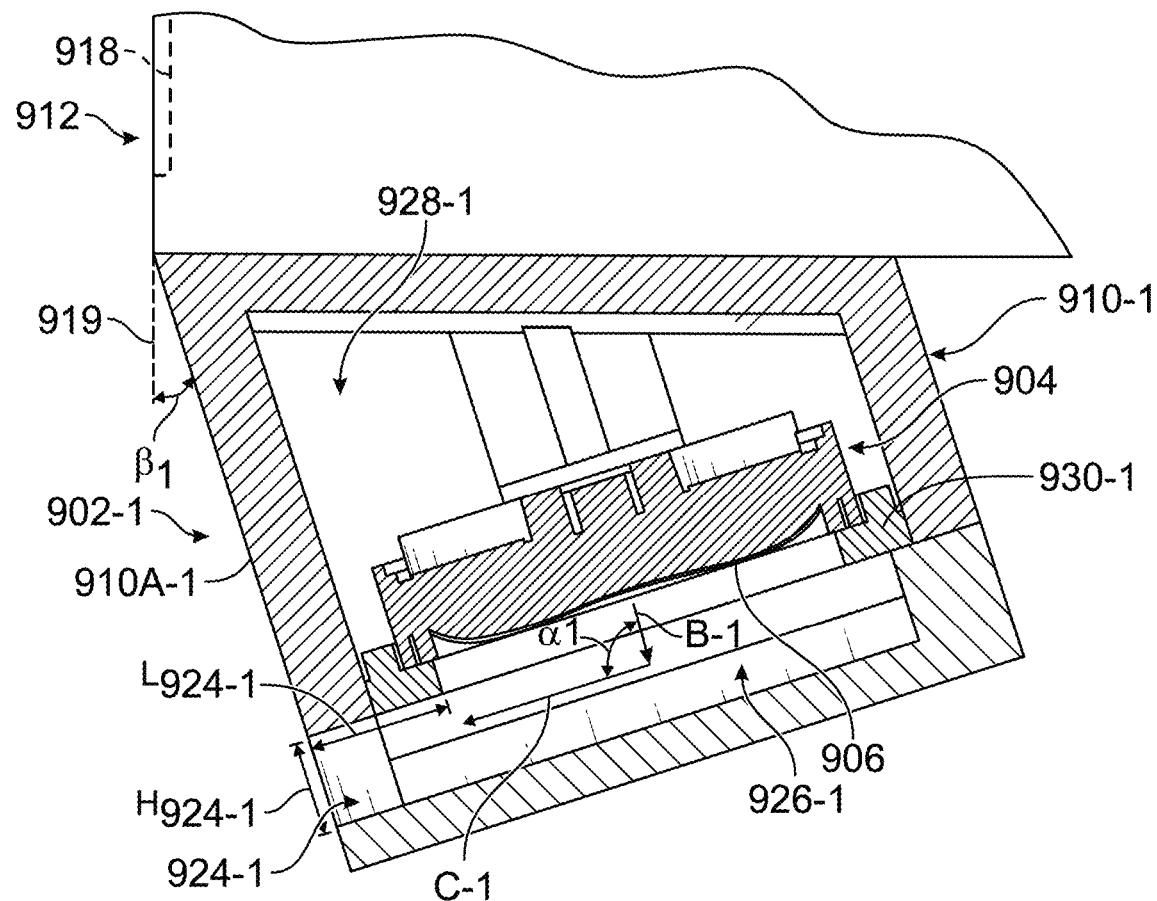
FIGS. 31-34 are cross-sectional views similar to FIG. 22 of a portion of a device in accordance with the present disclosure.

FIGS. 31-34 illustrate various exemplary structures of a device 902-1, 902-2, 902-3, 902-4 comprising a speaker 904, in accordance with the present disclosure (the speakers 904 are shown in outline). In the examples shown in FIGS. 31-34, each device 902-1, 902-2, 902-3, 902-4 may comprise an optical apparatus (see FIGS. 18-20) enclosed by a main housing compartment 5 912, only a portion of which is shown. The main housing compartment 912 includes a front face 918, and the speaker 904 comprises a diaphragm 906 and is configured to generate sound, specifically acoustic waves defining an alarm tone. Each device 902-1, 902-2, 902-3, 902-4 comprises a respective lower housing compartment 910-1, 910-2, 910-3, 910-4 that encloses the speaker 904. The lower housing compartments 910-1, 910-2, 910-3, 910-4 each comprise a front section 910A-1, 910A-2, 910A-3, 910A-4 in which a respective single opening or slot 924-1, 924-2, 924-3, 924-4 is formed. A mesh 950-2, 950-3, 950-4 may be positioned over the single opening or slot 924-2, 924-3, 924-4 (although no mesh is depicted in FIG. 31, it may be understood that a mesh may be positioned over the single opening or slot 924-1).

As described below, in some examples, the device 902-1, 902-2, 902-3, 902-4, may be coupled to the main housing compartment 912 such that the front section 910A-1, 910A-2, 910A-3, 910A-4 of the lower housing compartment 910-1, 910-2, 910-3, 910-4 is oriented at an angle, e.g., $\beta_1$, $\beta_2$, $\beta_3$, $\beta_4$, with respect to a line or plane 919 extending parallel to the front face 918, in which the angle $\beta_1$, $\beta_2$, $\beta_3$, $\beta_4$ may be greater than 0 degrees and up to 90 degrees. In other examples (not shown), the device may be coupled to the main housing compartment 912 such that the front section of the lower housing compartment is parallel with the line or plane 919 extending parallel to the front face 918 of the main housing compartment 912. Alternatively, or in addition, the speaker 904 may be oriented such that a direction of travel of the acoustic waves generated by the speaker 904, e.g., as indicated by arrows B-1, B-4 in FIGS. 31 and 34, is oriented at an angle, e.g., $\alpha_1$, $\alpha_2$, with respect to a central axis of the single opening or slot, e.g., central axes C-1, C-4 of the respective single opening or slots 924-1, 924-4 of the devices 902-1, 902-4, in which the angle $\alpha_1$, $\alpha_2$ may be greater than 0 degrees and up to 90 degrees. In other examples, the speaker 904 may be oriented such that the direction of travel of the acoustic waves generated by the speaker 904, as indicated by arrows B-2, B-3 in FIGS. 32 and 33, is parallel to the central axis of the single opening or slot, e.g., central axes C-2, C-3 of the respective single opening or slots 924-1, 924-2 of the devices 902-2, 902-3.

With reference to FIG. 31, the speaker 904 may be attached or mounted to a speaker mount 930-1 and is positioned within the lower housing compartment 910-1 so as to define (i) an acoustically-sealed front chamber 926-1 between the diaphragm 906 and the adjacent portion(s)of the lower housing compartment 910-1, and (ii) an acoustically-sealed back chamber 928-1 between the speaker 904 and the adjacent portion(s) of the lower housing compartment 910-1. The acoustic waves generated by the speaker 904 generally travel in a direction indicated by arrow B-1 and exit through the single opening or slot 924-1, in which the arrow B-1 is generally perpendicular to a face of the diaphragm 906. The single opening or slot 924-1 includes a height $H_{924-1}$, a length $L_{924-1}$, and a width (not visible; see FIG. 19). The device 902-1 is coupled to the main housing compartment 912 such that the front section 910A-1 of the lower housing compartment 910-1 is oriented at an angle $\beta1$ with respect to the line or plane 919 extending parallel to the front face 918. In the example shown in FIG. 31, the angle $\beta1$ may be about 18 degrees. The single opening or slot 924-1 of the device 902-1 shown in FIG. 31 includes a central axis C-1, and the speaker 904 is oriented such that the direction of travel of the acoustic waves generated by the speaker 904 (as indicated by arrow B-1) is substantially perpendicular to the central axis C-1 of the single opening or slot 924-1, such that an angle $\alpha1$ between the arrow B-1 and the central axis C-1 is about 90 degrees. The front section 910A-1 may be oriented at a corresponding angle (not shown) with respect to the optical axis (not visible in FIG. 31; see FIGS. 18 and 20), e.g., at an angle of about 108 degrees. The arrow B-1 and central axis C-1 may also be oriented at a corresponding angle (not shown) with respect to the optical axis, e.g., at an angle of about 108 degrees for arrow B-1 and an angle of about 18 degrees for central axis C-1.

Figure 32:
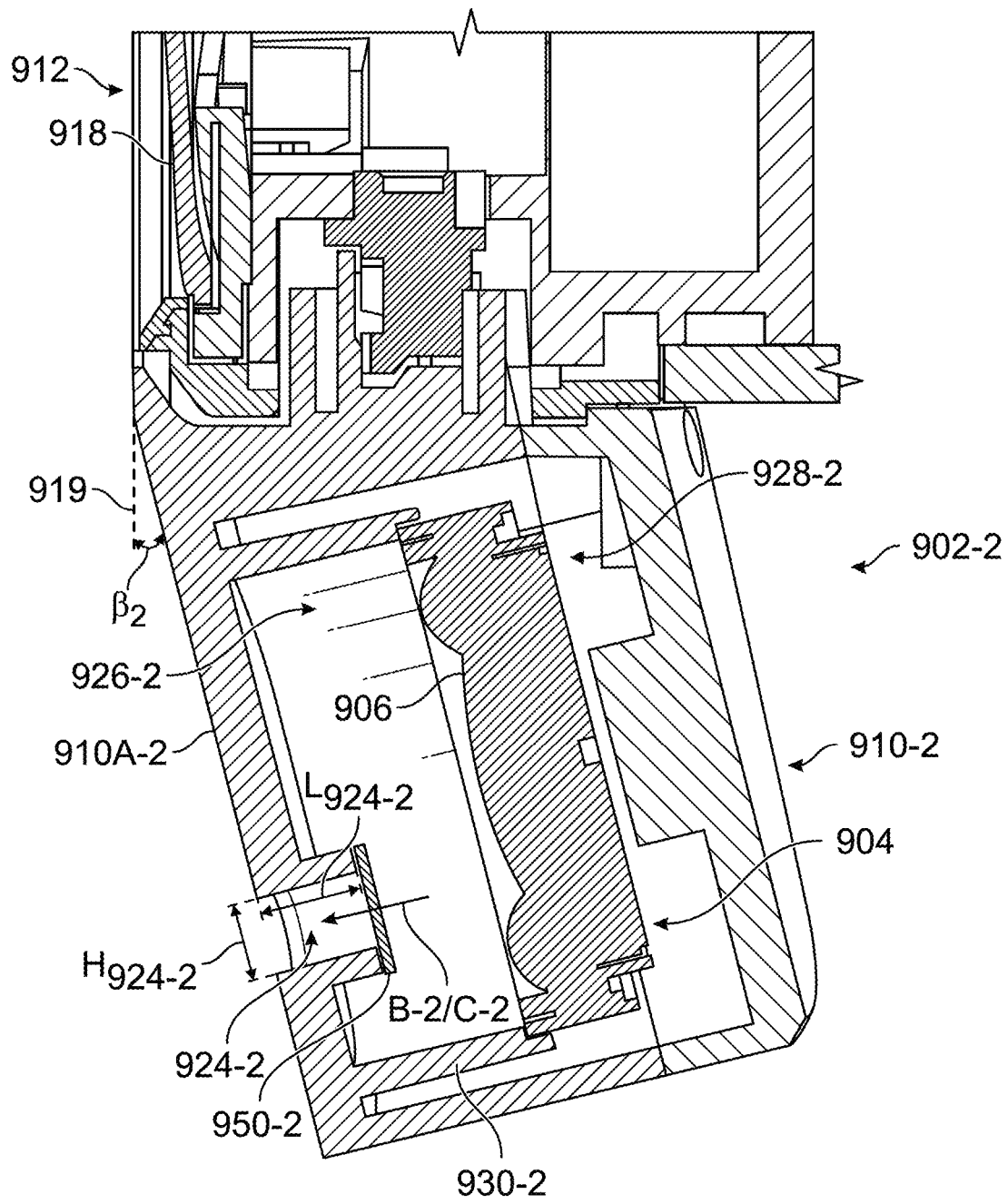

With reference to FIG. 32, the speaker 904 may be attached or mounted to a speaker mount 930-2 and is positioned within the lower housing compartment 910-2 so as to define (i) an acoustically-sealed front chamber 926-2 between the diaphragm 906 and the adjacent portion(s) of the lower housing compartment 910-2, and (ii) an acoustically-sealed back chamber 928-2 between the speaker 904 and the adjacent portion(s) of the lower housing compartment 910-2. In the example shown in FIG. 32, the speaker mount 930-2 is integral with the front section 910A-2 of the lower housing compartment 910-2. The acoustic waves generated by the speaker 904-2 generally travel in a direction indicated by arrow B-2 and exit through the single opening or slot 924-2, in which the arrow B-2 is generally perpendicular to a face of the diaphragm 906. The single opening or slot 924-2 includes a height $H_{924-2}$, a length $L_{924-2}$, and a width (not visible; see FIG. 19). The single opening or slot 924-2 of the device 902-2 shown in FIG. 32 includes a central axis C-2, and the speaker 904 is oriented such that the direction of travel of the acoustic waves generated by the speaker 904 (as indicated by arrow B-2) is substantially parallel to the central axis C-2 of the single opening or slot 924-2, such that the arrow B-2 and the central axis C-2 are aligned/parallel. The device 902-2 is coupled to the main housing compartment 912 such that the front section 910A-2 of the lower housing compartment 910-2 is oriented at an angle $\beta2$ with respect to a line or plane 919 extending parallel to the front face 918. In the example shown in FIG. 32, the angle $\beta_2$ may be about 14 degrees. The front section 910A-2 may be oriented at a corresponding angle (not shown) with respect to the optical axis (not visible in FIG. 32; see FIGS. 18 and 20), e.g., at an angle of about 104 degrees. The arrow B-2 and the central axis C-2 may also be oriented at a corresponding angle (not shown) with respect to the optical axis, e.g., at an angle of about 14 degrees.

Figure 33:
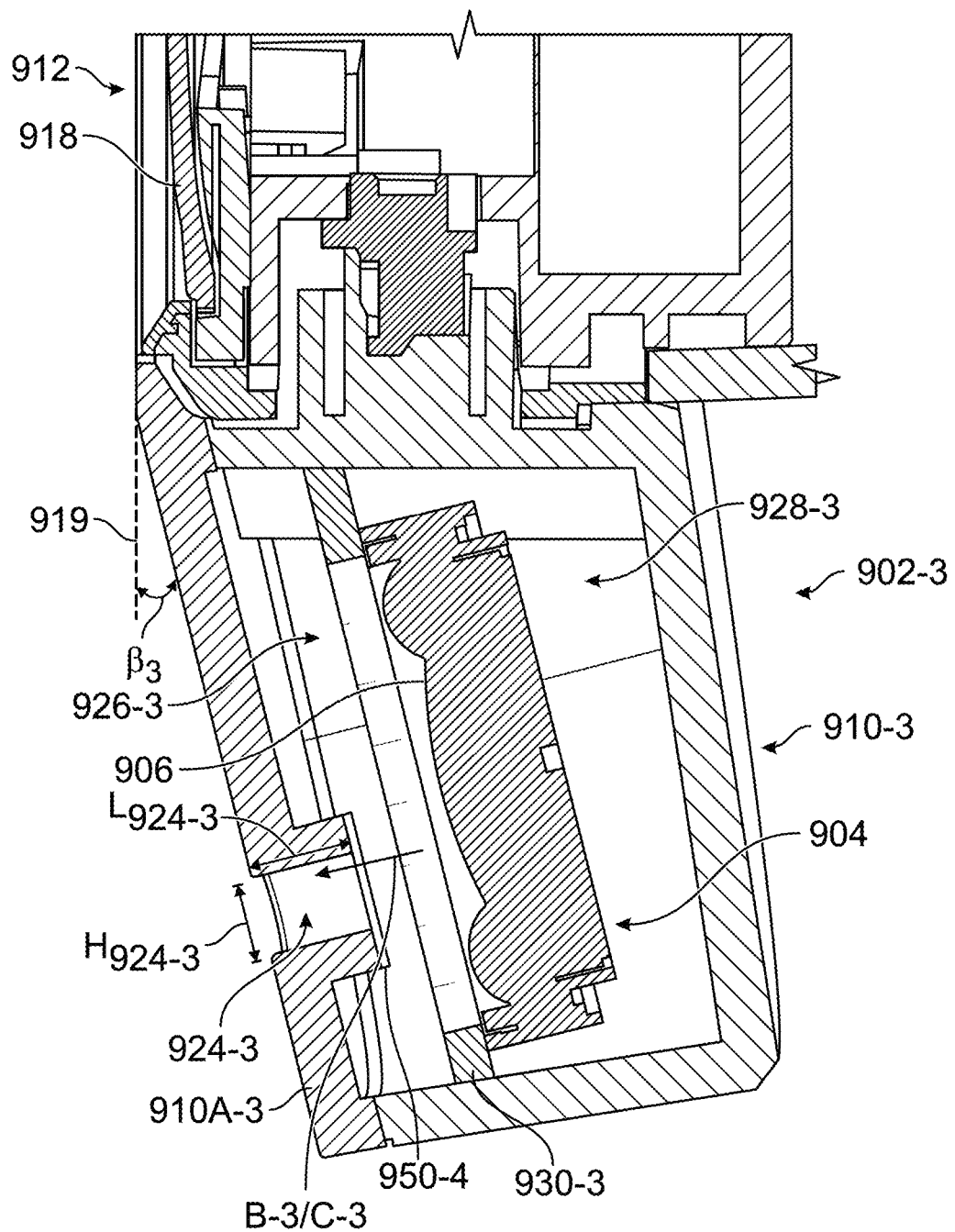
Figure 34:
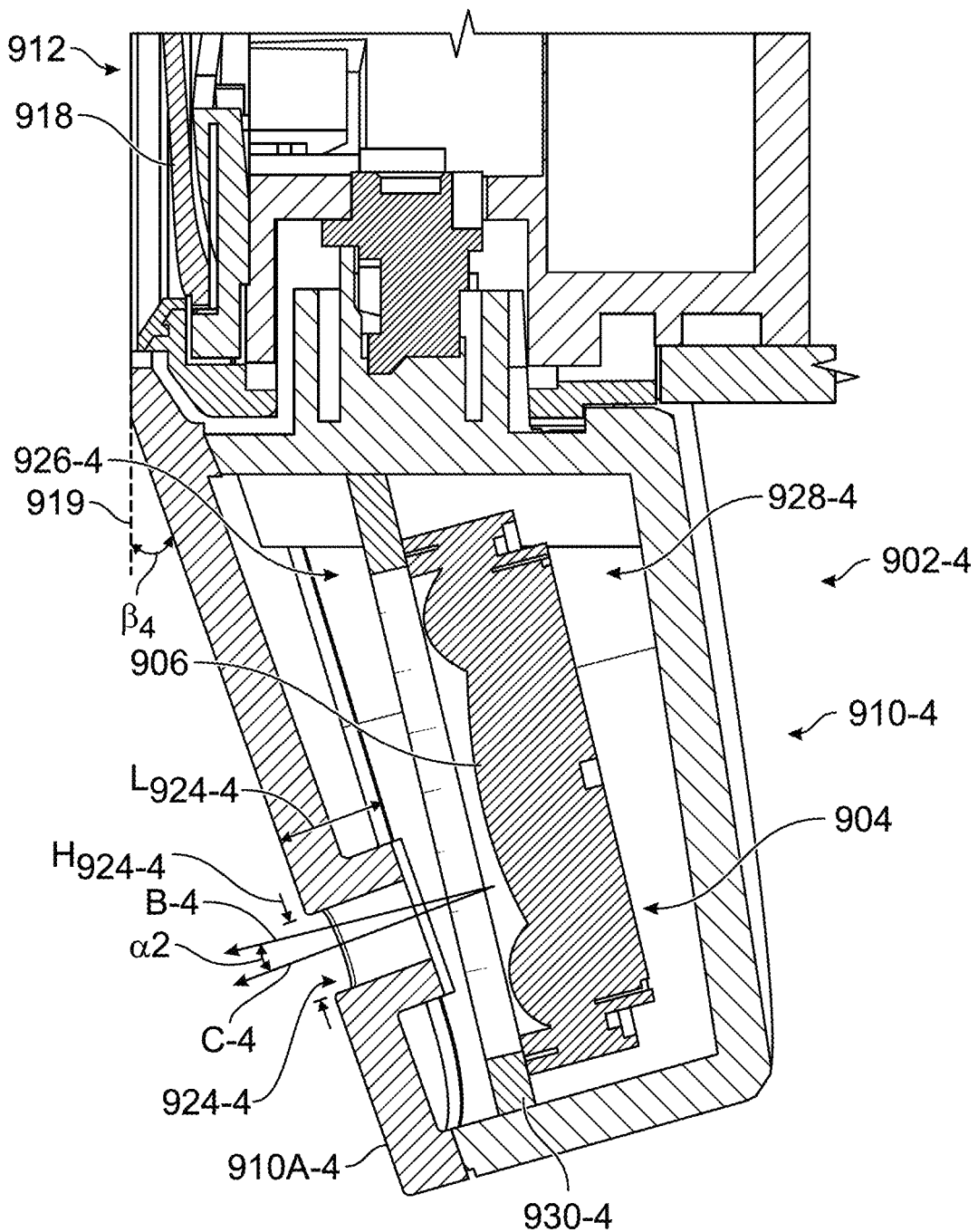

With reference to FIG. 33, the speaker 904 may be attached or mounted to a speaker mount 930-3 and is positioned within the lower housing compartment 910-3 so as to define (i) an acoustically-sealed front chamber 926-3 between the diaphragm 906 and the adjacent portion(s) of the lower housing compartment 910-3, and (ii) an acoustically-sealed back chamber 928-3 between the speaker 904 and the adjacent portion(s) of the lower housing compartment 910-3. The acoustic waves generated by the speaker 904 generally travel in a direction indicated by arrow B-3 and exit through the single opening or slot 924-3, in which the arrow B-3 is generally perpendicular to a face of the diaphragm 906. The single opening or slot 924-3 includes a height $H_{924-3}$, a length $L_{924-3}$, and a width (not visible; see FIG. 19). The single opening or slot 924-3 of the device 902-3 includes a central axis C-3, and similar to the device 902-2 shown in FIG. 32, the speaker 904 in FIG. 33 is oriented such that the direction of travel of the acoustic waves generated by the speaker 904 (as indicated by arrow B-3) is substantially parallel to the central axis C-3 of the single opening or slot 924-3, such that the arrow B-3 and the central axis C-3 are aligned/parallel. The device 902-3 is coupled to the main housing compartment 912 such that the front section 910A-3 of the lower housing compartment 910-3 is oriented at an angle β3 with respect to a line or plane 919 extending parallel to the front face 918. In the example shown in FIG. 33, the angle β3 may be about 14 degrees. The front section 910A-3 may be oriented at a corresponding angle (not shown) with respect to the optical axis (not visible in FIG. 33; see FIGS. 18 and 20), e.g., at an angle of about 104 degrees. The arrow B-3 and the central axis C-3 may also be oriented at a corresponding angle (not shown) with respect to the optical axis, e.g., at an angle of about 14 degrees.

With reference to FIG. 34, the speaker 904 may be attached or mounted to a speaker mount 930-4 and is positioned within the lower housing compartment 910-4 so as to define (i) an acoustically-sealed front chamber 926-4 between the diaphragm 906 and the adjacent portion(s) of the lower housing compartment 910-4, and (ii) an acoustically-sealed back chamber 928-4 between the speaker 904 and the adjacent portion(s) of the lower housing compartment 910-4. The acoustic waves generated by the speaker 904 generally travel in a direction indicated by arrow B-4 and exit through the single opening or slot 924-4, in which the arrow B-4 is generally perpendicular to a face of the diaphragm 906. The single opening or slot 924-4 includes a height $H_{924-4}$, a length $L_{924-4}$, and a width (not visible; see FIG. 19). The single opening or slot 924-4 of the device 902-4 shown in FIG. 34 includes a central axis C-4, and the speaker 904 is oriented such that the direction of travel of the acoustic waves generated by the speaker 904 (as indicated by arrow B-4) is oriented at an angle α2 with respect to the central axis C-4 of the single opening or slot 924-4. In the example shown in FIG. 34, the angle α2 may be about 6 degrees. In addition, the device 902-4 is coupled to the main housing compartment 912 such that the front section 910A-4 of the lower housing compartment 910-4 is oriented at an angle β4 with respect to a line or plane 919 extending parallel to the front face 918. In the example shown in FIG. 34, the angle β4 may be about 20 degrees. The front section 910A-4 may be oriented at a corresponding angle (not shown) with respect to the optical axis (not visible in FIG. 34; see FIGS. 18 and 20), e.g., at an angle of about 110 degrees. The arrow B-4 and the central axis C-4 may be oriented at a corresponding angle (not shown) with respect to the optical axis, e.g., at an angle of about 14 degrees for arrow B-4 and an angle of about 20 degrees for central axis C-4.

It can be seen in FIGS. 31-34 that altering the orientation of the speaker 904 within the lower housing compartment 910-1, 910-2, 910-3, 910-4 and/or the angle of the lower housing compartment 910-1, 910-2, 910-3, 910-4 with respect to the front face 918 of the main housing compartment 912 may affect the shape and volume of the front chamber 926-1, 926-2, 926-3, 926-4 and/or back chamber 928-1, 928-2, 928-3, 928-4. For example, the speaker 904 in FIG. 31 20 is positioned within the device 902-1 to define a symmetrical, relatively large front chamber 926-1 and an asymmetrical, relatively small back chamber 928-1. The speaker 904 in FIG. 32 is positioned within the device 902-2 to define a symmetrical, relatively large front chamber 926-2 and a symmetrical, relatively small back chamber 928-2. As compared to the device 902-2, positioning of the speaker 904 within the device 902-3 and a shape of the lower housing compartment 910-3 in FIG. 33 result in a symmetrical but relatively smaller front chamber 926-3 and an asymmetrical back chamber 928-3 with a similar volume. In FIG. 34, the positioning of the speaker 904 within the device 902-4 and the shape of the lower housing compartment 910-4 result in the front and back chambers 926-4, 928-4 both being relatively small and asymmetrical.

EXAMPLES

The devices 902-1, 902-2, 902-3, 902-4 (hereafter Devices (1)-(4)) shown in FIGS. 31-34 are constructed. Each of Devices (1)-(4) includes a speaker (Ole Wolff; OWS-203657TA-8) that is 36 mm long, 20 mm wide, and 5.7 mm high. Device (1) does not include a material (i.e., the mesh 950 shown in FIGS. 22-24) across the single opening or slot 924-1. Devices (2)-(4) each include a mesh 950-2, 950-3, 950-4 (Saati Acoustex 006HY; 6 MKS Rayls Acoustic Impedance [N*s/m^3]) positioned over the respective single opening or slot 924-2, 924-3, 924-4. Devices (1)-(4) are driven by a sine wave 4.47 Vrms/2.5 W and output sound pressure measured at a distance of 1 meter.

Figure 35:
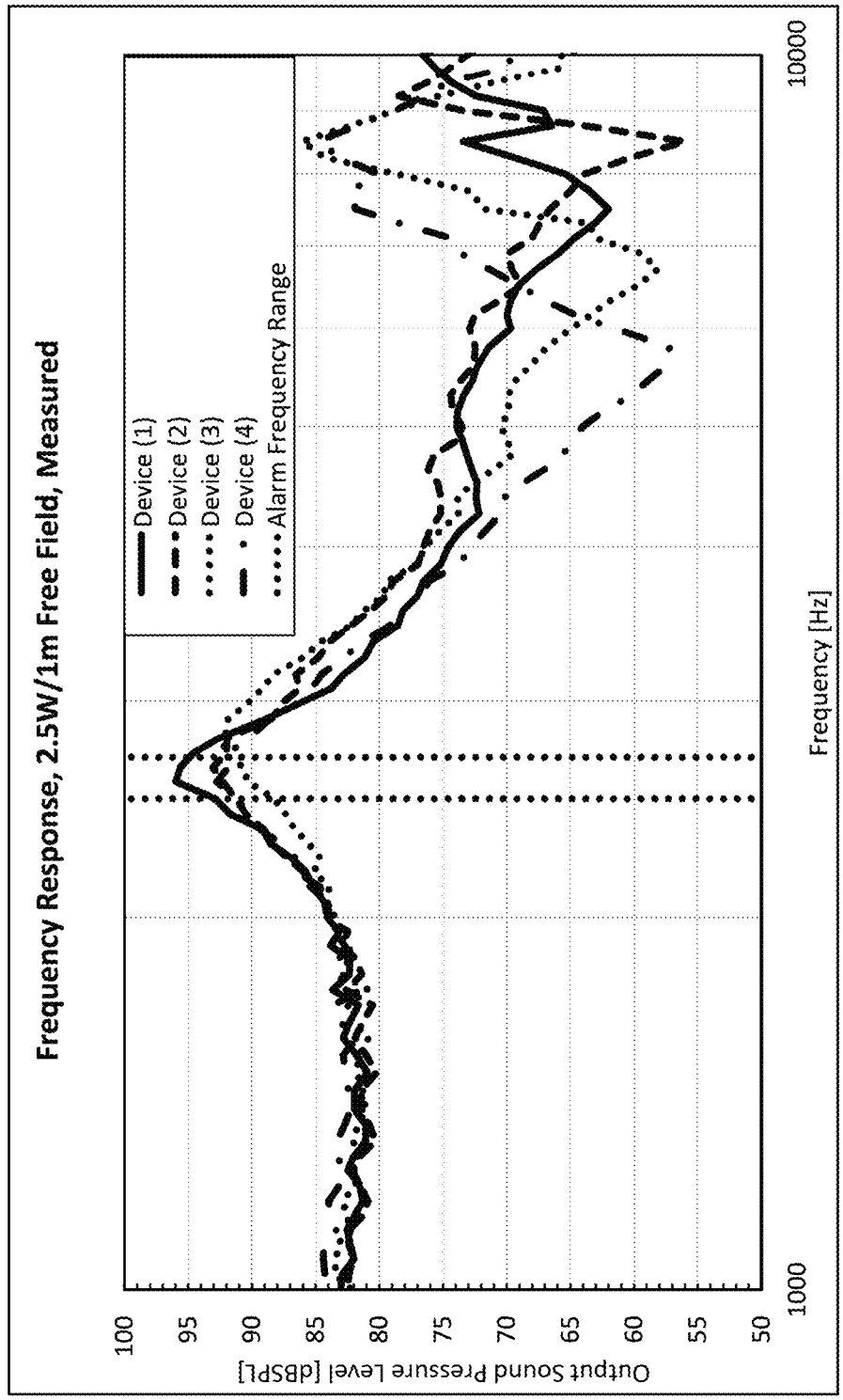
FIG. 35 is a graph illustrating performance of the devices of FIGS. 31-34.

The parameters of Device (1) are as follows:
Volume of back chamber=8.7 cc
Volume of front chamber=5.0 cc
Width of single opening or slot=36 mm
Height of single opening or slot=4.0 mm
Length of single opening or slot=3.0 mm
Angle of speaker (speaker axis perpendicular to face of the speaker diaphragm) with respect to axis of single opening/slot=90 degrees
Angle of front section with respect to front face=0 degrees
The parameters of Device (2) are as follows:
Volume of the back chamber=8.4 cc
Volume of the front chamber=4.0 cc
Width of the single opening or slot=30 mm
Height of the single opening or slot=3.0 mm
Length of the single opening or slot=4.0 mm
Angle of speaker with respect to axis of single opening/slot=0 degrees
Angle of front section with respect to front face=14 degrees
The parameters of Device (3) are as follows:
Volume of the back chamber=7.0 cc
Volume of the front chamber=4.3 cc
Width of the single opening or slot=33 mm
Height of the single opening or slot=3.0 mm
Length of the single opening or slot=4.0 mm
Angle of speaker with respect to axis of single opening/slot=0 degrees
Angle of front section with respect to front face=14 degrees
The parameters of Device (4) are as follows:
Volume of the back chamber=5.3 cc
Volume of the front chamber=4.3 cc
Width of the single opening or slot=33 mm
Height of the single opening or slot=3.0 mm
Length of the single opening or slot=4.0 mm
Angle of speaker with respect to axis of single opening/slot=6 degrees
Angle of front section with respect to front face=20 degrees FIG. 35 is a graph illustrating a frequency response of the devices 902-1, 902-2, 902-3, 902-4 of FIGS. 31-34. A desired frequency range of 2.5 kHz to 2.7 kHz, i.e., the frequency range of an alarm tone, is indicated with vertical dotted lines. Device (1) demonstrated a peak output of 96.0 dBSPL at a frequency of 2.58 kHz and a −10 dB bandwidth of 0.60 to 4.25 kHz. Device (2) demonstrated a peak output of 93.1 dBSPL at a frequency of 2.65 kHz and a −10 dB bandwidth of 0.56 to 6.3 kHz. Device (3) demonstrated a peak output of 92.2 dBSPL at a frequency of 2.72 kHz and a −10 dB bandwidth of 0.615 to 4.62 kHz. Device (4) demonstrated a peak output of 92.8 dBSPL at a frequency of 2.58 kHz and a −10 dB bandwidth of 0.65 to 4.00 kHz. The −10 dB bandwidth may be determined by calculating an average dBSPL across a predefined mid-band level (e.g., between 1.0 and 2.0 kHz) and determining where the output sound pressure level of the device goes below this average by 10 dB on both sides of the mid-band range, i.e., 1.0 and 2.0 kHz.

Figure 36:
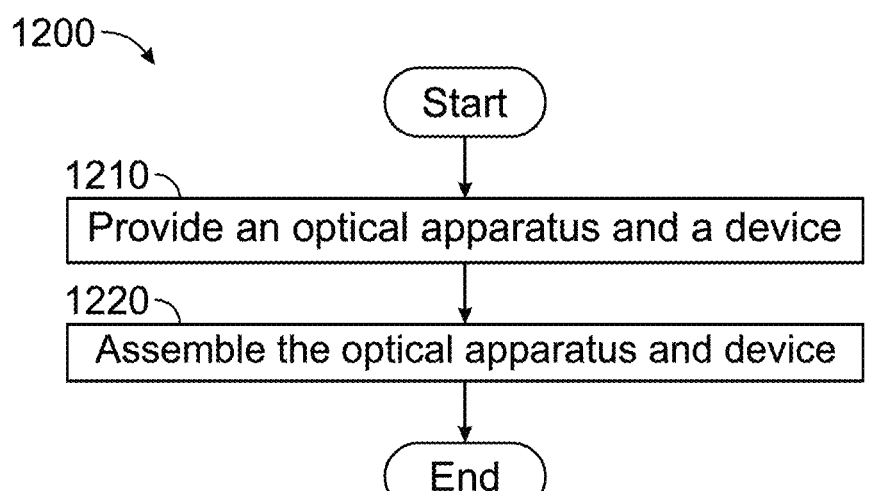
FIG. 36 is a flowchart illustrating a method in accordance with the present disclosure.

FIG. 36 is a flowchart illustrating a method 1200 in accordance with the present disclosure. The method 1200 comprises providing a device comprising an optical apparatus at 1210 in which the device further comprises a speaker and a housing enclosing the speaker. The speaker is configured to generate acoustic waves defining an alarm tone, and the housing comprises a single opening that is located within the housing such that (i) a front chamber is defined between the speaker and the single opening, and (ii) acoustic waves generated by the speaker exit through the single opening. The method 1200 may continue at 1220 with assembling the device such that the front chamber and the single opening create a resonator having a resonance frequency within a frequency range of the alarm tone to selectively increase a sound pressure level of an output of the device corresponding to the alarm tone. The method 1200 may then conclude.

In some examples, the method may further comprise acoustically sealing the front chamber such that the acoustic waves generated by the speaker are directed only through the single opening. The speaker may comprise an electrodynamic speaker, in which the frequency range of the output of the speaker is from 400 Hz to 4.0 kHz and the output of the speaker corresponding to the alarm tone falls within a range from 2.0 kHz to 4.0 kHz.

In other examples, the method may further include defining one or more parameters of the housing such that the resonance frequency is within a frequency range of the alarm tone to selectively increase the sound pressure level of the output of the device corresponding to the alarm tone. The one or more parameters may comprise a volume of the front chamber, and the method further comprises: increasing the volume of the front chamber when the resonance frequency is to be decreased; and decreasing the volume of the front chamber when the resonance frequency is to be increased. The one or more parameters may comprise a cross-sectional area of the single opening, and the method further comprises: decreasing the cross-sectional area of the single opening when the resonance frequency is to be decreased; and increasing the cross-sectional area of the single opening when the resonance frequency is to be increased. The one or more parameters may comprise a length of the single opening, and the method may further comprise: decreasing the length of the single opening when the resonance frequency is to be increased; and increasing the length of the single opening when the resonance frequency is to be decreased.

Turning now to FIG. 37, an example image capture device 1000 is schematically illustrated. Particular configurations of the image capture device 1000 are illustrated in FIGS. 18-25 and 31-34 and described above. As shown in FIG. 37, the image capture device 1000 includes at least one processor 1002, volatile memory 1004, non-volatile memory 1006, at least one network interface 1008, a battery assembly 1010, and an interconnection mechanism 1012. The network interface 1008 includes a radio frequency (RF) transceiver 1008A. The transceiver 1008A can be used to communicate with location-based devices via a sub-GHz network. These features of the image capture device are illustrated in dashed lines to indicate that they reside within a housing 1014. The non-volatile memory 1006 stores executable code 1016 and a data store 1018.

Some examples further include an image sensor assembly 1020, a light 1022, a speaker 1024, a microphone 1026, a wall mount 1028, a magnet 1030, and a motion sensor 1032. The image sensor assembly 1020 may include a lens and an image sensor. The light 1022 may include a light emitting diode (LED), such as a red-green-blue emitting LED. The light 1022 may also include an infrared emitting diode in some examples. The speaker 1024 may include a transducer configured to emit sound in the range of 60 dB to 80 dB or louder. Further, in some examples, the speaker 1024 can include a siren configured to emit sound in the range of 70 dB to 90 db or louder. The PIR sensor 1032 measures changes in the amount of ambient infrared (IR) light radiating from objects in the field of view; however, the PIR sensor 1032 does not emit any light. As such, the PIR sensor 1032 is useful for detecting motion represented by variations in temperature over time, such as caused by a person, animal, or object moving through the field of view. The microphone 1026 may include a micro electro-mechanical system (MEMS) microphone. The wall mount 1028 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 1030 to magnetically couple to the wall mount 1028, thereby holding the image capture device 1000 in place.

In some examples, the respective descriptions of the processor 1002, the volatile memory 1004, the network interface 1008, the non-volatile memory 1006, the code 1016 with respect to the network interface 1008, the interconnection mechanism 1012, and the battery assembly 1010 with reference to the security sensor 722 are applicable to these same features with reference to the image capture device 1000. As such, those descriptions will not be repeated here.

Continuing with the example of FIG. 37, through execution of the code 1016, the processor 1002 can control operation of the image sensor assembly 1020, the light 1022, the speaker 1024, and the microphone 1026. For instance, in at least one example, when executing the code 1016, the processor 1002 controls the image sensor assembly 1020 to acquire sensor data, in the form of image data, to be streamed to the base station 414 (or one of the processes 430, 428, or 432 of FIG. 13) via the network interface 1008. Alternatively or additionally, in at least one example, through execution of the code 1016, the processor 1002 controls the light 10 1022 to emit light so that the image sensor assembly 1020 collects sufficient reflected light to compose the image data. Further, in some examples, through execution of the code 1016, the processor 1002 controls the speaker 1024 to emit sound. This sound may be locally generated (e.g., a sonic alert via the siren) or streamed from the base station 414 (or one of the processes 430, 428, or 432 of FIG. 13) via the network interface 1008 (e.g., utterances from the user or monitoring personnel). Further still, in some examples, through execution of the code 1016, the processor 1002 controls the microphone 1026 to acquire sensor data in the form of sound for streaming to the base station 414 (or one of the processes 430, 428, or 432 of FIG. 13) via the network interface 1008.

It should be appreciated that in the example of FIG. 37, the light 1022, the speaker 1024, and the microphone 1026 implement an instance of the user interface 712 of FIG. 16. It should also be appreciated that the image sensor assembly 1020 and the light 1022 implement an instance of the sensor assembly 720 of FIG. 16. As such, the image capture device 1000 illustrated in FIG. 37 is at least one example of the security sensor 722 illustrated in FIG. 16.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. A device comprising:
   a speaker configured to generate sound and including a diaphragm;
   a camera; and
   a housing, wherein the housing comprises a main housing compartment enclosing the camera and a lower housing compartment enclosing the speaker, the lower housing compartment being coupled to the main housing compartment and including a single opening defined within one portion thereof, the speaker being positioned within the lower housing compartment to define a front chamber between the diaphragm and the one portion, and the single opening being sized to generate, with the front chamber, an increased output of the device within a frequency range of an output of the speaker corresponding to an alarm tone.

2. The device of claim 1, wherein the front chamber and the single opening are configured to create a resonator having a resonance frequency within the frequency range of the alarm tone to selectively increase a sound pressure level of the output of the device corresponding to the alarm tone.

3. The device of claim 1, wherein the increased output of the device comprises a peak output of the device within the frequency range of the output of the speaker corresponding to the alarm tone.

4. The device of claim 1, wherein the speaker comprises an electrodynamic speaker capable of generating an output within a frequency range of from 400 Hz to 4.0 kHz.

5. The device of claim 1, wherein the frequency range of the output of the speaker corresponding to the alarm tone falls within a range from 2.0 kHz to 4.0 kHz.

6. The device of claim 1, wherein the speaker comprises a security alarm speaker and the output of the speaker further comprises speech.

7. The device of claim 1, wherein a sound pressure level of the output of the speaker is increased by at least 10 dB.

8. The device of claim 1, wherein the lower housing compartment includes only the single opening, and wherein a central axis of the single opening is aligned with a direction of travel of acoustic waves generated by the speaker.

9. A device comprising:
   a speaker and a housing enclosing the speaker,
   wherein the speaker is attached to define a front chamber between the housing and a diaphragm of the speaker,
   wherein the housing comprises a single opening that is sized to generate, with the front chamber, an increased output of the device within a frequency range of an output of the speaker corresponding to an alarm tone;
   wherein the speaker is enclosed in a lower housing compartment of the housing and the housing further comprises a main housing compartment that encloses a camera, wherein the main housing compartment comprises one or more extensions through which one or more fasteners extend to couple the lower housing compartment to the main housing compartment.

10. The device of claim 9, wherein the front chamber is acoustically sealed, such that acoustic waves generated by the speaker are directed only through the single opening.

11. The device of claim 9, wherein the camera comprises a camera lens that captures light along an optical axis, and wherein the optical axis is substantially parallel to a direction in which acoustic waves produced by the speaker exit the single opening.

12. The device of claim 9, wherein the lower housing compartment is acoustically sealed with respect to the main housing compartment.

\* \* \* \* \*